United States Patent
Liu et al.

(10) Patent No.: US 12,075,275 B2
(45) Date of Patent: Aug. 27, 2024

(54) COMMUNICATIONS METHOD AND APPARATUS, AND DEVICE

(71) Applicant: HUAWEI TECHNOLOGIES CO., LTD., Guangdong (CN)

(72) Inventors: Xianda Liu, Beijing (CN); Kunpeng Liu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 17/670,139

(22) Filed: Feb. 11, 2022

(65) Prior Publication Data

US 2022/0167199 A1    May 26, 2022

Related U.S. Application Data

(63) Continuation of application No. PCT/CN2020/108995, filed on Aug. 13, 2020.

(30) Foreign Application Priority Data

Aug. 16, 2019   (CN) .......................... 201910760894.7

(51) Int. Cl.
  *H04W 24/10*   (2009.01)
  *H04B 7/0456*   (2017.01)
(52) U.S. Cl.
  CPC .......... *H04W 24/10* (2013.01); *H04B 7/0456* (2013.01)
(58) Field of Classification Search
  CPC ....... H04W 24/10; H04W 8/24; H04W 24/02; H04W 52/325; H04W 52/362; H04W 52/367; H04W 52/146; H04B 7/0456; H04B 7/0482; H04B 7/0628
  USPC ......................................................... 375/267
  See application file for complete search history.

(56) References Cited

U.S. PATENT DOCUMENTS

| | | | |
|---|---|---|---|
| 8,196,004 B1 | 6/2012 | Tang | |
| 9,264,118 B1 * | 2/2016 | Koike-Akino | H04L 25/0391 |
| 2010/0215110 A1 | 8/2010 | Onggosanusi et al. | |
| 2010/0220801 A1 | 9/2010 | Lee et al. | |
| 2013/0136203 A1 | 5/2013 | Chen et al. | |
| 2017/0338871 A1 | 11/2017 | Huang et al. | |

FOREIGN PATENT DOCUMENTS

| | | |
|---|---|---|
| CN | 101662343 A | 3/2010 |
| CN | 101917365 A | 12/2010 |
| CN | 102190080 A | 9/2011 |
| CN | 102800316 A | 11/2012 |

(Continued)

OTHER PUBLICATIONS

Bi et al., "Non-Orthogonal Multiple Access Technology for 5G Systems," Telecommunications Science, Apr. 22, 2015, 8 pages (with English abstract).

(Continued)

*Primary Examiner* — Fitwi Y Hailegiorgis
(74) *Attorney, Agent, or Firm* — Fish & Richardson P.C.

(57) ABSTRACT

This application relates to a communications method and apparatus, and a device. The communications method includes: A terminal device determines a first codeword set, where the first codeword set includes a first codeword, the first codeword is a 4×1 matrix, and each element in the matrix is a non-zero element.

20 Claims, 8 Drawing Sheets

(56) References Cited

FOREIGN PATENT DOCUMENTS

| CN | 106576037 | A  | 4/2017 |
|----|-----------|----|--------|
| CN | 107689859 | A  | 2/2018 |
| CN | 108023709 | A  | 5/2018 |
| CN | 109803419 | A  | 5/2019 |
| CN | 110036570 | A  | 7/2019 |
| WO | 2019079936 | A1 | 5/2019 |
| WO | 2019096843 | A1 | 5/2019 |

OTHER PUBLICATIONS

Vivo, "Discussion on Codebook Based UL Transmission," 3GPP TSG RAN WG1 Meeting #90bis, R1-1717467, Prague, CZ, Oct. 9-13, 2017, 7 pages.

Extended European Search Report issued in European Application No. 20855091.3 on Sep. 8, 2022, 9 pages.

MediaTek Inc., "Full Tx power UL Transmission," 3GPP TSG RAN WG1 #96bis, R1-1904477, Xi'an, China, Apr. 8-12, 2019, 17 pages.

3GPP TS 38.211 V15.6.0 (Jun. 2019), "3rd Generation Partnership Project;Technical Specification Group Radio Access Network;NR;Physical channels and modulation(Release 15)," Jun. 2019, 97 pages.

3GPP TS 38.212 V15.6.0 (Jun. 2019), "3rd Generation Partnership Project;Technical Specification Group Radio Access Network;NR;Multiplexing and channel coding(Release 15)," Jun. 2019, 101 pages.

3GPP TS 38.214 V15.6.0 (Jun. 2019), "3rd Generation Partnership Project;Technical Specification Group Radio Access Network;NR;Physical layer procedures for data(Release 15)," Jun. 2019, 105 pages.

Huawei, HiSilicon, "Possible enhancement to allow full power transmission for UL MIMO with multiple Pas," 3GPP TSG RAN WG1 Meeting #95, R1-1812687, Spokane, USA, Nov. 12-16, 2018, 5 pages.

Huawei, HiSilicon, "Remaining issues on UL MIMO full power transmission with multiple PAs, " 3GPP TSG RAN WG1 Meeting #98, R1-1908068, Prague, Czech Republic, Aug. 26-30, 2019, 16 pages.

Office Action issued in Chinese Application No. 201910760894.7 on Jan. 7, 2022, 30 pages (with English translation).

Office Action issued in Chinese Application No. 201910760894.7 on Jun. 22, 2021, 23 pages (with English translation).

PCT International Search Report and Written Opinion issued in International Application No. PCT/CN2020/108995 on Nov. 25, 2020, 13 pages (with English translation).

ZTE, "Full TX Power UL transmission," 3GPP TSG RAN WG1 Ad-Hoc Meeting 1901, R1-1900089, Taipei, Taiwan, Jan. 21-25, 2019, 7 pages.

ZTE, "Full TX Power UL transmission," 3GPP TSG RAN WG1 Meeting #96bis, R1-1904015, Xi'an, China, Apr. 8-12, 2019, 8 pages.

\* cited by examiner

COMMUNICATIONS METHOD AND APPARATUS, AND DEVICE

CROSS-REFERENCE TO RELATED APPLICATIONS

This application is a continuation of International Application No. PCT/CN2020/108995, filed on Aug. 13, 2020, which claims priority to Chinese Patent Application No. 201910760894.7, filed on Aug. 16, 2019. The disclosures of the aforementioned applications are hereby incorporated by reference in their entireties.

TECHNICAL FIELD

Embodiments of this application relate to the field of communications technologies, and in particular, to a communications method and apparatus, and a device.

BACKGROUND

In a wireless communications system, when sending an uplink signal, a terminal device generates a baseband signal on a baseband. A radio frequency signal is obtained after the baseband signal passes through a radio frequency transmit link of the terminal device, and then the radio frequency signal is sent through an antenna of the terminal device. The radio frequency link includes a radio frequency integrated circuit, a power amplifier (power amplifier, PA), and a duplexer/filter.

Currently, coherent capabilities of a terminal device may include a fully-coherent capability, a partially-coherent capability, and a non-coherent capability. Different coherent capabilities represent phase calibration between different antenna ports. Terminal devices that simultaneously support a plurality of transmit antenna ports may have different coherent capabilities. When supporting only the non-coherent capability, the terminal device can support only a non-coherent codeword. When supporting only the partially-coherent capability, the terminal device can support only a partially-coherent codeword or a non-coherent codeword. When supporting the fully-coherent capability, the terminal device can support a fully-coherent codeword, a partially-coherent codeword, and a non-coherent codeword.

In an existing power control mechanism, rank (rank)-1 uplink transmission is used as an example. Only a fully-coherent codeword can support a physical uplink shared channel (physical uplink shared channel, PUSCH) in using rated maximum transmit power for sending. Maximum PUSCH transmit power that can be supported by a partially-coherent codeword is 1/2 of the rated maximum transmit power, and maximum PUSCH transmit power that can be supported by a non-coherent codeword is 1/4 of the rated maximum transmit power. For rank-2 and rank-3 uplink transmission, the non-coherent codeword cannot support the PUSCH in using the rated maximum transmit power. It can be learned that neither the terminal device supporting the partially-coherent capability nor the terminal device supporting the non-coherent capability can send the PUSCH at the rated maximum transmit power, and consequently PUSCH sending quality is poor.

SUMMARY

Embodiments of this application provide a communications method and apparatus, and a device, to improve PUSCH sending quality.

According to a first aspect, a first communications method is provided. The method includes: A terminal device determines a first codeword set, where the first codeword set includes a first codeword, the first codeword is a 4×1 matrix, and each element in the matrix is a non-zero element; and the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ or } \frac{1}{2}\begin{bmatrix}1\\-j\\-1\\j\end{bmatrix}.$$

The method may be performed by a first communications apparatus. The first communications apparatus may be a communications device or a communications apparatus, for example, a chip system, that can support the communications device in implementing a function required in the method. For example, the first communications apparatus is a terminal apparatus. For example, the terminal apparatus is the terminal device, a chip system that is disposed in the terminal device and that is configured to implement functions of the terminal device, or another component configured to implement functions of the terminal device.

In this embodiment of this application, for example, the first codeword set determined by the terminal device may include at least one first codeword, and a quantity of at least one first codeword may be greater than or equal to 1. The first codeword may be a 4×1 fully-coherent codeword. The terminal device sends uplink data to a network device by using the fully-coherent codeword, so that power for sending the uplink data can reach rated maximum transmit power, to improve sending quality of the uplink data, and also improve transmit power utilization of the terminal device.

For example, the first codeword set may include the at least one first codeword, but does not include another codeword, that is, the first codeword set includes only the at least one first codeword. Alternatively, the first codeword set may further include another codeword in addition to the at least one first codeword.

With reference to the first aspect, in a possible implementation of the first aspect, the method further includes:

The terminal device sends coherent capability indication information, where the coherent capability indication information is used to indicate that the terminal device has a non-coherent capability.

The terminal device having the non-coherent capability supports a non-coherent codeword set, the non-coherent codeword set includes only at least one fourth codeword, and each column of the fourth codeword includes only one non-zero element.

The terminal device may send the coherent capability indication information of the terminal device to the network device, so that the network device can determine whether the terminal device is a terminal device having a fully-coherent capability, a terminal device having a partially-coherent capability, or a terminal device having a non-coherent capability. In this embodiment of this application, for example, the terminal device is the terminal device having the non-coherent capability. Based on the coherent capability indication information, the network device may determine that the terminal device has the non-coherent capability, or may determine that the terminal device supports the non-coherent codeword set. It can be learned that in this embodiment of this application, even the terminal device having the non-coherent capability can send uplink data by using a fully-coherent codeword, so that power for sending the uplink data can reach rated maximum transmit power, to improve sending quality of the uplink data, and also improve transmit power utilization of the terminal device.

With reference to the first aspect, in a possible implementation of the first aspect,
the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix} 1 & 1 \\ 1 & 1 \\ 1 & -1 \\ 1 & -1 \end{bmatrix}, \frac{1}{2\sqrt{2}}\begin{bmatrix} 1 & 1 \\ 1 & 1 \\ j & -j \\ j & -j \end{bmatrix}, \frac{1}{2\sqrt{2}}\begin{bmatrix} 1 & 1 \\ j & j \\ 1 & -1 \\ j & -j \end{bmatrix}, \frac{1}{2\sqrt{2}}\begin{bmatrix} 1 & 1 \\ j & j \\ j & -j \\ -1 & 1 \end{bmatrix},$$

$$\frac{1}{2\sqrt{2}}\begin{bmatrix} 1 & 1 \\ -1 & -1 \\ 1 & -1 \\ -1 & 1 \end{bmatrix}, \frac{1}{2\sqrt{2}}\begin{bmatrix} 1 & 1 \\ -1 & -1 \\ j & -j \\ -j & j \end{bmatrix}, \frac{1}{2\sqrt{2}}\begin{bmatrix} 1 & 1 \\ -j & -j \\ 1 & -1 \\ -j & j \end{bmatrix}, \text{ or } \frac{1}{2\sqrt{2}}\begin{bmatrix} 1 & 1 \\ -j & -j \\ j & -j \\ 1 & -1 \end{bmatrix}.$$

For example, the first codeword set may include at least one second codeword, and a quantity of at least one second codeword may be greater than or equal to 1. The first codeword is a 4×1 fully-coherent codeword, and the second codeword is a 4×2 fully-coherent codeword. That is, the first codeword set may include different types of fully-coherent codewords, so that the codeword included in the first codeword set can support transmission at more layers.

For example, the first codeword set may include the at least one first codeword and the at least one second codeword, but does not include another codeword, that is, the first codeword set includes only the at least one first codeword and the at least one second codeword. Alternatively, the first codeword set may further include another codeword in addition to the at least one first codeword and the at least one second codeword.

With reference to the first aspect, in a possible implementation of the first aspect,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}, \frac{1}{2\sqrt{3}}\begin{bmatrix} 1 & 1 & 1 \\ 1 & -1 & 1 \\ j & j & -j \\ j & -j & -j \end{bmatrix},$$

$$\frac{1}{2\sqrt{3}}\begin{bmatrix} 1 & 1 & 1 \\ -1 & 1 & -1 \\ 1 & 1 & -1 \\ -1 & 1 & -1 \end{bmatrix}, \text{ or } \frac{1}{2\sqrt{3}}\begin{bmatrix} 1 & 1 & 1 \\ -1 & 1 & -1 \\ j & j & -j \\ -j & j & j \end{bmatrix}.$$

For example, the first codeword set may include at least one third codeword, and a quantity of at least one third codeword may be greater than or equal to 1. The first codeword is a 4×1 fully-coherent codeword, and the third codeword is a 4×3 fully-coherent codeword. That is, the first codeword set may include different types of fully-coherent codewords, so that the codeword included in the first codeword set can support transmission at more layers.

For example, the first codeword set may include the at least one first codeword and the at least one third codeword, but does not include another codeword, that is, the first codeword set includes only the at least one first codeword and the at least one third codeword. Alternatively, the first codeword set may further include another codeword, for example, the at least one second codeword, in addition to the at least one first codeword and the at least one third codeword.

With reference to the first aspect, in a possible implementation of the first aspect,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

The fourth codeword may be a non-coherent codeword. In addition to the fully-coherent codeword, the first codeword set may further include the non-coherent codeword, provided that the value of the power scaling factor corresponding to the fourth codeword included in the first codeword set is 1. Therefore, when the terminal device sends uplink data by using the fourth codeword included in the first codeword set, transmit power can reach rated maximum transmit power, to improve sending quality of the uplink data, and also improve transmit power utilization of the terminal device. It should be noted that, if the fourth codeword is included in the non-coherent codeword set but is not included in the first codeword set, a value of a power scaling factor corresponding to the fourth codeword may be 1/4. Alternatively, if the fourth codeword is included in both the non-coherent codeword set and the first codeword set, or is not included in the non-coherent codeword set but is included in the first codeword set, a value of a power scaling factor corresponding to the fourth codeword may be 1.

For example, the first codeword set may include the at least one first codeword and the at least one fourth codeword, but does not include another codeword, that is, the first codeword set includes only the at least one first codeword and the at least one fourth codeword. Alternatively, the first codeword set may further include another codeword, for example, the at least one second codeword or the at least one third codeword, in addition to the at least one first codeword and the at least one fourth codeword.

With reference to the first aspect, in a possible implementation of the first aspect, the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix} 1 \\ 0 \\ 1 \\ 0 \end{bmatrix} \text{ or } \frac{1}{2}\begin{bmatrix} 0 \\ 1 \\ 0 \\ 1 \end{bmatrix},$$

and a value of a power scaling factor corresponding to the fifth codeword included in the first codeword set is 1.

The fifth codeword may be a partially-coherent codeword. In addition to the fully-coherent codeword, the first codeword set may further include the partially-coherent codeword, provided that the value of the power scaling factor corresponding to the fifth codeword included in the first codeword set is 1/2 or 1. Therefore, when the terminal device sends uplink data by using the fifth codeword included in the first codeword set, transmit power can reach rated maximum transmit power, to improve sending quality of the uplink data, and also improve transmit power utilization of the terminal device. It should be noted that, if the fifth codeword is included in the partially-coherent codeword set but is not included in the first codeword set, a value of a power scaling factor corresponding to the fifth codeword may be 1/2. Alternatively, if the fifth codeword is included in both the partially-coherent codeword set and the first codeword set, or is not included in the partially-coherent codeword set but is included in the first codeword set, a value of a power scaling factor corresponding to the fifth codeword may be 1/2 or 1.

For example, the first codeword set may include the at least one first codeword and the at least one fifth codeword, but does not include another codeword, that is, the first codeword set includes only the at least one first codeword and the at least one fifth codeword. Alternatively, the first codeword set may further include another codeword, for example, the at least one second codeword, the at least one third codeword, or the at least one fourth codeword, in addition to the at least one first codeword and the at least one fifth codeword.

With reference to the first aspect, in a possible implementation of the first aspect, the method further includes:

The terminal device sends first capability indication information, where the first capability indication information is used to indicate that the terminal device supports a first codebook subset included in the first codeword set, and the first codebook subset is a codebook subset 1 or a codebook subset 2, where the codebook subset 1 includes the first codeword, the second codeword, and the third codeword; and the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the first aspect, in a possible implementation of the first aspect, the method further includes:

The terminal device sends first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword, the second codeword, and the third codeword;

the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

The first codeword set may include one or more codebook subsets, and the terminal device may determine, from the first codeword set, a codebook subset applicable to the terminal device. After selection, the terminal device may notify the network device of information about the selected codebook subset. Therefore, when selecting a codeword for the terminal device, the network device may select the codeword from the codebook subset, so that the codeword selected by the network device meets an actual capability of the terminal device as much as possible.

With reference to the first aspect, in a possible implementation of the first aspect, the codebook subset 2 further includes the at least one fourth codeword and/or a codeword $$\frac{1}{2}\begin{bmatrix}1&0&0\\0&1&0\\0&0&1\\0&0&0\end{bmatrix};$$

and/or the codebook subset 4 further includes the at least one fourth codeword and/or a codeword $$\frac{1}{2}\begin{bmatrix}1&0&0\\0&1&0\\0&0&1\\0&0&0\end{bmatrix},$$

and the fourth codeword is a codeword whose dimension is 4×2 in the first codeword set.

The codebook subset 2 may further include a non-coherent codeword, so that the codebook subset 2 can include a fully-coherent codeword, a partially-coherent codeword, and the non-coherent codeword. Types of the included codewords are comprehensive. The same is true for the codebook subset 4.

With reference to the first aspect, in a possible implementation of the first aspect, the method further includes:

The terminal device receives first DCI, where the first DCI is used to indicate to select a seventh codeword from the first codebook subset.

The terminal device sends, based on the seventh codeword, uplink data scheduled by using the first DCI.

For example, if the network device determines that the terminal device supports the first codebook subset, the network device may select a codeword from the first codebook subset as a codeword for sending the uplink data by the terminal device. For example, the network device selects the seventh codeword. The network device may indicate, by using the first DCI, the terminal device to select the seventh codeword. After receiving the first DCI, the terminal device may select the seventh codeword from the first codebook subset. The network device selects the seventh codeword based on the codebook subset supported by the terminal device, so that the selected seventh codeword can meet an actual capability of the terminal device.

Alternatively, the terminal device may not need to send the first capability indication information to the network device. In this case, the network device may send the first DCI to the terminal device, to indicate to select the seventh codeword from the first codebook subset. In this case, the network device may not know a capability of the terminal device, that is, does not know the codebook subset supported by the terminal device. Therefore, the network device may independently select a corresponding codebook subset as the first codebook subset, and select the seventh codeword from the codebook subset. For example, the network device may determine the first codebook subset based on empirical information (for example, the network device knows capabilities of a plurality of terminal devices covered by the network device. This may be used as empirical information). Alternatively, even in this case, the network device may select the first codebook subset based on a capability of the terminal device. For example, the codebook subset supported by the terminal device is known to the network device in advance. For example, the terminal device reports the codebook subset to the network device in another manner, or the network device learns of the codebook subset by using a core network device. In this case, the network device may select the first codebook subset based on the capability of the terminal device, to select the seventh codeword.

Alternatively, even if the terminal device sends the first capability indication information to the network device, the network device may not select the codebook subset based on a capability of the terminal device. In this case, the first codebook subset is not selected based on the capability of the terminal device.

In this manner, regardless of whether the network device knows the codebook subset supported by the terminal device, the network device may select a corresponding codeword for the terminal device, so that the terminal device can complete sending of the uplink data.

According to a second aspect, a second communications method is provided. The method includes: A network device determines a first codeword set, where the first codeword set includes a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{or } \frac{1}{2}\begin{bmatrix}1\\-j\\-1\\j\end{bmatrix}.$$

The method may be performed by a second communications apparatus. The second communications apparatus may be a communications device or a communications apparatus, for example, a chip system, that can support the communications device in implementing a function required in the method. For example, the second communications apparatus is a network device, a chip system that is disposed in the network device and that is configured to implement functions of the network device, or another component configured to implement functions of the network device.

With reference to the second aspect, in a possible implementation of the second aspect, the method further includes:

The network device receives coherent capability indication information, where the coherent capability indication information is used to indicate that a terminal device has a non-coherent capability.

The terminal device having the non-coherent capability supports a non-coherent codeword set, the non-coherent codeword set includes only at least one fourth codeword, and each column of the fourth codeword includes only one non-zero element.

With reference to the second aspect, in a possible implementation of the second aspect,
the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{or } \frac{1}{2\sqrt{2}}\begin{bmatrix}1&1\\-j&-j\\j&-j\\1&-1\end{bmatrix}.$$

With reference to the second aspect, in a possible implementation of the second aspect,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1&1&1\\1&-1&1\\1&1&-1\\1&-1&-1\end{bmatrix}, \frac{1}{2\sqrt{3}}\begin{bmatrix}1&1&1\\1&-1&1\\j&j&-j\\j&-j&-j\end{bmatrix},$$

$$\frac{1}{2\sqrt{3}}\begin{bmatrix}1&1&1\\-1&1&-1\\1&1&-1\\-1&1&-1\end{bmatrix}, \text{or } \frac{1}{2\sqrt{3}}\begin{bmatrix}1&1&1\\-1&1&-1\\j&j&-j\\-j&j&j\end{bmatrix}.$$

With reference to the second aspect, in a possible implementation of the second aspect,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

With reference to the second aspect, in a possible implementation of the second aspect, the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

With reference to the second aspect, in a possible implementation of the second aspect, the method further includes:

The network device receives first capability indication information, where the first capability indication information is used to indicate that the terminal device supports a first codebook subset included in the first codeword set, and the first codebook subset is a codebook subset 1 or a codebook subset 2, where the codebook subset 1 includes the first codeword, the second codeword, and the third codeword; and
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the second aspect, in a possible implementation of the second aspect, the method further includes:

The network device receives first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword, the second codeword, and the third codeword;
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the second aspect, in a possible implementation of the second aspect, the codebook subset 2 further includes the at least one fourth codeword and/or a codeword $$\frac{1}{2}\begin{bmatrix}1&0&0\\0&1&0\\0&0&1\\0&0&0\end{bmatrix};$$

and/or the codebook subset 4 further includes the at least one fourth codeword and/or a codeword $$\frac{1}{2}\begin{bmatrix}1&0&0\\0&1&0\\0&0&1\\0&0&0\end{bmatrix},$$

and the fourth codeword is a codeword whose dimension is 4×2 in the first codeword set.

With reference to the second aspect, in a possible implementation of the second aspect, the method further includes:

The network device sends first DCI, where the first DCI is used to indicate the terminal device to select a seventh codeword from the first codebook subset, and the seventh codeword is used to send uplink data scheduled by using the first DCI.

The network device receives, based on the seventh codeword, the uplink data scheduled by using the first DCI.

For technical effects achieved by the second aspect or the possible implementations of the second aspect, refer to the descriptions of the technical effects achieved by the first aspect or the possible implementations of the first aspect.

According to a third aspect, a third communications method is provided. The method includes: A terminal device determines a first codeword set, where the first codeword set includes at least one first codeword, and the at least one first codeword includes $$\left\{\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}\right\} \text{ or }$$

$$\left\{\frac{1}{2}\begin{bmatrix}1\\1\\1\\-1\end{bmatrix}, \frac{1}{2}\begin{bmatrix}1\\1\\j\\-j\end{bmatrix}, \frac{1}{2}\begin{bmatrix}1\\1\\-1\\1\end{bmatrix}, \frac{1}{2}\begin{bmatrix}1\\1\\-j\\j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}\right\}.$$

The method may be performed by a third communications apparatus. The third communications apparatus may be a communications device or a communications apparatus, for example, a chip system, that can support the communications device in implementing a function required in the method. For example, the third communications apparatus is a terminal apparatus. For example, the terminal apparatus is a terminal device, a chip system that is disposed in the terminal device and that is configured to implement functions of the terminal device, or another component configured to implement functions of the terminal device.

In this embodiment of this application, for example, the first codeword set determined by the terminal device may include at least one first codeword. The first codeword may be a 4×1 fully-coherent codeword. The terminal device sends uplink data to a network device by using the fully-coherent codeword, so that power for sending the uplink data can reach rated maximum transmit power, to improve sending quality of the uplink data, and also improve transmit power utilization of the terminal device.

With reference to the third aspect, in a possible implementation of the third aspect, the method further includes:

The terminal device sends coherent capability indication information, where the coherent capability indication information is used to indicate that the terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

The terminal device may send the coherent capability indication information of the terminal device to the network device, so that the network device can determine whether the terminal device is a terminal device having a fully-coherent capability, a terminal device having a partially-coherent capability, or a terminal device having a non-coherent capability. In this embodiment of this application, for example, the terminal device is the terminal device having the partially-coherent capability. Based on the coherent capability indication information, the network device may determine that the terminal device has the partially-coherent capability, or may determine that the terminal device supports the partially-coherent codeword set and the non-coherent codeword set. It can be learned that in this embodiment of this application, even the terminal device having the partially-coherent capability can send uplink data by using a fully-coherent codeword, so that power for sending the uplink data can reach rated maximum transmit power, to improve sending quality of the uplink data, and also improve transmit power utilization of the terminal device.

With reference to the third aspect, in a possible implementation of the third aspect, the first codeword set further includes at least one second codeword, and a value of a power scaling factor corresponding to the second codeword is 1; and/or the first codeword set further includes at least one third codeword, and a value of a power scaling factor corresponding to the third codeword is 1/2 or 1.

The second codeword is a non-coherent codeword. In addition to the fully-coherent codeword, the first codeword set may further include the non-coherent codeword, provided that the value of the power scaling factor corresponding to the second codeword included in the first codeword set is 1. Therefore, codewords included in the first codeword set are more abundant, and when the terminal device sends uplink data by using the second codeword included in the first codeword set, transmit power can reach rated maximum transmit power, to improve sending quality of the uplink data, and also improve transmit power utilization of the terminal device. It should be noted that, if the second codeword is included in the non-coherent codeword set but is not included in the first codeword set, a value of a power scaling factor corresponding to the second codeword may be 1/4. Alternatively, if the second codeword is included in both the non-coherent codeword set and the first codeword set, or is not included in the non-coherent codeword set but is included in the first codeword set, a value of a power scaling factor corresponding to the second codeword may be 1.

The third codeword is a partially-coherent codeword. In addition to the fully-coherent codeword, the first codeword set may further include the partially-coherent codeword, provided that the value of the power scaling factor corresponding to the third codeword included in the first codeword set is 1/2 or 1. Therefore, codewords included in the first codeword set are more abundant, and when the terminal device sends uplink data by using the third codeword included in the first codeword set, transmit power can reach rated maximum transmit power, to improve sending quality of the uplink data, and also improve transmit power utilization of the terminal device. It should be noted that, if the third codeword is included in the non-coherent codeword set but is not included in the first codeword set, a value of a power scaling factor corresponding to the third codeword may be 1/2. Alternatively, if the third codeword is included in both the non-coherent codeword set and the first codeword set, or is not included in the non-coherent codeword set but is included in the first codeword set, a value of a power scaling factor corresponding to the third codeword may be 1/2 or 1.

For example, the first codeword set may include the at least one first codeword and the at least one second codeword, but does not include another codeword, that is, the first codeword set includes only the at least one first codeword and the at least one second codeword. Alternatively, the first codeword set may further include another codeword, for example, the at least one third codeword, in addition to the at least one first codeword and the at least one second codeword.

For example, the first codeword set may include the at least one first codeword and the at least one third codeword, but does not include another codeword, that is, the first codeword set includes only the at least one first codeword and the at least one third codeword. Alternatively, the first codeword set may further include another codeword, for example, the at least one second codeword, in addition to the at least one first codeword and the at least one third codeword.

With reference to the third aspect, in a possible implementation of the third aspect, the method further includes:

The terminal device sends first capability indication information, where the first capability indication information is used to indicate that the terminal device supports a first codebook subset included in the first codeword set, and the first codebook subset is a codebook subset 1 or a codebook subset 2, where the codebook subset 1 includes the first codeword; and the codebook subset 2 includes the first codeword and the at least one third codeword.

With reference to the third aspect, in a possible implementation of the third aspect, the method further includes:

The terminal device sends first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

The first codeword set may include one or more codebook subsets, and the terminal device may determine, from the first codeword set, a codebook subset applicable to the terminal device. After selection, the terminal device may notify the network device of information about the selected codebook subset. Therefore, when selecting a codeword for the terminal device, the network device may select the codeword from the codebook subset, so that the codeword selected by the network device meets an actual capability of the terminal device as much as possible.

With reference to the third aspect, in a possible implementation of the third aspect, the method further includes:

The terminal device receives first DCI, where the first DCI is used to indicate to select a fourth codeword from the first codebook subset.

The terminal device sends, based on the fourth codeword, uplink data scheduled by using the first DCI.

For example, if the network device determines that the terminal device supports the first codebook subset, the network device may select a codeword from the first codebook subset as a codeword for sending the uplink data by the terminal device. For example, the network device selects the fourth codeword. The network device may indicate, by using the first DCI, the terminal device to select the fourth codeword. After receiving the first DCI, the terminal device may select the fourth codeword from the first codebook subset. The network device selects a fourth codeword based on the codebook subset supported by the terminal device, so that the selected fourth codeword can meet an actual capability of the terminal device.

Alternatively, the terminal device may not need to send the first capability indication information to the network device. In this case, the network device may send the first DCI to the terminal device, to indicate to select the fourth codeword from the first codebook subset. In this case, the network device may not know a capability of the terminal device, that is, does not know the codebook subset supported by the terminal device. Therefore, the network device may independently select a corresponding codebook subset as the first codebook subset, and select the fourth codeword from the codebook subset. For example, the network device may determine the first codebook subset based on empirical information (for example, the network device knows capabilities of a plurality of terminal devices covered by the network device. This may be used as empirical information). Alternatively, even in this case, the network device may select the first codebook subset based on a capability of the terminal device. For example, the codebook subset supported by the terminal device is known to the network device in advance. For example, the terminal device reports the codebook subset to the network device in another manner, or the network device learns of the codebook subset by using a core network device. In this case, the network device may select the first codebook subset based on the capability of the terminal device, to select the fourth codeword.

Alternatively, even if the terminal device sends the first capability indication information to the network device, the network device may not select the codebook subset based on a capability of the terminal device. In this case, the first codebook subset is not selected based on the capability of the terminal device.

In this manner, regardless of whether the network device knows the codebook subset supported by the terminal device, the network device may select a corresponding codeword for the terminal device, so that the terminal device can complete sending of the uplink data.

According to a fourth aspect, a fourth communications method is provided. The method includes: A network device determines a first codeword set, where the first codeword set includes at least one first codeword, and the at least one first codeword includes $$\left\{\frac{1}{2}\begin{bmatrix}1\\1\\1\\1\end{bmatrix},\frac{1}{2}\begin{bmatrix}1\\1\\j\\j\end{bmatrix},\frac{1}{2}\begin{bmatrix}1\\1\\-1\\-1\end{bmatrix},\frac{1}{2}\begin{bmatrix}1\\1\\-j\\-j\end{bmatrix}\right\}\text{ or}$$

$$\left\{,\frac{1}{2}\begin{bmatrix}1\\1\\1\\-1\end{bmatrix},\frac{1}{2}\begin{bmatrix}1\\1\\j\\j\end{bmatrix},\frac{1}{2}\begin{bmatrix}1\\1\\-1\\1\end{bmatrix},\frac{1}{2}\begin{bmatrix}1\\1\\-j\\-j\end{bmatrix},\frac{1}{2}\begin{bmatrix}1\\j\\1\\j\end{bmatrix},\frac{1}{2}\begin{bmatrix}1\\j\\j\\1\end{bmatrix},\frac{1}{2}\begin{bmatrix}1\\j\\-1\\-j\end{bmatrix},\frac{1}{2}\begin{bmatrix}1\\j\\-j\\-1\end{bmatrix}\right\}.$$

The method may be performed by a fourth communications apparatus. The fourth communications apparatus may be a communications device or a communications apparatus that can support the communications device in implementing a function required in the method, for example, a chip system. For example, the fourth communications apparatus is the network device, a chip system that is disposed in the network device and that is configured to implement functions of the network device, or another component configured to implement functions of the network device.

With reference to the fourth aspect, in a possible implementation of the fourth aspect, the method further includes:

The network device receives coherent capability indication information, where the coherent capability indication information is used to indicate that a terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

With reference to the fourth aspect, in a possible implementation of the fourth aspect,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

With reference to the fourth aspect, in a possible implementation of the fourth aspect, the method further includes:

The network device receives first capability indication information, where the first capability indication information is used to indicate that the terminal device supports a first codebook subset included in the first codeword set, and the first codebook subset includes a codebook subset 1 or a codebook subset 2, where the codebook subset 1 includes the first codeword; and
the codebook subset 2 includes the first codeword and the at least one third codeword.

With reference to the fourth aspect, in a possible implementation of the fourth aspect, the method further includes:

The network device receives first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword;

the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

With reference to the fourth aspect, in a possible implementation of the fourth aspect, the method further includes:

The network device sends first DCI, where the first DCI is used to indicate the terminal device to select a fourth codeword from the first codebook subset, and the fourth codeword is used to send uplink data scheduled by using the first DCI.

The network device receives, based on the fourth codeword, the uplink data scheduled by using the first DCI.

For technical effects achieved by the fourth aspect or the possible implementations of the fourth aspect, refer to the descriptions of the technical effects achieved by the third aspect or the possible implementations of the third aspect.

According to a fifth aspect, a communications apparatus is provided. For example, the communications apparatus is a communications device. The communications device is configured to perform the method according to any one of the first aspect or the possible implementations of the first aspect. Specifically, the communications device may include a module configured to perform the method according to any one of the first aspect or the possible implementations of the first aspect, for example, include a processing module. Optionally, the communications device may further include a transceiver module. For example, the communications device is the terminal device described above.

The processing module is configured to determine a first codeword set, where the first codeword set includes a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{or } \begin{bmatrix}1\\-j\\-1\\j\end{bmatrix}.$$

With reference to the fifth aspect, in a possible implementation of the fifth aspect, the transceiver module is configured to send coherent capability indication information, where the coherent capability indication information is used to indicate that the terminal device has a non-coherent capability.

The terminal device having the non-coherent capability supports a non-coherent codeword set, the non-coherent codeword set includes only at least one fourth codeword, and each column of the fourth codeword includes only one non-zero element.

With reference to the fifth aspect, in a possible implementation of the fifth aspect, the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix},$$

$$\frac{1}{2\sqrt{2}}\begin{bmatrix}1&1\\j&j\\j&-j\\-1&1\end{bmatrix}, \frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix},$$

$$\frac{1}{2\sqrt{2}}\begin{bmatrix}1&1\\-j&-j\\1&-1\\-j&j\end{bmatrix}, \text{or } \frac{1}{2\sqrt{2}}\begin{bmatrix}1&1\\-j&-j\\j&-j\\1&-1\end{bmatrix}.$$

With reference to the fifth aspect, in a possible implementation of the fifth aspect, the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1&1&1\\1&-1&1\\1&1&-1\\1&-1&-1\end{bmatrix}, \frac{1}{2\sqrt{3}}\begin{bmatrix}1&1&1\\1&-1&1\\j&j&-j\\j&-j&-j\end{bmatrix},$$

$$\frac{1}{2\sqrt{3}}\begin{bmatrix}1&1&1\\-1&1&-1\\1&1&-1\\-1&1&1\end{bmatrix}, \text{or } \frac{1}{2\sqrt{3}}\begin{bmatrix}1&1&1\\-1&1&-1\\j&j&-j\\-j&j&j\end{bmatrix}.$$

With reference to the fifth aspect, in a possible implementation of the fifth aspect, the first codeword set further includes at least one fourth codeword, and a quantity of columns of the fourth codeword included in the first codeword set is not greater than 3; and
a value of a power scaling factor corresponding to the fourth codeword included in the first codeword set is 1.

With reference to the fifth aspect, in a possible implementation of the fifth aspect, the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

With reference to the fifth aspect, in a possible implementation of the fifth aspect, the transceiver module is further configured to send first capability indication information, where the first capability indication information is used to indicate that the terminal device supports a first codebook subset included in the first codeword set, and the first codebook subset includes a codebook subset 1 or a codebook subset 2, where the codebook subset 1 includes the first codeword, the second codeword, and the third codeword; and the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the fifth aspect, in a possible implementation of the fifth aspect, the transceiver module is further configured to send first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword, the second codeword, and the third codeword;

the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the fifth aspect, in a possible implementation of the fifth aspect, the codebook subset 2 further includes the at least one fourth codeword and/or a codeword, $$\frac{1}{2}\begin{bmatrix}1&0&0\\0&1&0\\0&0&1\\0&0&0\end{bmatrix};$$

and/or the codebook subset 4 further includes the at least one fourth codeword and/or a codeword $$\frac{1}{2}\begin{bmatrix}1&0&0\\0&1&0\\0&0&1\\0&0&0\end{bmatrix},$$

and the fourth codeword is a codeword whose dimension is 4×2 in the first codeword set.

With reference to the fifth aspect, in a possible implementation of the fifth aspect, the transceiver module is further configured to:

receive first DCI, where the first DCI is used to indicate to select a seventh codeword from the first codebook subset; and send, based on the seventh codeword, uplink data scheduled by using the first DCI.

For technical effects achieved by the fifth aspect or the possible implementations of the fifth aspect, refer to the descriptions of the technical effects achieved by the first aspect or the possible implementations of the first aspect.

According to a sixth aspect, a communications apparatus is provided. For example, the communications apparatus is a communications device. The communications device is configured to perform the method according to any one of the second aspect or the possible implementations of the second aspect. Specifically, the communications device may include a module configured to perform the method according to any one of the second aspect or the possible implementations of the second aspect, for example, include a processing module. Optionally, the communications device may further include a transceiver module. For example, the communications device is the network device described above.

The processing module is configured to determine a first codeword set, where the first codeword set includes a first codeword, the first codeword is a 4×1 matrix, and each element in the matrix is a non-zero element; and the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix},$$

$$\frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ or } \frac{1}{2}\begin{bmatrix}1\\-j\\-1\\j\end{bmatrix}.$$

With reference to the sixth aspect, in a possible implementation of the sixth aspect, the transceiver module is configured to receive coherent capability indication information, where the coherent capability indication information is used to indicate that a terminal device has a non-coherent capability.

The terminal device having the non-coherent capability supports a non-coherent codeword set, the non-coherent codeword set includes only at least one fourth codeword, and each column of the fourth codeword includes only one non-zero element.

With reference to the sixth aspect, in a possible implementation of the sixth aspect, the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix}1 & 1\\1 & 1\\1 & -1\\1 & -1\end{bmatrix}, \frac{1}{2\sqrt{2}}\begin{bmatrix}1 & 1\\1 & 1\\j & -j\\j & -j\end{bmatrix}, \frac{1}{2\sqrt{2}}\begin{bmatrix}1 & 1\\j & j\\1 & -1\\j & -j\end{bmatrix},$$

$$\frac{1}{2\sqrt{2}}\begin{bmatrix}1 & 1\\j & j\\j & -j\\-1 & 1\end{bmatrix}, \frac{1}{2\sqrt{2}}\begin{bmatrix}1 & 1\\-1 & -1\\1 & -1\\-1 & 1\end{bmatrix}, \frac{1}{2\sqrt{2}}\begin{bmatrix}1 & 1\\-1 & -1\\j & -j\\-j & j\end{bmatrix},$$

$$\frac{1}{2\sqrt{2}}\begin{bmatrix}1 & 1\\-j & -j\\1 & -1\\-j & j\end{bmatrix}, \text{ or } \frac{1}{2\sqrt{2}}\begin{bmatrix}1 & 1\\-j & -j\\j & -j\\1 & -1\end{bmatrix}.$$

With reference to the sixth aspect, in a possible implementation of the sixth aspect, the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1 & 1 & 1\\1 & -1 & 1\\1 & 1 & -1\\1 & -1 & -1\end{bmatrix}, \frac{1}{2\sqrt{3}}\begin{bmatrix}1 & 1 & 1\\1 & -1 & 1\\j & j & -j\\j & -j & -j\end{bmatrix},$$

$$\frac{1}{2\sqrt{3}}\begin{bmatrix}1 & 1 & 1\\-1 & 1 & -1\\1 & 1 & -1\\-1 & 1 & 1\end{bmatrix}, \text{ or } \frac{1}{2\sqrt{3}}\begin{bmatrix}1 & 1 & 1\\-1 & 1 & -1\\j & j & -j\\-j & j & j\end{bmatrix}.$$

With reference to the sixth aspect, in a possible implementation of the sixth aspect,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

With reference to the sixth aspect, in a possible implementation of the sixth aspect,
the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

With reference to the sixth aspect, in a possible implementation of the sixth aspect,
the transceiver module is further configured to receive first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword, the second codeword, and the third codeword; and
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the sixth aspect, in a possible implementation of the sixth aspect,
the transceiver module is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword, the second codeword, and the third codeword;
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the sixth aspect, in a possible implementation of the sixth aspect,
the codebook subset 2 further includes the at least one fourth codeword and/or a codeword $$\frac{1}{2}\begin{bmatrix}1&0&0\\0&1&0\\0&0&1\\0&0&0\end{bmatrix};$$

and/or
the codebook subset 4 further includes the at least one fourth codeword and/or a codeword $$\frac{1}{2}\begin{bmatrix}1&0&0\\0&1&0\\0&0&1\\0&0&0\end{bmatrix},$$

and the fourth codeword is a codeword whose dimension is 4×2 in the first codeword set.

With reference to the sixth aspect, in a possible implementation of the sixth aspect, the transceiver module is further configured to:
send first DCI, where the first DCI is used to indicate the terminal device to select a seventh codeword from the first codebook subset, and the seventh codeword is used to send uplink data scheduled by using the first DCI; and
receive, based on the seventh codeword, the uplink data scheduled by using the first DCI.

For technical effects achieved by the sixth aspect or the possible implementations of the sixth aspect, refer to the descriptions of the technical effects achieved by the second aspect or the possible implementations of the second aspect.

According to a seventh aspect, a communications apparatus is provided. For example, the communications apparatus is a communications device. The communications device is configured to perform the method according to any one of the third aspect or the possible implementations of the third aspect. Specifically, the communications device may include a module configured to perform the method according to any one of the third aspect or the possible implementations of the third aspect, for example, include a processing module. Optionally, the communications device may further include a transceiver module. For example, the communications device is the terminal device described above.

The processing module is configured to determine a first codeword set, where the first codeword set includes at least one first codeword, and the at least one first codeword includes $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\}$$

or $\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \right.$ $$\left. \frac{1}{2}\begin{bmatrix}1\\j\\-j\\-1\end{bmatrix} \right\}.$$

With reference to the seventh aspect, in a possible implementation of the seventh aspect,
the transceiver module is configured to send coherent capability indication information, where the coherent capability indication information is used to indicate that the terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

With reference to the seventh aspect, in a possible implementation of the seventh aspect,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

With reference to the seventh aspect, in a possible implementation of the seventh aspect,
the transceiver module is further configured to send first capability indication information, where the first capability indication information is used to indicate that the terminal device supports a first codebook subset included in the first codeword set, and the first codebook subset includes a codebook subset 1 or a codebook subset 2, where the codebook subset 1 includes the first codeword; and
the codebook subset 2 includes the first codeword and the at least one third codeword.

With reference to the seventh aspect, in a possible implementation of the seventh aspect,
the transceiver module is further configured to send first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

With reference to the seventh aspect, in a possible implementation of the seventh aspect, the transceiver module is further configured to:
receive first DCI, where the first DCI is used to indicate to select a fourth codeword from the first codebook subset; and
send, based on the fourth codeword, uplink data scheduled by using the first DCI.

For technical effects achieved by the seventh aspect or the possible implementations of the seventh aspect, refer to the descriptions of the technical effects achieved by the third aspect or the possible implementations of the third aspect.

According to an eighth aspect, a communications apparatus is provided. For example, the communications apparatus is a communications device. The communications device is configured to perform the method according to any one of the fourth aspect or the possible implementations of the fourth aspect. Specifically, the communications device may include a module configured to perform the method according to any one of the fourth aspect or the possible implementations of the fourth aspect, for example, include a processing module. Optionally, the communications device may further include a transceiver module. For example, the communications device is the network device described above.

The processing module is configured to determine a first codeword set, where the first codeword set includes at least one first codeword, and the at least one first codeword includes $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\}$$

$$\text{or } \left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \right.$$

$$\left. \frac{1}{2}\begin{bmatrix}1\\j\\-1\\-1\end{bmatrix} \right\}.$$

With reference to the eighth aspect, in a possible implementation of the eighth aspect,
the transceiver module is configured to receive coherent capability indication information, where the coherent capability indication information is used to indicate that a terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

With reference to the eighth aspect, in a possible implementation of the eighth aspect,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

With reference to the eighth aspect, in a possible implementation of the eighth aspect,
the transceiver module is further configured to receive first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword; and
the codebook subset 2 includes the first codeword and the at least one third codeword.

With reference to the eighth aspect, in a possible implementation of the eighth aspect,
the transceiver module is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

With reference to the eighth aspect, in a possible implementation of the eighth aspect, the transceiver module is further configured to:
send first DCI, where the first DCI is used to indicate the terminal device to select a fourth codeword from the first codebook subset, and the fourth codeword is used to send uplink data scheduled by using the first DCI; and
receive, based on the fourth codeword, the uplink data scheduled by using the first DCI.

For technical effects achieved by the eighth aspect or the possible implementations of the eighth aspect, refer to the descriptions of the technical effects achieved by the fourth aspect or the possible implementations of the fourth aspect.

According to a ninth aspect, a communications apparatus is provided. The communications apparatus includes a processor, and optionally, may further include a transceiver. The processor and the transceiver are coupled to each other, and are configured to implement the method according to the first aspect or the possible implementations of the first aspect. For example, the communications apparatus is a communications device. Alternatively, for example, the communications apparatus is a chip disposed in a communications device. For example, the communications device is a terminal device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine a first codeword set, where the first codeword set includes a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\-1\\-j\end{bmatrix}, \text{ or } \frac{1}{2}\begin{bmatrix}1\\-j\\-1\\j\end{bmatrix}.$$

With reference to the ninth aspect, in a possible implementation of the ninth aspect,
the transceiver is configured to send coherent capability indication information, where the coherent capability indication information is used to indicate that the terminal device has a non-coherent capability.

The terminal device having the non-coherent capability supports a non-coherent codeword set, the non-coherent codeword set includes only at least one fourth codeword, and each column of the fourth codeword includes only one non-zero element.

With reference to the ninth aspect, in a possible implementation of the ninth aspect,
the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix}1 & 1\\1 & 1\\1 & -1\\1 & -1\end{bmatrix}, \frac{1}{2\sqrt{2}}\begin{bmatrix}1 & 1\\1 & 1\\j & -j\\j & -j\end{bmatrix}, \frac{1}{2\sqrt{2}}\begin{bmatrix}1 & 1\\j & j\\1 & -1\\j & -j\end{bmatrix},$$

$$\frac{1}{2\sqrt{2}}\begin{bmatrix}1 & 1\\j & j\\j & -j\\-1 & 1\end{bmatrix}, \frac{1}{2\sqrt{2}}\begin{bmatrix}1 & 1\\-1 & -1\\1 & -1\\-1 & 1\end{bmatrix}, \frac{1}{2\sqrt{2}}\begin{bmatrix}1 & 1\\-1 & -1\\j & -j\\-j & j\end{bmatrix},$$

$$\frac{1}{2\sqrt{2}}\begin{bmatrix}1 & 1\\-j & -j\\1 & -1\\-j & j\end{bmatrix}, \text{ or } \frac{1}{2\sqrt{2}}\begin{bmatrix}1 & 1\\-j & -j\\j & -j\\1 & -1\end{bmatrix}.$$

With reference to the ninth aspect, in a possible implementation of the ninth aspect,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1 & 1 & 1\\1 & -1 & 1\\1 & 1 & -1\\1 & -1 & -1\end{bmatrix},$$

$$\frac{1}{2\sqrt{3}}\begin{bmatrix}1 & 1 & 1\\1 & -1 & 1\\j & j & -j\\j & -j & -j\end{bmatrix}, \frac{1}{2\sqrt{3}}\begin{bmatrix}1 & 1 & 1\\-1 & 1 & -1\\1 & 1 & -1\\-1 & 1 & 1\end{bmatrix}, \text{ or } \frac{1}{2\sqrt{3}}\begin{bmatrix}1 & 1 & 1\\-1 & 1 & -1\\j & j & -j\\-j & j & j\end{bmatrix}.$$

With reference to the ninth aspect, in a possible implementation of the ninth aspect,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

With reference to the ninth aspect, in a possible implementation of the ninth aspect,
the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

With reference to the ninth aspect, in a possible implementation of the ninth aspect,
the transceiver is further configured to send first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword, the second codeword, and the third codeword; and
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the ninth aspect, in a possible implementation of the ninth aspect,
the transceiver is further configured to send first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword, the second codeword, and the third codeword;
the codebook subset 2 includes the first codeword, the second codeword, the third codeword, $$\frac{1}{2}\begin{bmatrix}1\\0\\1\\0\end{bmatrix}, \text{and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and
the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{and } \frac{1}{2}\begin{bmatrix}0\\1\\0\\1\end{bmatrix}.$$

With reference to the ninth aspect, in a possible implementation of the ninth aspect,
the codebook subset 2 further includes the at least one fourth codeword and/or a codeword $$\frac{1}{2}\begin{bmatrix}1&0&0\\0&1&0\\0&0&1\\0&0&0\end{bmatrix};$$

and/or
the codebook subset 4 further includes the at least one fourth codeword and/or a codeword $$\frac{1}{2}\begin{bmatrix}1&0&0\\0&1&0\\0&0&1\\0&0&0\end{bmatrix},$$

and the fourth codeword is a codeword whose dimension is 4×2 in the first codeword set.

With reference to the ninth aspect, in a possible implementation of the ninth aspect, the transceiver is further configured to:
receive first DCI, where the first DCI is used to indicate to select a seventh codeword from the first codebook subset; and
send, based on the seventh codeword, uplink data scheduled by using the first DCI.

For technical effects achieved by the ninth aspect or the possible implementations of the ninth aspect, refer to the descriptions of the technical effects achieved by the first aspect or the possible implementations of the first aspect.

According to a tenth aspect, a communications apparatus is provided. The communications apparatus includes a processor, and optionally, may further include a transceiver. The processor and the transceiver are coupled to each other, and are configured to implement the method according to the second aspect or the possible implementations of the second aspect. For example, the communications apparatus is a communications device. Alternatively, for example, the communications apparatus is a chip disposed in a communications device. For example, the communications device is a network device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine a first codeword set, where the first codeword set includes a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix},$$

$$\frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{or } \frac{1}{2}\begin{bmatrix}1\\-j\\-1\\j\end{bmatrix}.$$

With reference to the tenth aspect, in a possible implementation of the tenth aspect,
the transceiver is configured to receive coherent capability indication information, where the coherent capability indication information is used to indicate that a terminal device has a non-coherent capability.
The terminal device having the non-coherent capability supports a non-coherent codeword set, the non-coherent codeword set includes only at least one fourth codeword, and each column of the fourth codeword includes only one non-zero element.

With reference to the tenth aspect, in a possible implementation of the tenth aspect,
the first codeword set further includes a second codeword, the second codeword is a 4×2 matrix, and each element in the second codeword is a non-zero element; and the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix},$$

$$\frac{1}{2\sqrt{2}}\begin{bmatrix}1&1\\j&j\\j&-j\\-1&1\end{bmatrix}, \frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix},$$

$$\frac{1}{2\sqrt{2}}\begin{bmatrix}1&1\\-j&-j\\1&-1\\-j&j\end{bmatrix}, \text{ or } \frac{1}{2\sqrt{2}}\begin{bmatrix}1&1\\-j&-j\\j&-j\\1&-1\end{bmatrix}.$$

With reference to the tenth aspect, in a possible implementation of the tenth aspect,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1&1&1\\1&-1&1\\1&1&-1\\1&-1&-1\end{bmatrix}, \frac{1}{2\sqrt{3}}\begin{bmatrix}1&1&1\\1&-1&1\\j&j&-j\\j&-j&-j\end{bmatrix}, \frac{1}{2\sqrt{3}}\begin{bmatrix}1&1&1\\-1&1&-1\\1&1&-1\\-1&1&1\end{bmatrix}, \text{ or}$$

$$\frac{1}{2\sqrt{3}}\begin{bmatrix}1&1&1\\-1&1&-1\\j&j&-j\\-j&j&j\end{bmatrix}.$$

With reference to the tenth aspect, in a possible implementation of the tenth aspect,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

With reference to the tenth aspect, in a possible implementation of the tenth aspect,
the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

With reference to the tenth aspect, in a possible implementation of the tenth aspect,
the transceiver is further configured to receive first capability indication information, where the first capability indication information is used to indicate that the terminal device supports a first codebook subset included in the first codeword set, and the first codebook subset includes a codebook subset 1 or a codebook subset 2, where the codebook subset 1 includes the first codeword, the second codeword, and the third codeword; and the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the tenth aspect, in a possible implementation of the tenth aspect, the transceiver is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword, the second codeword, and the third codeword;

the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

With reference to the tenth aspect, in a possible implementation of the tenth aspect, the codebook subset 2 further includes the at least one fourth codeword and/or a codeword $$\frac{1}{2}\begin{bmatrix} 1 & 0 & 0 \\ 0 & 1 & 0 \\ 0 & 0 & 1 \\ 0 & 0 & 0 \end{bmatrix};$$

and/or the codebook subset 4 further includes the at least one fourth codeword and/or a codeword $$\frac{1}{2}\begin{bmatrix} 1 & 0 & 0 \\ 0 & 1 & 0 \\ 0 & 0 & 1 \\ 0 & 0 & 0 \end{bmatrix},$$

and the fourth codeword is a codeword whose dimension is 4×2 in the first codeword set.

With reference to the tenth aspect, in a possible implementation of the tenth aspect, the transceiver is further configured to:

send first DCI, where the first DCI is used to indicate the terminal device to select a seventh codeword from the first codebook subset, and the seventh codeword is used to send uplink data scheduled by using the first DCI; and receive, based on the seventh codeword, the uplink data scheduled by using the first DCI.

For technical effects achieved by the tenth aspect or the possible implementations of the tenth aspect, refer to the descriptions of the technical effects achieved by the second aspect or the possible implementations of the second aspect.

According to an eleventh aspect, a communications apparatus is provided. The communications apparatus includes a processor, and optionally, may further include a transceiver. The processor and the transceiver are coupled to each other, and are configured to implement the method according to the second aspect or the possible implementations of the second aspect. For example, the communications apparatus is a communications device. Alternatively, for example, the communications apparatus is a chip disposed in a communications device. For example, the communications device is a terminal device. For example, the transceiver is implemented by using an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to receive and send information by using the radio frequency transceiver component.

The processor is configured to determine a first codeword set, where the first codeword set includes at least one first codeword, and the at least one first codeword includes $$\left\{ \frac{1}{2}\begin{bmatrix} 1 \\ 1 \\ 1 \\ 1 \end{bmatrix}, \frac{1}{2}\begin{bmatrix} 1 \\ 1 \\ 1 \\ j \end{bmatrix}, \frac{1}{2}\begin{bmatrix} 1 \\ 1 \\ -1 \\ -1 \end{bmatrix}, \frac{1}{2}\begin{bmatrix} 1 \\ 1 \\ -j \\ -j \end{bmatrix} \right\} \text{ or}$$

-continued $$\left\{ \frac{1}{2}\begin{bmatrix} 1 \\ 1 \\ 1 \\ -1 \end{bmatrix}, \frac{1}{2}\begin{bmatrix} 1 \\ 1 \\ j \\ j \end{bmatrix}, \frac{1}{2}\begin{bmatrix} 1 \\ 1 \\ -1 \\ 1 \end{bmatrix}, \frac{1}{2}\begin{bmatrix} 1 \\ 1 \\ -j \\ -j \end{bmatrix}, \frac{1}{2}\begin{bmatrix} 1 \\ j \\ 1 \\ j \end{bmatrix}, \frac{1}{2}\begin{bmatrix} 1 \\ j \\ j \\ 1 \end{bmatrix}, \frac{1}{2}\begin{bmatrix} 1 \\ j \\ -1 \\ -j \end{bmatrix}, \frac{1}{2}\begin{bmatrix} 1 \\ j \\ -j \\ -1 \end{bmatrix} \right\}.$$

With reference to the eleventh aspect, in a possible implementation of the eleventh aspect, the transceiver is configured to send coherent capability indication information, where the coherent capability indication information is used to indicate that the terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

With reference to the eleventh aspect, in a possible implementation of the eleventh aspect, the first codeword set further includes at least one second codeword, and a value of a power scaling factor corresponding to the second codeword is 1; and/or the first codeword set further includes at least one third codeword, and a value of a power scaling factor corresponding to the third codeword is 1.

With reference to the eleventh aspect, in a possible implementation of the eleventh aspect, the transceiver is further configured to send first capability indication information, where the first capability indication information is used to indicate that the terminal device supports a first codebook subset included in the first codeword set, and the first codebook subset includes a codebook subset 1 or a codebook subset 2, where the codebook subset 1 includes the first codeword; and
the codebook subset 2 includes the first codeword and the at least one third codeword.

With reference to the eleventh aspect, in a possible implementation of the eleventh aspect, the transceiver is further configured to send first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

With reference to the eleventh aspect, in a possible implementation of the eleventh aspect, the transceiver is further configured to:

receive first DCI, where the first DCI is used to indicate to select a fourth codeword from the first codebook subset; and send, based on the fourth codeword, uplink data scheduled by using the first DCI.

For technical effects achieved by the eleventh aspect or the possible implementations of the eleventh aspect, refer to the descriptions of the technical effects achieved by the third aspect or the possible implementations of the third aspect.

According to a twelfth aspect, a communications apparatus is provided. The communications apparatus includes a processor, and optionally, may further include a transceiver. The processor and the transceiver are coupled to each other, and are configured to implement the method according to the second aspect or the possible implementations of the second aspect. For example, the communications apparatus is a communications device. Alternatively, for example, the communications apparatus is a chip disposed in a communications device. For example, the communications device is a network device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine a first codeword set, where the first codeword set includes at least one first codeword, and the at least one first codeword includes $$\left\{\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}\right\} \text{ or}$$

$$\left\{\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}\right\}.$$

With reference to the twelfth aspect, in a possible implementation of the twelfth aspect,
the transceiver is configured to receive coherent capability indication information, where the coherent capability indication information is used to indicate that a terminal device has a partially-coherent capability.

The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

With reference to the twelfth aspect, in a possible implementation of the twelfth aspect,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

With reference to the twelfth aspect, in a possible implementation of the twelfth aspect,
the transceiver is further configured to receive first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword; and
the codebook subset 2 includes the first codeword and the at least one third codeword.

With reference to the twelfth aspect, in a possible implementation of the twelfth aspect,
the transceiver is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

With reference to the twelfth aspect, in a possible implementation of the twelfth aspect, the transceiver is further configured to:
send first DCI, where the first DCI is used to indicate the terminal device to select a fourth codeword from the first codebook subset, and the fourth codeword is used to send uplink data scheduled by using the first DCI; and
receive, based on the fourth codeword, the uplink data scheduled by using the first DCI.

For technical effects achieved by the twelfth aspect or the possible implementations of the twelfth aspect, refer to the descriptions of the technical effects achieved by the fourth aspect or the possible implementations of the fourth aspect.

According to a thirteenth aspect, a communications apparatus is provided. The communications apparatus may perform functions of the terminal device in the method designs. For example, the communications apparatus is a chip disposed in a communications device. For example, the communications device is a terminal device. The communications apparatus includes: a memory, configured to store computer-executable program code; and a processor, where the processor is coupled to the memory. The program code stored in the memory includes instructions. When the processor executes the instructions, the communications apparatus is enabled to perform the method according to any one of the first aspect or the possible implementations of the first aspect.

The communications apparatus may further include a communications interface. The communications interface may be a transceiver in the communications device, for example, implemented by using an antenna, a feeder, a codec, and the like in the communications apparatus. Alternatively, if the communications apparatus is the chip disposed in the communications device, the communications interface may be an input/output interface in the chip, for example, an input/output pin.

According to a fourteenth aspect, a communications apparatus is provided. The communications apparatus may perform functions of the terminal device in the method designs. For example, the communications apparatus is a chip disposed in a communications device. For example, the communications device is a network device. The communications apparatus includes: a memory, configured to store computer-executable program code; and a processor, where the processor is coupled to the memory. The program code stored in the memory includes instructions. When the processor executes the instructions, the communications apparatus is enabled to perform the method according to any one of the second aspect or the possible implementations of the second aspect.

The communications apparatus may further include a communications interface. The communications interface may be a transceiver in the communications device, for example, implemented by using an antenna, a feeder, a codec, and the like in the communications apparatus. Alternatively, if the communications apparatus is the chip disposed in the communications device, the communications interface may be an input/output interface in the chip, for example, an input/output pin.

According to a fifteenth aspect, a communications apparatus is provided. The communications apparatus may perform functions of the terminal device in the method designs. For example, the communications apparatus is a chip disposed in a communications device. For example, the communications device is a terminal device. The communications apparatus includes: a memory, configured to store computer-executable program code; and a processor, where the processor is coupled to the memory. The program code stored in the memory includes instructions. When the processor executes the instructions, the communications apparatus is enabled to perform the method according to any one of the third aspect or the possible implementations of the third aspect.

The communications apparatus may further include a communications interface. The communications interface may be a transceiver in the communications device, for example, implemented by using an antenna, a feeder, a codec, and the like in the communications apparatus. Alternatively, if the communications apparatus is the chip disposed in the communications device, the communications interface may be an input/output interface in the chip, for example, an input/output pin.

According to a sixteenth aspect, a communications apparatus is provided. The communications apparatus may perform functions of the terminal device in the method designs. For example, the communications apparatus is a chip disposed in a communications device. For example, the communications device is a network device. The communications apparatus includes: a memory, configured to store computer-executable program code; and a processor, where the processor is coupled to the memory. The program code stored in the memory includes instructions. When the processor executes the instructions, the communications apparatus is enabled to perform the method according to any one of the fourth aspect or the possible implementations of the fourth aspect.

The communications apparatus may further include a communications interface. The communications interface may be a transceiver in the communications device, for example, implemented by using an antenna, a feeder, a codec, and the like in the communications apparatus. Alternatively, if the communications apparatus is the chip disposed in the communications device, the communications interface may be an input/output interface in the chip, for example, an input/output pin.

According to a seventeenth aspect, a first communications system is provided. The communications system includes the communications apparatus according to the fifth aspect, the communications apparatus according to the ninth aspect, or the communications apparatus according to the thirteenth aspect, and includes the communications apparatus according to the sixth aspect, the communications apparatus according to the tenth aspect, or the communications apparatus according to the fourteenth aspect.

According to an eighteenth aspect, a second communications system is provided. The communications system includes the communications apparatus according to the seventh aspect, the communications apparatus according to the eleventh aspect, or the communications apparatus according to the fifteenth aspect, and includes the communications apparatus according to the eighth aspect, the communications apparatus according to the twelfth aspect, or the communications apparatus according to the sixteenth aspect.

The first communications system may be the same as or different from the second communications system.

According to a nineteenth aspect, a computer storage medium is provided. The computer-readable storage medium is configured to store a computer program. When the computer program is run on a computer, the computer is enabled to perform the method according to any one of the first aspect or the possible implementations of the first aspect.

According to a twentieth aspect, a computer storage medium is provided. The computer-readable storage medium is configured to store a computer program. When the computer program is run on a computer, the computer is enabled to perform the method according to any one of the second aspect or the possible implementations of the second aspect.

According to a twenty-first aspect, a computer storage medium is provided. The computer-readable storage medium is configured to store a computer program. When the computer program is run on a computer, the computer is enabled to perform the method according to any one of the third aspect or the possible implementations of the third aspect.

According to a twenty-fourth aspect, a computer storage medium is provided. The computer-readable storage medium is configured to store a computer program. When the computer program is run on a computer, the computer is enabled to perform the method according to any one of the fourth aspect or the possible implementations of the fourth aspect.

According to a twenty-fifth aspect, a computer program product including instructions is provided. The computer program product is configured to store a computer program. When the computer program is run on a computer, the computer is enabled to perform the method according to any one of the first aspect or the possible implementations of the first aspect.

According to a twenty-sixth aspect, a computer program product including instructions is provided. The computer program product is configured to store a computer program. When the computer program is run on a computer, the computer is enabled to perform the method according to any one of the second aspect or the possible implementations of the second aspect.

According to a twenty-seventh aspect, a computer program product including instructions is provided. The computer program product is configured to store a computer program. When the computer program is run on a computer, the computer is enabled to perform the method according to any one of the third aspect or the possible implementations of the third aspect.

According to a twenty-eighth aspect, a computer program product including instructions is provided. The computer program product is configured to store a computer program. When the computer program is run on a computer, the computer is enabled to perform the method according to any one of the fourth aspect or the possible implementations of the fourth aspect.

In the embodiments of this application, the first codeword set may include a fully-coherent codeword. The terminal device sends uplink data to the network device by using the fully-coherent codeword, so that power for sending the uplink data can reach rated maximum transmit power, to improve sending quality of the uplink data, and also improve transmit power utilization of the terminal device.

DESCRIPTION OF EMBODIMENTS

Figure 1:
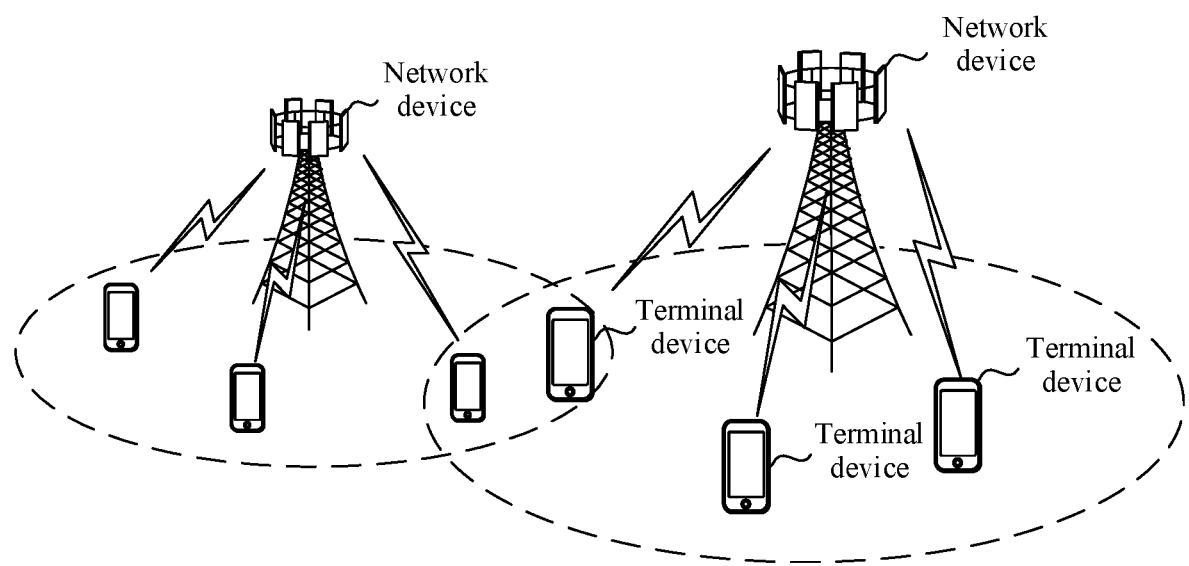
FIG. 1 is a schematic diagram of an architecture of a communications system according to an embodiment of this application.

To make the objectives, technical solutions, and advantages of the embodiments of this application clearer, the following further describes the embodiments of this application in detail with reference to the accompanying drawings.

In the following descriptions, some terms in the embodiments of this application are described, to help a person skilled in the art have a better understanding.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) communications terminal device, a vehicle-to-everything (vehicle-to-everything, V2X) terminal device, a machine-to-machine/machine type communication (machine-to-machine/machine type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus, for example, a personal communications service (personal communications service, PCS) phone, a cordless phone, a session initiation protocol (session initiation protocol, SIP) phone, a wireless local loop (wireless local loop, WLL) station, a personal digital assistant (personal digital assistant, PDA), a virtual reality (virtual reality, VR) terminal device, an augmented reality (augmented reality, AR) terminal device, a wireless terminal device in industrial control (industrial control), a wireless terminal device in self driving (self driving), a wireless terminal device in remote medical (remote medical), a wireless terminal device in a smart grid (smart grid), a wireless terminal device in transportation safety (transportation safety), a wireless terminal device in a smart city (smart city), a wireless terminal device in a smart home (smart home), or the like. An application scenario is not limited in the embodiments of this application. The terminal device further includes a limited device, for example, a device with low power consumption, a device with a limited storage capability, or a device with a limited computing capability. For example, the terminal device includes an information sensing device, for example, a barcode, a radio frequency identification (radio frequency identification, RFID) device, a sensor, a global positioning system (global positioning system, GPS), or a laser scanner.

As an example instead of a limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (on-board units, OBUs).

In the embodiments of this application, the terminal device may further include a relay (relay). Alternatively, it may be understood that any device that can perform data communication with a base station may be considered as the terminal device.

(2) Network device: The network device may be a device having a wireless transceiver function or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or home NodeB, HNB), a baseband unit (baseband unit, BBU), or an access point (access point, AP), a wireless relay node, a wireless backhaul node, a transmission point (transmission reception point TRP, or transmission point TP) in a wireless fidelity (wireless fidelity, Wi-Fi) system, or the like, or may be a gNB or a transmission point (TRP or TP) in a 5G system, for example, NR, or an antenna panel or a group of antenna panels (including a plurality of antenna panels) of a base station in a 5G system, or may be a network node constituting a gNB or a transmission point, such as a baseband unit (BBU) or a distributed unit (distributed unit, DU).

In some deployments, the gNB may include a centralized unit (centralized unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It may be understood that the network device may be a CU node, a DU node, or a device including a CU node and a DU node. In addition, the CU may be classified as a network device in a radio access network RAN, or the CU may be classified as a network device in a core network CN. This is not limited herein.

(3) Terms: The terms "system" and "network" may be used interchangeably in the embodiments of this application. "At least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" usually indicates an "or" relationship between the associated objects. "At least one of the following" or a similar expression thereof indicates any combination of the following, including any combination of one or more of the following. For example, at least one of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first data packet and a second data packet are merely used to distinguish between different data packets, but do not indicate a difference in content, priorities, sending orders, importance degrees, or the like of the two data packets.

To facilitate understanding of the embodiments of this application, the following first describes concepts and basic knowledge related to the embodiments of this application.

First, a concept of an antenna port is described.

The antenna port may include one or more of an antenna port for an uplink data channel, an antenna port for a demodulation reference signal, or an antenna port used for a channel sounding reference signal. The antenna port for the uplink data channel is, for example, an antenna port for a PUSCH, the antenna port for the demodulation reference signal is, for example, an antenna port for a demodulation reference signal (demodulation reference signal, DMRS), and the antenna port used for the channel sounding reference signal is, for example, an antenna port for a sounding reference signal (sounding reference signal, SRS).

The antenna port is an antenna port used to carry a specific physical channel or physical signal. For signals sent through a same antenna port, regardless of whether the signals are sent through a same physical antenna or different physical antennas, channels corresponding to paths through which the signals pass during spatial transmission may be considered to be the same or related. In other words, when demodulating the signals sent through the same antenna port, a receive end may consider that the channels corresponding to the signals are the same or related. The antenna port is a logical concept. Usually, the signal receive end identifies signals on different transmission channels by using antenna ports. In the embodiments of this application, the antenna port may be considered as a transmit antenna port, and the antenna may be considered as a transmit antenna. Specifically, the antenna port for the PUSCH or the DMRS is usually a logical port, that is, each antenna port for a PUSCH or a DMRS may be virtualized through a physical port of a terminal device, or a logical port formed when weighting of a specific precoding matrix is performed on a plurality of physical ports. Each antenna port for a PUSCH or a DMRS may correspond to one transport layer, so that a network device can obtain channel information by receiving DMRSs on different antenna ports for DMRSs, to receive data on a corresponding antenna port for a PUSCH. The antenna port for the SRS may be a physical antenna port, that is, a transmission link of each terminal device corresponds to one antenna port for an SRS, and the transmission link includes a transmission link including a radio frequency (radio frequency, RF), a power amplifier, and a physical antenna. Alternatively, the antenna port for the SRS may be a logical port, that is, each antenna port for an SRS is formed through virtualization by using a plurality of physical antennas or transmission links. Therefore, the network device can obtain channels of different transmit antenna ports of the terminal device by receiving different antenna ports for SRSs, to perform adaptive scheduling and indicate a precoding matrix. Different elements in each column of the precoding matrix correspond to the different transmit antenna ports of the terminal device.

The following describes a codebook-based uplink transmission mechanism.

Before uplink transmission, the terminal device reports an antenna capability of the terminal device. The antenna capability may be reported based on a radio frequency parameter of the terminal device. The antenna capability may include one or more of a quantity of antennas, a maximum quantity that is of transport layers corresponding to PUSCHs and DMRSs and that can be supported, a quantity of radio frequency links, a quantity of antennas, a quantity of PAs, a quantity that is of antenna ports for SRSs and that can be supported, a maximum quantity of radio frequency links, or a maximum quantity of antennas. The quantity of antennas may include, for example, 1, 2, or 4. The terminal device may directly report the quantity of antennas, or may implicitly report the quantity of antennas by using a maximum quantity of antenna ports for SRSs. The quantity of antennas or the maximum quantity of antenna ports for SRSs is used to represent a dimension of a codeword that can be supported by the terminal device, for example, a maximum quantity of rows. To be specific, for the terminal device that supports four antennas or four antenna ports for SRSs, the network device may configure that an SRS resource includes four antenna ports for SRSs, and indicate a codeword whose quantity of rows is 4. A quantity of transport layers is a quantity of spatially formed quadrature signal streams of a transport block (transport block, TB) or a codeword (codeword), and the transport layer may be mapped to each antenna port for sending in a precoding manner. For example, the terminal device sends data through four antenna ports. Data at a same layer is sent through the four antenna ports in a same precoding manner, and data at another layer is sent through the four antenna ports in another precoding manner. For another example, the four antenna ports include a port 0, a port 1, a port 2, and a port 3. The terminal device sends data at a layer 1 through the port 0 and the port 1, and sends data at a layer 2 through the port 2 and the port 3. There is a correlation between the foregoing different antenna capabilities: The maximum quantity that is of transport layers corresponding to the PUSCHs and the DMRSs and that can be supported is the same as the quantity that is of antenna ports (in one SRS resource) for the SRSs and that can be supported. The maximum quantity of transport layers and the quantity of antenna ports for the SRSs are usually the same as a quantity of transmission links or antennas of the terminal device. For example, a four-antenna terminal device may usually support a maximum of four layers for PUSCH transmission, and may also support a maximum of four ports for SRS resource configuration. One or more of the foregoing antenna capabilities correspond to N in the embodiments of this application, that is, a maximum quantity of antenna ports.

Further, the terminal device reports a maximum coherent capability between transmit antennas. For a terminal device that supports a maximum of two antenna ports, coherent capabilities include a fully-coherent (fully-coherent) capability and a non-coherent (non-coherent) capability. The fully-coherent (fully-coherent) capability indicates that phase calibration is completed between two transmit antenna ports of the terminal device, and phase weighting can be performed, that is, two transmit antennas can be used to send data at a same layer. The non-coherent (non-coherent) capability indicates that phase calibration is not completed between two transmit antennas of the terminal device, and phase weighting cannot be performed to send data at a same layer, that is, only one antenna can be used to send the data at the same layer.

For a four-antenna (port) terminal device, coherent capabilities include a fully-coherent (fully-coherent) capability, a partially-coherent (partially-coherent) capability, and a non-coherent (non-coherent) capability. The fully-coherent (fully-coherent) capability indicates that phase calibration is completed between all transmit antennas of the terminal device, and phase weighting can be performed, that is, all antennas of the terminal device can be used to send data at a same layer. The partially-coherent (partially-coherent) capability indicates that phase calibration is completed in pairwise transmit antenna groups of the terminal device, and phase weighting can be performed, but phase calibration is not completed between the pairwise transmit antenna groups of the terminal device, and phase weighting cannot be performed, that is, two transmit antennas in the antenna group can be used to send data at a same layer. The non-coherent (non-coherent) capability indicates that phase calibration is not completed between four transmit antennas of the terminal device, and phase weighting cannot be performed to send data at a same layer, that is, only one antenna can be used to send the data at the same layer.

Before scheduling uplink data, the network device needs to obtain channel information. In this case, the terminal device needs to send a sounding reference signal (sounding reference signal, SRS). The network device determines uplink channel quality by receiving and measuring the SRS, to perform uplink frequency selective scheduling. Because the terminal device may have a plurality of transmit antenna ports, an SRS resource of the terminal usually has a plurality of ports that respectively correspond to the plurality of transmit antenna ports of the terminal device. The base station may obtain channel information on each transmit antenna by measuring a plurality of ports for SRSs, to indicate a precoding manner of each transmit port used to send uplink data (for example, a PUSCH). Usually, the base station configures that a quantity of antenna ports in the SRS resource is the same as a maximum quantity that is of antenna ports for SRSs and that is reported by the terminal device, so that a proper antenna port of the terminal device can be selected for data transmission.

Based on a codebook, the network device may indicate the precoding manner of each transmit port to the terminal device and select the proper antenna port for data transmission. Both the network device and the terminal device pre-store a plurality of codebooks for different quantities of antenna ports, different quantities of layers, or different waveforms. The codebook may also be considered as a codeword set, for example, a codebook used for uplink transmission that is shown in any one of Table 1 to Table 7. Codewords in the codebook are arranged in ascending order of transmitted precoding matrix indicator (transmitted precoding matrix indicator, TPMI) index values from left to right in the table. In actual application, the terminal device sends an SRS on an SRS resource configured by the network device. If there are a plurality of ports, the terminal device may send an SRS on each of the plurality of ports. The network device receives and measures an SRS on a corresponding SRS resource, to obtain uplink channel information. Based on the channel information, the network device indicates a quantity of transport layers (transmit rank indicator, TRI) for uplink transmission and a TPMI to the terminal device by using downlink control information (DCI). The terminal device sends uplink data based on the TRI and the TPMI that are indicated in the DCI. Further, if a plurality of SRS resources are configured, an SRS resource indication (SRS resource indication, SRI) is indicated in the DCI. In this case, the terminal device sends the PUSCH by using an antenna port used to send the SRS on the SRS resource indicated by the SRI. When indicating the codeword or the TPMI, the network device may select, based on a maximum coherent capability of the terminal device, a codeword that matches a coherent capability of the terminal device. For example, if the maximum coherent capability reported by the terminal device is a fully-coherent capability, the network device may indicate to use a fully-coherent type codeword, a partially-coherent type codeword, and a non-coherent type codeword, use a partially-coherent type codeword and a non-coherent type codeword, or use a non-coherent type codeword. For another example, if the maximum coherent capability reported by the terminal device is a partially-coherent capability, the network device indicates to use a partially-coherent type codeword and a non-coherent type codeword, or use a non-coherent type codeword. For another example, if the maximum coherent capability reported by the terminal device is non-coherent capability, the network device may indicate to use a non-coherent type codeword to transmit the PUSCH. The non-coherent type codeword means that each column of the codeword includes only one non-zero element. The partially-coherent type codeword means that each column of the codeword includes only two non-zero elements. The fully-coherent type codeword means that four elements included in each column of the codeword are non-zero elements.

In Table 1 to Table 7, W represents a precoding matrix, and one TPMI index corresponds to one precoding matrix, or corresponds to one codeword. A row of the codeword corresponds to a transmit antenna port of the terminal device, and each column corresponds to an antenna port used at one transport layer. For a column, if an element in a row is set to a non-zero value, it indicates that an antenna port corresponding to the row is used to send a transport layer corresponding to the column. In addition, different rows in a same column may indicate different values, and correspond to phase weighting of different antenna ports at the transport layer.

TABLE 1

| TPMI index | W | | | | | |
|---|---|---|---|---|---|---|
| 0 to 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

Table 1 shows a codebook for one-layer transmission through two antenna ports, and there are a total of six TPMI index values: 0 to 5. Codewords corresponding to the TPMI index value 0 and the TPMI index value 1 are non-coherent type codewords. Codewords corresponding to the TPMI index value 2 to the TPMI index value 5 are fully-coherent type codewords. For example, the codeword corresponding to the TPMI index value 0 indicates that one layer is used for current data transmission, and an antenna port 0 or an antenna port 0 for an SRS is used for the transmission. For example, the codewords corresponding to the TPMI index values 2 to 5 indicate that one layer is used for current data transmission, antenna ports 0 and 1 or antenna ports 0 and 1 for SRSs are used for the transmission, and the antenna ports 0 and 1 have different phase differences.

TABLE 2

| TPMI index | W | | |
|---|---|---|---|
| 0 to 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Table 2 shows a codebook for two-layer transmission through two antenna ports, and there are a total of three TPMI index values: 0 to 2. A codeword corresponding to the TPMI index value 0 is a non-coherent type codeword. Codewords corresponding to the TPMI index value 1 and the TPMI index value 2 are fully-coherent type codewords. For example, the codeword corresponding to the TPMI index value 0 indicates that two layers are used for current data transmission, a port 0 is used for layer-1 transmission, and a port 1 is used for layer-2 transmission.

TABLE 3

| TPMI index | W |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 3 shows a codebook in a discrete Fourier transform spread orthogonal frequency division multiplexing (discrete Fourier transform spread orthogonal frequency division multiplexing, DFT-s-OFDM) waveform for one-layer transmission through four antenna ports, and there are a total of 28 TPMI index values: 0 to 27. Codewords corresponding to the TPMI index value 0 to the TPMI index value 3 are non-coherent type codewords. Codewords corresponding to the TPMI index value 4 to the TPMI index value 11 are partially-coherent type codewords. Codewords corresponding to the TPMI index value 12 to the TPMI index value 27 are fully-coherent type codewords.

Table 4 shows a codebook in a cyclic prefix (cyclic prefix, CP)-OFDM waveform for one-layer transmission through four antenna ports, and there are a total of 28 TPMI index values: 0 to 27. Codewords corresponding to the TPMI index value 0 to the TPMI index value 3 are non-coherent type codewords. Codewords corresponding to the TPMI index value 4 to the TPMI index value 11 are partially-coherent type codewords. Codewords corresponding to the TPMI index value 12 to the TPMI index value 27 are fully-coherent type codewords.

TABLE 4

| TPMI index | W |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 5

| TPMI index | W | | | |
|---|---|---|---|---|
| 0 to 3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4 to 7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8 to 11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12 to 15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16 to 19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20 to 21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

Table 5 shows a codebook in a CP-OFDM waveform for two-layer transmission through four antenna ports, and there are a total of 22 TPMI index values: 0 to 21. Codewords corresponding to the TPMI index value 0 to the TPMI index value 5 are non-coherent type codewords. Codewords corresponding to the TPMI index value 6 to the TPMI index value 13 are partially-coherent type codewords. Codewords corresponding to the TPMI index value 14 to the TPMI index value 21 are fully-coherent type codewords.

Table 6 shows a codebook in a CP-OFDM waveform for three-layer transmission through four antenna ports, and there are a total of seven TPMI index values: 0 to 6. A codeword corresponding to the TPMI index value 0 is a non-coherent type codeword. Codewords corresponding to the TPMI index value 1 and the TPMI index value 2 are partially-coherent type codewords. Codewords corresponding to the TPMI index value 3 to the TPMI index value 6 are fully-coherent type codewords.

TABLE 6

| TPMI index | W | | | |
|---|---|---|---|---|
| 0 to 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 to 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 7

| TPMI index | W | | | | |
|---|---|---|---|---|---|
| 0 to 3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ | |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — | |

Table 7 shows a codebook in a CP-OFDM waveform for four-layer transmission through four antenna ports, and there are a total of five TPMI index values: 0 to 4. A codeword corresponding to the TPMI index value 0 is a non-coherent type codeword. Codewords corresponding to the TPMI index value 1 and the TPMI index value 2 are partially-coherent type codewords. Codewords corresponding to the TPMI index value 3 and the TPMI index value 4 are fully-coherent type codewords.

If the terminal device supports more ports, there are more predefined codebooks. In addition to a form of a table, the codebook may be further represented in another form.

The following describes a mechanism for determining transmit power of the terminal device.

Before uplink transmission, the terminal device needs to determine channel transmit power for uplink transmission. PUSCH transmission is used as an example. In a possible implementation of the conventional technology (briefly referred to as the conventional technology 1 below), actual transmit power for uplink transmission of a terminal device is determined by multiplying channel transmit power $P_{PUSCH,b,f,c}(i,j,q_d,l)$ by a ratio of a quantity of non-zero antenna ports to a maximum quantity that is of antenna ports and that can be supported by the terminal device. The ratio of the quantity n of non-zero antenna ports to the maximum quantity that is of antenna ports and that can be supported by the terminal device is a power scaling factor, and the power scaling factor is equal to a ratio of the actual transmit power to the channel transmit power. The actual transmit power for uplink transmission is a sum of actual transmit power of n non-zero antenna ports. The n non-zero antenna ports are determined based on a TPMI indicated by a base station. Specifically, n is a quantity of rows in which at least one non-zero element is included in a codeword corresponding to the TPMI. Further, the obtained scaled channel transmit power is evenly allocated to each non-zero antenna port, and the non-zero antenna port is determined based on each of the TPMIs in Table 1 to Table 7. Table 4 is used as an example. If the network device indicates the TPMI 0, a quantity of non-zero antenna ports is 1, and a quantity of configured antenna ports is 4. In this case, actual PUSCH transmit power is 1/4 of $P_{PUSCH,b,f,c}(i,j,q_d,l)$, and the transmit power is allocated to a port 0. Table 5 is used as an example. If the network device indicates the TPMI 0, a quantity of non-zero antenna ports for PUSCH transmission is 2, and a quantity of configured antenna ports is 4. In this case, actual PUSCH transmit power is 1/2 of $P_{PUSCH,b,f,c}(i,j,q_d,l)$, and the transmit power is allocated to a port 0 and a port 2, that is, power on each antenna port is 1/4 of $P_{PUSCH,b,f,c}(i,j,q_d,l)$. If the network device indicates the TPMI 7, a quantity of non-zero antenna ports for PUSCH transmission is 4, and a total quantity of configured antenna ports is 4. In this case, actual PUSCH transmit power is $P_{PUSCH,b,f,c}(i,j,q_d,l)$, and power on each antenna port is 1/4 of $P_{PUSCH,b,f,c}(i,j,q_d,l)$.

The terminal device determines the channel transmit power $P_{PUSCH,b,f,c}(i,j,q_d,l)$ according to Formula 1:

$$P_{PUSCH,b,f,c}(i, j, q_d, l) = \min \begin{Bmatrix} P_{CMAX,f,c}(i) \\ P_{O\_PUSCH,b,f,c}(i) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{Bmatrix} [dBm] \quad \text{(Formula 1)}$$

Herein, b is a bandwidth part (bandwidth part, BWP) occupied for PUSCH transmission, f is a carrier (carrier) occupied for PUSCH transmission, c is a serving cell (serving cell) in which the carrier is located, and l is a power control parameter set configured by the network device by using higher layer signaling. The following parameter values configured by using the higher layer signaling are all configured in the power control parameter set.

$P_{CMAX,f,c}(i)$ is maximum transmit power allowed by a communications system, that is, rated maximum transmit power of the system. A value of the maximum transmit power may fluctuate according to a protocol specification and an actual transmission channel condition. The rated maximum transmit power of the system may represent a capability of maximum power supported by the terminal device for sending uplink data, or maximum transmit power that can be supported by the terminal device. Optionally, the maximum transmit power may be transmit power configured by the network device for the terminal device, and represents maximum transmit power allowed by the network device to be used by the terminal device. Optionally, the maximum transmit power may alternatively be maximum transmit power that is agreed on by the network device and that can be used by the terminal device.

$P_{O\_PUSCH,b,f,c}(j)$ is a parameter value configured by the network device by using the higher layer signaling. When the network device configures a plurality of parameter values by using the higher layer, the terminal device further selects one of the plurality of parameter values based on a corresponding indication field in downlink control information (downlink control information, DCI) for determining, or selects one of the plurality of parameter values according to a predefined rule for determining.

$a_{b,f,c}(j)$ is a parameter value configured by the network device by using the higher layer signaling. When the network device configures a plurality of parameter values by using the higher layer signaling, the terminal device further selects one of the plurality of parameter values based on a corresponding indication field in DCI for determining, or selects one of the plurality of parameter values according to a predefined rule for determining.

$M_{RB,b,f,c}^{PUSCH}(i)$ is a quantity of resource blocks (resource blocks, RBs) occupied by a PUSCH.

$PL_{b,f,c}(q_d)$ is obtained through estimation based on a reference signal (reference resource, RS) configured by the network device.

A value of $\Delta_{TF,b,f,c}(i)$ is related to a quantity of transport layers, and may be related to a quantity of code blocks (code blocks), a code block size, a quantity of REs occupied by a PUSCH, and a type of data carried on the PUSCH. A manner of calculating $\Delta_{TF,b,f,c}(i)$ is $\Delta_{TF,b,f,c}(i)=10 \log_{10}((2^{BPRE \cdot k_s}-1) \times \beta_{offset}^{PUSCH})$. Herein, $k_s$ is indicated by using the higher layer signaling, a value of the BPRE is related to the quantity of code blocks (code blocks), the code block size, and the quantity of control elements (control elements, REs) occupied by the PUSCH, and $\beta_{offset}^{PUSCH}$ is related to the type of the data carried on the PUSCH.

$f_{b,f,c}(i,l)$ is determined based on a transmit power control (transmit power control, TPC) indication carried in DCI. In a scenario in which TPC indicates a cumulative amount, $f_{b,f,c}(i,l)=f_{b,f,c}(i_{last},l)+\delta_{PUSCH,b,f,c}(i_{last},i,K_{PUSCH},l)$. In a scenario in which TPC indicates an absolute amount, $f_{b,f,c}(i,l)=\delta_{PUSCH,b,f,c}(i_{last},i,K_{PUSCH},l)$.

In a current power control mechanism, the terminal device may determine, based on channel transmit power and a quantity M of configured antenna ports, transmit power used on each antenna port. For example, the transmit power on each antenna port is a ratio of the channel transmit power to M. In actual uplink transmission, an actual quantity of antenna ports used to send uplink data may be less than or equal to M, and actual transmit power represents a sum of transmit power of the antenna ports actually used by the terminal device to send the uplink data. The actual transmit power is less than or equal to the channel transmit power. This determining manner may mean that power scaling (scale) is performed on the channel transmit power.

In the foregoing power control mechanism, the total PUSCH transmit power is determined by multiplying the channel transmit power $P_{PUSCH,b,f,c}(i,j,q_d,l)$ by a ratio of a quantity of non-zero antenna ports to the quantity of configured antenna ports. In another power control mechanism, the channel transmit power is changed to $\beta P_{PUSCH,b,f,c}(i,j,q_d,l)$. When the DCI indicates a fully-coherent codeword, a value of $\beta$ is a quantity of non-zero antennas corresponding to PUSCHs/a quantity of configured antennas. When the DCI indicates a partially-coherent/non-coherent codeword, a value of $\beta$ is obtained by multiplying a quantity of non-zero antennas corresponding to PUSCHs/a quantity of configured antennas by 2. When the DCI indicates a non-coherent codeword, a value of $\beta$ is a quantity of non-zero antennas corresponding to PUSCHs. According to this power control mechanism, when a TPMI indicates a partially-coherent/non-coherent codeword, actual PUSCH transmit power can be adjusted by adding a weight coefficient between transmit antennas to uplink PUSCH power control, to ensure that maximum PUSCH transmit power of terminal devices having different coherent capabilities remain unchanged.

The channel transmit power mentioned in this embodiment of this application may be considered as $\beta_{PUSCH,b,f,c}(i,j,q_d,l)$ in the foregoing another power control mechanism, that is, transmit power existing before power scaling.

When transmitting uplink data, the terminal device needs to first determine channel transmit power for uplink transmission. In this embodiment of this application, the terminal device can send the uplink data at the channel transmit power existing before power scaling. A maximum value of the channel transmit power is maximum output power on a frequency band occupied by the terminal device for uplink transmission. In an actual implementation, if a power class (power class) of the terminal device is defined, the channel transmit power does not need to be greater than the power class of the terminal device. The power class of the terminal device may be adjusted based on a tolerance (tolerance). For example, as shown in Table 8, power classes and tolerances of the terminal device on different frequency bands are defined.

TABLE 8

| Frequency band | Class 2 (dBm) | Tolerance (dB) | Class 3 (dBm) | Tolerance (dB) |
|---|---|---|---|---|
| n1 | | | 23 | ±2 |
| n2 | | | 23 | ±2[3] |
| n8 | | | 23 | ±2[3] |
| n12 | | | 23 | ±2[3] |
| n25 | | | 23 | ±2 |
| n34 | | | 23 | ±2 |
| n39 | | | 23 | ±2 |
| n40 | | | 23 | ±2 |
| n41 | 26 | +2/−3[3] | 23 | ±2[3] |
| n66 | | | 23 | ±2 |
| n70 | | | 23 | ±2 |
| n71 | | | 23 | ±2/−2.5 |
| n77 | 26 | +2/−3 | 23 | ±2/−3 |
| n78 | 26 | +2/−3 | 23 | ±2/−3 |
| n79 | 26 | +2/−3 | 23 | ±2/−3 |
| n80 | | | 23 | ±2 |
| n81 | | | 23 | ±2 |
| n82 | | | 23 | ±2 |
| n83 | | | 23 | ±2/−2.5 |
| n84 | | | 23 | ±2 |
| n86 | | | 23 | ±2 |

After the power class is adjusted based on the tolerance, the maximum value of the channel transmit power of the terminal device does not exceed an adjusted power class.

For example, the power class of the terminal device in Table 8 is the class 3. If the tolerance is not considered, the power class of the terminal device is 23 dBm. The maximum value of the channel transmit power of the terminal device may be determined as 23 dBm or a value less than or greater than 23 dBm.

An antenna port of the terminal device has maximum transmit power based on a capability of a PA of the terminal device. Not all maximum transmit power of antenna ports of the terminal device can support the maximum value of the channel transmit power. When the maximum transmit power of the antenna port of the terminal device is not greater than the maximum value of the channel transmit power, the terminal device may achieve the maximum value of the channel transmit power by virtualizing a plurality of antenna ports.

To support the terminal device in performing uplink transmission at the channel transmit power obtained by using a mechanism in which power is not scaled, the network device can indicate correct downlink control information to the terminal device. An embodiment of this application designs a communications method. That the terminal device uses the mechanism in which the power is not scaled may also be referred to as that the terminal device uses a full-power transmission mechanism. In the full-power transmission mechanism, the terminal device may allocate, to an antenna port of the terminal device, channel transmit power obtained without using a power scaling mechanism, to send uplink data to the network device. In this way, sending quality of the uplink data can be improved.

The communications method provided in the embodiments of this application may be applied to various communications systems, for example, an LTE system, a future 5th generation (5th generation, 5G) communications system such as a new radio access technology (new radio access technology, NR) system, and a future communications system such as a 6th generation (6th generation, 6G) communications system.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

FIG. 1 shows a possible architecture of a communications system to which a communications method is applicable according to an embodiment of this application. For details, refer to FIG. 1. The communications system includes a network device and a terminal device. For descriptions of the network device and the terminal device, refer to the foregoing descriptions. For example, the terminal device in FIG. 1 is a mobile phone.

Based on the foregoing descriptions and the system architecture shown in FIG. 1, the following describes a method provided in an embodiment of this application.

In the embodiments of this application, a non-coherent type codeword may also be referred to as a non-coherent codeword, a partially-coherent type codeword may also be referred to as a partially-coherent codeword, and a fully-coherent type codeword may also be referred to as a fully-coherent codeword.

In the embodiments of this application, the codeword may be a vector or an array. In the following description process, descriptions are provided by using an example in which the codeword is in a form of a matrix. Actually, the matrix may be considered as a vector or an array.

Figure 2:
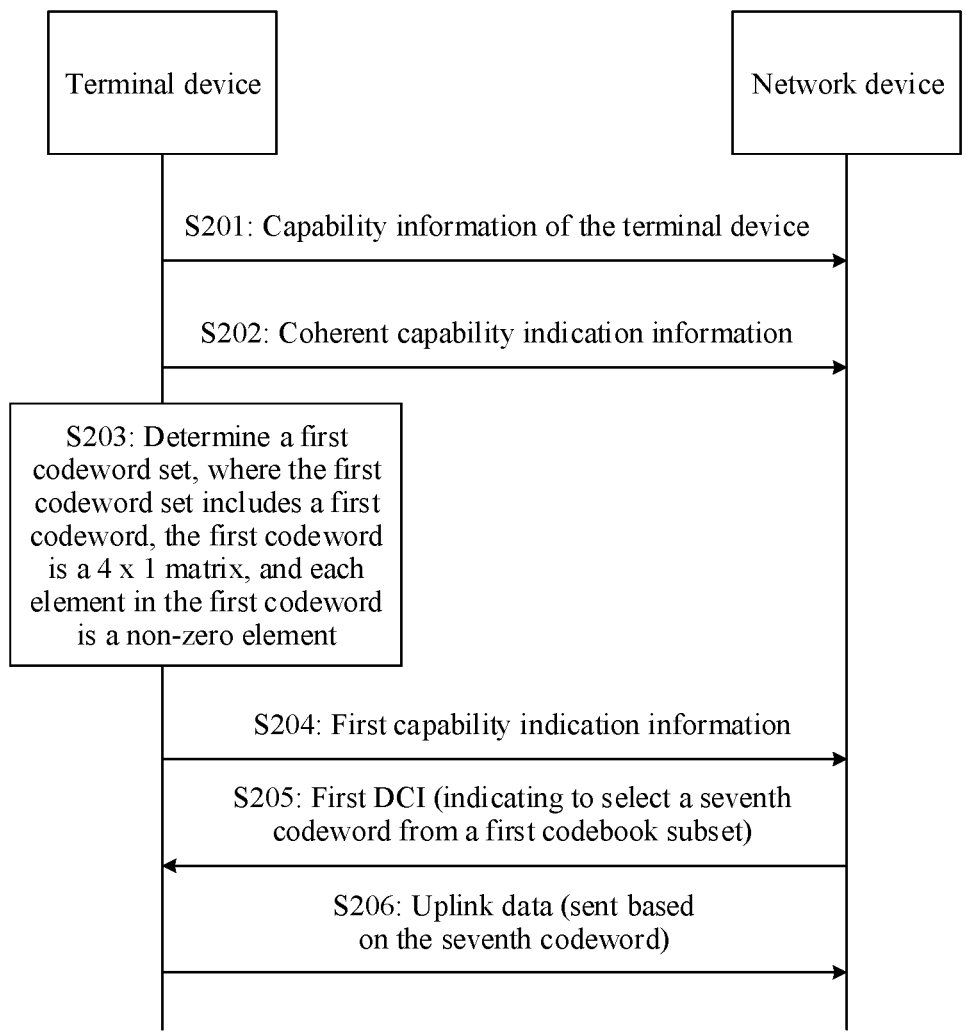
FIG. 2 is a schematic flowchart of a first communications method according to an embodiment of this application.

As shown in FIG. 2, a specific process of a communications method provided in an embodiment of this application is described as follows: Any two or more steps in FIG. 2 may form a solution that needs to be protected in this embodiment of this application, and other steps are optional. For example, a solution including S201 and S202 falls within the protection scope of this embodiment of this application.

S201: A terminal device sends capability information to a network device, and the network device receives the capability information from the terminal device.

For example, the capability information may be used to indicate whether transmit power of the terminal device can reach rated maximum transmit power of a system. The terminal device does not have a fully-coherent capability.

For another example, the capability information may alternatively indicate whether the terminal device supports a transmission mechanism for full-power sending or a power control mechanism. The transmission mechanism or the power control mechanism may be a transmission mechanism 1 or a transmission mechanism 2. In the transmission mechanism 1, a plurality of antenna ports are virtualized into one antenna port for a demodulation reference signal (demodulation reference signal, DMRS) or a PUSCH, so that transmit power of PAs that corresponds to the plurality of antenna ports and that cannot reach the rated maximum transmit power of the system is combined to form one antenna port whose transmit power can reach the rated maximum transmit power of the system. In the transmission mechanism 2, some antenna ports are not virtualized into an antenna port for a DMRS or a PUSCH, where a sum of transmit power of some antenna ports can reach the rated maximum transmit power of the system.

For another example, whether the terminal device supports a transmission mechanism for full-power sending indicated by the capability information may alternatively be introducing a first codeword set different from an existing non-coherent codeword set, partially-coherent codeword set, and fully-coherent codeword set. The first codeword set may support a PUSCH in using the rated maximum transmit power of the system.

Optionally, the capability information may be used to indicate whether the terminal device supports the first codeword set.

Optionally, the capability information may alternatively indicate a coherent capability or a maximum coherent capability between antenna ports of the terminal device. The coherent capabilities include a non-coherent capability, a partially-coherent capability, and a fully-coherent capability.

In this embodiment of this application, the terminal device may be a terminal device having the non-coherent capability. The terminal device having the non-coherent capability may support a non-coherent codeword set, the non-coherent codeword set includes only at least one fourth codeword, and each column of each of the at least one fourth codeword includes only one non-zero element. To be specific, each of the at least one fourth codeword is a non-coherent codeword, and non-zero elements included in different fourth codewords occupy different rows. The network device may determine, based on the coherent capability, that the terminal device supports the non-coherent codeword set.

For example, the at least one fourth codeword included in the non-coherent codeword set may include one of the following codewords or any combination of the following plurality of codewords: a 4×1 non-coherent codeword, a 4×2 non-coherent codeword, or 4×3 non-coherent codeword. For example, the at least one fourth codeword may include only the 4×1 non-coherent codeword, include only the 4×1 non-coherent codeword and the 4×2 non-coherent codeword, or include the 4×1 non-coherent codeword, the 4×2 non-coherent codeword, and the 4×3 non-coherent codeword.

The 4×1 non-coherent codeword includes $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \text{ and } \frac{1}{2}\begin{bmatrix}0\\0\\0\\1\end{bmatrix}.$$

For example, the non-coherent codeword set may include $$\frac{1}{2}\begin{bmatrix}1\\0\\0\\0\end{bmatrix},$$

or include $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \text{ and } \frac{1}{2}\begin{bmatrix}0\\0\\0\\1\end{bmatrix}.$$

The 4×2 non-coherent codeword includes $$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}1&0\\0&0\\0&0\\0&1\end{bmatrix},$$

$$\frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{ and } \frac{1}{2}\begin{bmatrix}0&0\\0&0\\1&0\\0&1\end{bmatrix}.$$

For example, the 4×2 non-coherent codeword includes only $$\frac{1}{2}\begin{bmatrix}1&0\\0&1\\0&0\\0&0\end{bmatrix}.$$

Alternatively, the 4×2 non-coherent codeword includes only $$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \text{ and } \frac{1}{2}\begin{bmatrix}1&0\\0&0\\0&0\\0&1\end{bmatrix}.$$

Alternatively, the 4×2 non-coherent codeword includes $$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{ and } \frac{1}{2}\begin{bmatrix}0&0\\0&0\\1&0\\0&1\end{bmatrix}.$$

The 4×3 non-coherent codeword includes, for example, $$\frac{1}{2}\begin{bmatrix}1&0&0\\0&1&0\\0&0&1\\0&0&0\end{bmatrix}.$$

Optionally, the terminal device may report that the terminal device supports the non-coherent codeword set and the first codeword set. Therefore, the network device configures a corresponding codeword set based on an antenna capability of the terminal device, to improve uplink transmission efficiency.

In a matrix (or a codeword) in the embodiments of this application, a quantity of rows of the matrix may represent a quantity of ports used for sent uplink data, for example, represent a quantity of ports used for a PUSCH, and each row of the matrix corresponds to one transmit antenna port, or corresponds to one SRS port. A quantity of columns of the matrix may represent a quantity of transport layers used for sent uplink data, for example, represent a quantity of transport layers used for PUSCHs, and each column of the matrix corresponds to one transport layer for uplink data (for example, a PUSCH). For example, a 4×1 matrix corresponds to four ports and corresponds to one transport layer, a 4×2 matrix corresponds to four ports and corresponds to two transport layers, and by analogy. Details are not described in the following embodiments.

S203: The terminal device determines the first codeword set, where the first codeword set includes a first codeword, the first codeword is a 4×1 matrix, and each element in the first codeword is a non-zero element.

For example, the first codeword set may be configured by the network device for the terminal device, or the first codeword set may be specified in a protocol. For example, if the terminal device may store the first codeword set, the terminal device may directly determine the first codeword set. Alternatively, if the first codeword set is configured by the network device for the terminal device, the terminal device determines the first codeword set, or the terminal device receives the first codeword set from the network device. For another example, the terminal device may store a second codeword set including the first codeword set, and the network device is configured to use the first codeword set in the second codeword set.

In this embodiment of this application, the terminal device is, for example, the terminal device having the non-coherent capability. The terminal device having the non-coherent capability may support the non-coherent codeword set, and may further support the first codeword set. For example, the terminal device having the non-coherent capability supports only the non-coherent codeword set and the first codeword set.

For example, the first codeword set may include at least one first codeword. For example, a quantity of at least one first codeword may be 1 or may be greater than 1. The at least one first codeword is a different first codeword, but each of the at least one first codeword satisfies: Each first codeword is a 4×1 matrix, and each element in the codeword is a non-zero element.

For example, the at least one first codeword may include one of the following codewords or any combination of the following plurality of codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ or } \frac{1}{2}\begin{bmatrix}1\\-j\\-1\\j\end{bmatrix}.$$

For example, the at least one first codeword includes only $$\frac{1}{2}\begin{bmatrix}1\\1\\j\\j\end{bmatrix}.$$

Alternatively, the at least one first codeword includes only $$\frac{1}{2}\begin{bmatrix}1\\1\\j\\j\end{bmatrix}, \frac{1}{2}\begin{bmatrix}1\\1\\-j\\-j\end{bmatrix},$$

$$\frac{1}{2}\begin{bmatrix}1\\j\\1\\j\end{bmatrix}, \text{ and } \frac{1}{2}\begin{bmatrix}1\\j\\-1\\-j\end{bmatrix}.$$

Alternatively, the at least one first codeword includes only $$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \text{ and } \frac{1}{2}\begin{bmatrix}1\\-1\\-j\\j\end{bmatrix}.$$

Alternatively, the at least one first codeword includes $$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ and } \frac{1}{2}\begin{bmatrix}1\\-j\\-1\\j\end{bmatrix}.$$

In an implementation, the first codeword set may further include another codeword in addition to the at least one first codeword. Specific codewords that may be included are described in the following descriptions. Alternatively, in another implementation, the first codeword set includes only the at least one first codeword, but does not include another codeword. For example, if a quantity of at least one first codeword is 1, the first codeword set includes only the first codeword, but does not include another codeword.

All the first codewords are fully-coherent codewords. The terminal device having the non-coherent capability is enabled to use the fully-coherent codewords, so that transmit power of uplink data can be supported to reach rated maximum transmit power, to ensure uplink transmission performance. In addition, the first codeword set may include only one first codeword. The first codeword selected in this embodiment of this application can reduce a quantity of redundant bits in DCI, and reduce complexity of baseband processing of the terminal device.

For example, the first codeword may be used for a DFT-s-OFDM waveform. Alternatively, the first codeword may be used for a CP-OFDM waveform. Alternatively, the first codeword may be used to transmit both a PUSCH in a DFT-s-OFDM waveform and a PUSCH in a CP-OFDM waveform.

In a possible implementation of the first codeword set, the first codeword set may further include at least one second codeword in addition to the at least one first codeword. For example, a quantity of at least one second codeword may be 1 or may be greater than 1. The second codeword may be a 4×2 matrix, and each element included in the second codeword is a non-zero element, that is, the second codeword may be a fully-coherent codeword.

For example, the at least one second codeword may include one of the following codewords or any combination of the following plurality of codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{ or } \frac{1}{2\sqrt{2}}\begin{bmatrix}1&1\\-j&-j\\j&-j\\1&-1\end{bmatrix}.$$

For example, the at least one second codeword may include only $$\frac{1}{2\sqrt{2}}\begin{bmatrix}1&1\\1&1\\1&-1\\1&-1\end{bmatrix}.$$

Alternatively, the at least one second codeword may include only $$\frac{1}{2\sqrt{2}}\begin{bmatrix} 1 & 1 \\ 1 & 1 \\ j & -j \\ j & -j \end{bmatrix}, \frac{1}{2\sqrt{2}}\begin{bmatrix} 1 & 1 \\ j & j \\ 1 & -1 \\ j & -j \end{bmatrix}, \text{and } \frac{1}{2\sqrt{2}}\begin{bmatrix} 1 & 1 \\ j & j \\ j & -j \\ -1 & 1 \end{bmatrix}.$$

Alternatively, the at least one second codeword may include only $$\frac{1}{2\sqrt{2}}\begin{bmatrix} 1 & 1 \\ j & j \\ j & -j \\ -1 & 1 \end{bmatrix}, \frac{1}{2\sqrt{2}}\begin{bmatrix} 1 & 1 \\ -1 & -1 \\ 1 & -1 \\ -1 & 1 \end{bmatrix},$$

$$\frac{1}{2\sqrt{2}}\begin{bmatrix} 1 & 1 \\ -1 & -1 \\ j & -j \\ -j & j \end{bmatrix}, \text{and } \frac{1}{2\sqrt{2}}\begin{bmatrix} 1 & 1 \\ -j & -j \\ 1 & -1 \\ -j & j \end{bmatrix}.$$

Alternatively, the at least one second codeword may include $$\frac{1}{2\sqrt{2}}\begin{bmatrix} 1 & 1 \\ 1 & 1 \\ 1 & -1 \\ 1 & -1 \end{bmatrix}, \frac{1}{2\sqrt{2}}\begin{bmatrix} 1 & 1 \\ 1 & 1 \\ j & -j \\ j & -j \end{bmatrix}, \frac{1}{2\sqrt{2}}\begin{bmatrix} 1 & 1 \\ j & j \\ 1 & -1 \\ j & -j \end{bmatrix}, \frac{1}{2\sqrt{2}}\begin{bmatrix} 1 & 1 \\ j & j \\ j & -j \\ -1 & 1 \end{bmatrix},$$

$$\frac{1}{2\sqrt{2}}\begin{bmatrix} 1 & 1 \\ -1 & -1 \\ 1 & -1 \\ -1 & 1 \end{bmatrix}, \frac{1}{2\sqrt{2}}\begin{bmatrix} 1 & 1 \\ -1 & -1 \\ j & -j \\ -j & j \end{bmatrix}, \frac{1}{2\sqrt{2}}\begin{bmatrix} 1 & 1 \\ -j & -j \\ 1 & -1 \\ -j & j \end{bmatrix}, \text{and } \frac{1}{2\sqrt{2}}\begin{bmatrix} 1 & 1 \\ -j & -j \\ j & -j \\ 1 & -1 \end{bmatrix}.$$

In a possible implementation of the first codeword set, the first codeword set may further include at least one third codeword in addition to the at least one first codeword. For example, a quantity of at least one third codeword may be 1 or may be greater than 1. The third codeword may be a 4×3 matrix, and each element included in the third codeword is a non-zero element, that is, the third codeword may be a fully-coherent codeword.

For example, the at least one third codeword may include one of the following codewords or any combination of the following plurality of codewords:

$$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}, \frac{1}{2\sqrt{3}}\begin{bmatrix} 1 & 1 & 1 \\ 1 & -1 & 1 \\ j & j & -j \\ j & -j & -j \end{bmatrix},$$

$$\frac{1}{2\sqrt{3}}\begin{bmatrix} 1 & 1 & 1 \\ -1 & 1 & -1 \\ 1 & 1 & -1 \\ -1 & 1 & 1 \end{bmatrix}, \text{and } \frac{1}{2\sqrt{3}}\begin{bmatrix} 1 & 1 & 1 \\ -1 & 1 & -1 \\ j & j & -j \\ -j & j & j \end{bmatrix}.$$

For example, the at least one third codeword includes only $$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}.$$

Alternatively, the at least one third codeword may include only $$\frac{1}{2\sqrt{3}}\begin{bmatrix} 1 & 1 & 1 \\ 1 & -1 & 1 \\ 1 & 1 & -1 \\ 1 & -1 & -1 \end{bmatrix} \text{and } \frac{1}{2\sqrt{3}}\begin{bmatrix} 1 & 1 & 1 \\ 1 & -1 & 1 \\ j & j & -j \\ j & -j & -j \end{bmatrix}.$$

Alternatively, the at least one third codeword may include $$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}, \frac{1}{2\sqrt{3}}\begin{bmatrix} 1 & 1 & 1 \\ 1 & -1 & 1 \\ j & j & -j \\ j & -j & -j \end{bmatrix},$$

$$\frac{1}{2\sqrt{3}}\begin{bmatrix} 1 & 1 & 1 \\ -1 & 1 & -1 \\ 1 & 1 & -1 \\ -1 & 1 & 1 \end{bmatrix}, \text{and } \frac{1}{2\sqrt{3}}\begin{bmatrix} 1 & 1 & 1 \\ -1 & 1 & -1 \\ j & j & -j \\ -j & j & j \end{bmatrix}.$$

The first codeword set may further include a 4×3 codeword in addition to a 4×1 codeword, so that the first codeword set can support both one-layer transmission and multi-layer transmission. All the third codewords are fully-coherent codewords. The terminal device having the non-coherent capability is enabled to use the fully-coherent codewords, so that transmit power of uplink data can be supported to reach rated maximum transmit power, to ensure uplink transmission performance. In addition, the first codeword set may include only one third codeword. The third codeword selected in this embodiment of this application can reduce a quantity of redundant bits in DCI, and reduce complexity of baseband processing of the terminal device.

In a possible implementation of the first codeword set, the first codeword set may further include at least one fourth codeword in addition to the at least one first codeword, and a dimension of the fourth codeword is 4×1. Alternatively, the first codeword set may further include a codeword whose dimension is 4×1 in the non-coherent codeword set. For example, a quantity of at least one fourth codeword may be 1 or may be greater than 1. For the fourth codeword or the non-coherent codeword set, refer to the descriptions of S201. For example, a value of a power scaling factor corresponding to the fourth codeword included in the first codeword set may be 1. The value of the power scaling factor is 1, so that the terminal device can send uplink data at full power even when sending the uplink data by using a non-coherent codeword (for example, the fourth codeword). In addition, a quantity of columns of the fourth codeword included in the first codeword set may be less than or equal to 3.

It should be noted that, if the fourth codeword or the non-coherent codeword belonging to the non-coherent codeword set is indicated, a value of a corresponding power scaling factor is 1/4, that is, total power allocated to non-zero antenna ports used for PUSCH transmission is equal to 1/4 of channel transmit power. If the fourth codeword or the non-coherent codeword belonging to the first codeword set is indicated, a value of a corresponding power scaling factor is 1, that is, total power allocated to non-zero antenna ports used for PUSCH transmission is equal to channel transmit power.

For example, a quantization coefficient is 1 when a dimension of the at least one fourth codeword included in the first codeword set is 4×1. To be specific, based on the quantization coefficient, a modulus value of the fourth codeword is 1, an amplitude value of the fourth codeword is 1, or a quantization value of the fourth codeword is 1. In this case, the quantization coefficient may directly represent the power scaling factor.

In a possible implementation of the first codeword set, the first codeword set may further include at least one fifth codeword in addition to the at least one first codeword. For example, a quantity of at least one fifth codeword may be 1 or may be greater than 1. The fifth codeword may be a 4×1 matrix, and each column of the fifth codeword may include only two non-zero elements. For example, it is understood that the fifth codeword is a partially-coherent codeword. If the fifth codeword includes a plurality of codewords, non-zero elements in the plurality of codewords occupy different rows. For example, the at least one fifth codeword may include $$\frac{1}{2}\begin{bmatrix}1\\0\\1\\0\end{bmatrix}, \frac{1}{2}\begin{bmatrix}0\\1\\0\\1\end{bmatrix}, \text{or } \frac{1}{2}\begin{bmatrix}1\\0\\1\\0\end{bmatrix} \text{ and } \frac{1}{2}\begin{bmatrix}0\\1\\0\\1\end{bmatrix}.$$

In a possible implementation of the first codeword set, the fifth codeword may alternatively be $$\frac{1}{2}\begin{bmatrix}1\\0\\-1\\0\end{bmatrix} \text{ and } \frac{1}{2}\begin{bmatrix}0\\1\\0\\-1\end{bmatrix}$$

or the like.

For example, a value of a power scaling factor corresponding to the fifth codeword included in the first codeword set may be 1. For example, if the network device indicates that the fifth codeword in the first codeword set is used to transmit uplink data (for example, a PUSCH), a value of a power scaling factor used to transmit the uplink data is 1.

For example, a quantization coefficient of the at least one fifth codeword included in the first codeword set is 1. To be specific, based on the quantization coefficient, a modulus value of the fifth codeword is 1, an amplitude value of the fifth codeword is 1, or a quantization value of the fifth codeword is 1. In this case, the quantization coefficient may directly represent the power scaling factor.

For a 4×1 codeword, the first codeword set may include a partially-coherent codeword. The power scaling factor is set, so that the terminal device can send uplink data at full power even when sending the uplink data by using the partially-coherent codeword (for example, the fifth codeword).

In a possible implementation of the first codeword set, the first codeword set may further include at least one sixth codeword in addition to the at least one first codeword. For example, a quantity of at least one sixth codeword may be 1 or may be greater than 1. The sixth codeword may be a 4×2 matrix, and each column of the sixth codeword may include only one non-zero element. For example, the sixth codeword is a non-coherent codeword.

For example, the at least one sixth codeword may include one of the following codewords or any combination of the following plurality of codewords:

$$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{or } \frac{1}{2}\begin{bmatrix}0&0\\0&0\\1&0\\0&1\end{bmatrix}.$$

For example, the at least one sixth codeword includes only $$\frac{1}{2}\begin{bmatrix}1&0\\0&1\\0&0\\0&0\end{bmatrix}.$$

Alternatively, the at least one sixth codeword includes only $$\frac{1}{2}\begin{bmatrix}1&0\\0&0\\0&1\\0&0\end{bmatrix} \text{ and } \frac{1}{2}\begin{bmatrix}1&0\\0&0\\0&0\\0&1\end{bmatrix}.$$

Alternatively, the at least one sixth codeword includes only $$\frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{and} \frac{1}{2}\begin{bmatrix}0&0\\0&0\\1&0\\0&1\end{bmatrix}.$$

Alternatively, the at least one sixth codeword includes $$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{and} \frac{1}{2}\begin{bmatrix}0&0\\0&0\\1&0\\0&1\end{bmatrix}.$$

For example, a value of a power scaling factor corresponding to the sixth codeword included in the first codeword set may be 1. The power scaling factor corresponding to the 4×2 codeword included in the first codeword set is set to 1, so that the terminal device can send uplink data at full power even when sending the uplink data by using a non-coherent codeword (for example, the sixth codeword).

For example, a quantization coefficient of the sixth codeword included in the first codeword set is 1. To be specific, based on the quantization coefficient, a modulus value of the sixth codeword is 1, an amplitude value of the sixth codeword is 1, or a quantization value of the sixth codeword is 1. In this case, the quantization coefficient may directly represent the power scaling factor.

In a possible implementation of the first codeword set, the first codeword set may further include at least one eighth codeword in addition to the at least one first codeword. For example, a quantity of at least one eighth codeword may be 1 or may be greater than 1. Each column of the eighth codeword includes two non-zero elements and two zero elements, and non-zero elements in different columns of the eighth codeword occupy different rows. The eighth codeword may be a partially-coherent codeword.

For example, the at least one eighth codeword may include one of the following codewords or any combination of the following plurality of codewords:

$$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix},$$

$$\frac{1}{2}\begin{bmatrix}1&0\\0&1\\-1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix}, \text{or } \frac{1}{2}\begin{bmatrix}1&0\\0&1\\j&0\\0&-1\end{bmatrix}$$

For example, the at least one eighth codeword may include only $$\frac{1}{2}\begin{bmatrix}1&0\\0&1\\1&0\\0&-j\end{bmatrix}.$$

Alternatively, the at least one eighth codeword may include only $$\frac{1}{2}\begin{bmatrix}1&0\\0&1\\1&0\\0&-j\end{bmatrix} \text{ and } \frac{1}{2}\begin{bmatrix}1&0\\0&1\\1&0\\0&j\end{bmatrix}.$$

Alternatively, the at least one eighth codeword may include only $$\frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix}, \frac{1}{2}\begin{bmatrix}1&0\\0&1\\-1&0\\0&-j\end{bmatrix}, \text{ and } \frac{1}{2}\begin{bmatrix}1&0\\0&1\\-1&0\\0&j\end{bmatrix}.$$

Alternatively, the at least one eighth codeword may include only $$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix},$$

-continued $$\frac{1}{2}\begin{bmatrix}1&0\\0&1\\-1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix}, \text{ and } \frac{1}{2}\begin{bmatrix}1&0\\0&1\\j&0\\0&-1\end{bmatrix}.$$

In an optional implementation, a value of a power scaling factor corresponding to the eighth codeword is 1. For a 4×2 codeword, the power scaling factor corresponding to the first codeword set may be set, so that the terminal device can send uplink data at full power even when sending the uplink data by using a partially-coherent codeword (for example, the eighth codeword).

In a possible implementation of the first codeword set, the first codeword set includes one second codeword and one eighth codeword. For example, codewords in the first codeword set include $$\frac{1}{2\sqrt{2}}\begin{bmatrix}1&1\\1&1\\1&-1\\1&-1\end{bmatrix} \text{ and } \frac{1}{2}\begin{bmatrix}1&0\\0&1\\1&0\\0&-j\end{bmatrix}.$$

Therefore, the network device can be supported in selecting different beams for PUSCH sending.

In a possible implementation of the first codeword set, the first codeword set may further include at least one ninth codeword in addition to the at least one first codeword. For example, a quantity of at least one ninth codeword may be 1 or may be greater than 1. One column of the ninth codeword includes two non-zero elements and two zero elements, the remaining two columns other than this column include only one non-zero element, and non-zero elements in different columns of the ninth codeword occupy different rows. The ninth codeword is a non-coherent codeword.

For example, the at least one ninth codeword may include $$\frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix}, \text{ or } \frac{1}{2}\begin{bmatrix}1&0&0\\0&1&0\\1&0&0\\0&0&1\end{bmatrix} \text{ and } \frac{1}{2}\begin{bmatrix}1&0&0\\0&1&0\\-1&0&0\\0&0&1\end{bmatrix}.$$

In a possible implementation of the first codeword set, the first codeword set may include one third codeword and one ninth codeword. For example, the first codeword set includes $$\frac{1}{2\sqrt{3}}\begin{bmatrix}1&1&1\\1&-1&1\\1&1&-1\\1&-1&-1\end{bmatrix} \text{ and } \frac{1}{2}\begin{bmatrix}1&0&0\\0&1&0\\1&0&0\\0&0&1\end{bmatrix}.$$

Therefore, the network device can be supported in selecting different beams for PUSCH sending.

In an optional implementation, a value of the power scaling factor corresponding to the ninth codeword may be 1. For a 4×3 codeword, the first codeword set may include a non-coherent codeword. The power scaling factor is set, so that the terminal device can send uplink data at full power even when sending the uplink data by using the non-coherent codeword (for example, the ninth codeword).

In a possible implementation of the first codeword set, the first codeword set includes or includes only $$\frac{1}{2}\begin{bmatrix} 1 \\ 1 \\ j \\ j \end{bmatrix}, \frac{1}{2}\begin{bmatrix} 1 & 0 \\ 0 & 1 \\ 1 & 0 \\ 0 & -j \end{bmatrix}, \text{and } \frac{1}{2}\begin{bmatrix} 1 & 0 & 0 \\ 0 & 1 & 0 \\ 1 & 0 & 0 \\ 0 & 0 & 1 \end{bmatrix}.$$

In a possible implementation of the first codeword set, the first codeword set includes or includes only $$\frac{1}{2}\begin{bmatrix} 1 \\ 1 \\ j \\ j \end{bmatrix}, \frac{1}{2\sqrt{2}}\begin{bmatrix} 1 & 1 \\ 1 & 1 \\ 1 & -1 \\ 1 & -1 \end{bmatrix}, \text{and } \frac{1}{2\sqrt{3}}\begin{bmatrix} 1 & 1 & 1 \\ 1 & -1 & 1 \\ 1 & 1 & -1 \\ 1 & -1 & -1 \end{bmatrix}.$$

In conclusion, in addition to the at least one first codeword, the first codeword set may further include one or any combination of the following: the at least one second codeword, the at least one third codeword, the at least one fourth codeword, the at least one fifth codeword, the at least one sixth codeword, the at least one eighth codeword, or the at least one ninth codeword. For example, the first codeword set includes only the at least one first codeword. Alternatively, the first codeword set includes only the at least one first codeword and the at least one fourth codeword. Alternatively, the first codeword set includes only the at least one first codeword, the at least one second codeword, and the at least one third codeword. Alternatively, the first codeword set includes only the at least one first codeword, the at least one second codeword, the at least one third codeword, and the at least one fourth codeword. Alternatively, the first codeword set includes only the at least one first codeword, the at least one fourth codeword, the at least one fifth codeword, the at least one sixth codeword, and the at least one eighth codeword. Alternatively, the first codeword set includes the at least one first codeword, the at least one second codeword, the at least one third codeword, the at least one fourth codeword, the at least one fifth codeword, the at least one sixth codeword, the at least one eighth codeword, and the at least one ninth codeword. Certainly, the first codeword set may further include another codeword in addition to the foregoing one or more codewords. This is not specifically limited.

For example, the first codeword set may include one or more codebook subsets, and each of the one or more codebook subsets may include one or more codewords. For example, the first codeword set may include one or more of a codebook subset 1, a codebook subset 2, a codebook subset 3, or a codebook subset 4. For example, the first codeword set includes only the codebook subset 1. Alternatively, the first codeword set includes only the codebook subset 1 and the codebook subset 2. Alternatively, the first codeword set includes only the codebook subset 2, the codebook subset 3, and the codebook subset 4. Alternatively, the first codeword set includes the codebook subset 1, the codebook subset 2, the codebook subset 3, and the codebook subset 4.

For example, the codebook subset 1 may include one of the following codewords or any combination of the following plurality of codewords: the at least one first codeword, the at least one second codeword, or the at least one third codeword. For example, the codebook subset 1 includes only the at least one first codeword. Alternatively, the codebook subset 1 includes only the at least one second codeword and the at least one third codeword. Alternatively, the codebook subset 1 includes the at least one first codeword, the at least one second codeword, and the at least one third codeword. In an example, the codebook subset 1 may include one first codeword, one second codeword, and one third codeword. Certainly, the codebook subset 1 may further include another codeword.

For example, the codebook subset 1 may include one of the following codewords or any combination of the following plurality of codewords:

$$\frac{1}{2}\begin{bmatrix} 1 \\ 1 \\ j \\ j \end{bmatrix}, \frac{1}{2\sqrt{2}}\begin{bmatrix} 1 & 1 \\ 1 & 1 \\ 1 & -1 \\ 1 & -1 \end{bmatrix}, \text{or } \frac{1}{2\sqrt{3}}\begin{bmatrix} 1 & 1 & 1 \\ 1 & -1 & 1 \\ 1 & 1 & -1 \\ 1 & -1 & -1 \end{bmatrix}.$$

For example, the codebook subset 1 includes $$\frac{1}{2}\begin{bmatrix} 1 \\ 1 \\ j \\ j \end{bmatrix}.$$

Alternatively, the codebook subset 1 includes $$\frac{1}{2\sqrt{2}}\begin{bmatrix} 1 & 1 \\ 1 & 1 \\ 1 & -1 \\ 1 & -1 \end{bmatrix}.$$

Alternatively, the codebook subset 1 includes $$\frac{1}{2}\begin{bmatrix} 1 \\ 1 \\ j \\ j \end{bmatrix} \text{and } \frac{1}{2\sqrt{2}}\begin{bmatrix} 1 & 1 \\ 1 & 1 \\ 1 & -1 \\ 1 & -1 \end{bmatrix}.$$

Alternatively, the codebook subset 1 includes $$\frac{1}{2}\begin{bmatrix} 1 \\ 1 \\ j \\ j \end{bmatrix}, \frac{1}{2\sqrt{2}}\begin{bmatrix} 1 & 1 \\ 1 & 1 \\ 1 & -1 \\ 1 & -1 \end{bmatrix}, \text{and } \frac{1}{2\sqrt{3}}\begin{bmatrix} 1 & 1 & 1 \\ 1 & -1 & 1 \\ 1 & 1 & -1 \\ 1 & -1 & -1 \end{bmatrix}.$$

For another example, the codebook subset 1 may include one of the following codewords or any combination of the following plurality of codewords:

$$\frac{1}{2}\begin{bmatrix} 1 \\ 1 \\ j \\ j \end{bmatrix}, \frac{1}{2}\begin{bmatrix} 1 & 0 \\ 0 & 1 \\ 1 & 0 \\ 0 & -j \end{bmatrix}, \text{or } \frac{1}{2}\begin{bmatrix} 1 & 0 & 0 \\ 0 & 1 & 0 \\ 1 & 0 & 0 \\ 0 & 0 & 1 \end{bmatrix}.$$

For example, the codebook subset 1 includes $$\frac{1}{2}\begin{bmatrix}1\\1\\j\\j\end{bmatrix}.$$

Alternatively, the codebook subset 1 includes $$\frac{1}{2}\begin{bmatrix}1\\1\\j\\j\end{bmatrix} \text{ and } \frac{1}{2}\begin{bmatrix}1&0\\0&1\\1&0\\0&-j\end{bmatrix}.$$

Alternatively, the codebook subset 1 includes $$\frac{1}{2}\begin{bmatrix}1\\1\\j\\j\end{bmatrix},\ \frac{1}{2}\begin{bmatrix}1&0\\0&1\\1&0\\0&-j\end{bmatrix},\text{ and }\frac{1}{2}\begin{bmatrix}1&0&0\\0&1&0\\1&0&0\\0&0&1\end{bmatrix}.$$

The codebook subset 2 may include one of the following codewords or any combination of the following plurality of codewords: the at least one first codeword, $$\frac{1}{2}\begin{bmatrix}1\\0\\1\\0\end{bmatrix},\ \frac{1}{2}\begin{bmatrix}0\\1\\0\\1\end{bmatrix},$$

the at least one second codeword, or the at least one third codeword. For example, the codebook subset 2 includes only the at least one first codeword, $$\frac{1}{2}\begin{bmatrix}1\\0\\1\\0\end{bmatrix},\text{ and }\frac{1}{2}\begin{bmatrix}0\\1\\0\\1\end{bmatrix}.$$

Alternatively, the codebook subset 2 includes only the at least one first codeword, the at least one second codeword, $$\frac{1}{2}\begin{bmatrix}1\\0\\1\\0\end{bmatrix},\text{ and }\frac{1}{2}\begin{bmatrix}0\\1\\0\\1\end{bmatrix}.$$

Alternatively, the codebook subset 2 includes the at least one first codeword, the at least one second codeword, the at least one third codeword, $$\frac{1}{2}\begin{bmatrix}1\\0\\1\\0\end{bmatrix},\text{ and }\frac{1}{2}\begin{bmatrix}0\\1\\0\\1\end{bmatrix}.$$

In an example, the codebook subset 2 may include one first codeword, one second codeword, one third codeword, $$\frac{1}{2}\begin{bmatrix}1\\0\\1\\0\end{bmatrix},\text{ and }\frac{1}{2}\begin{bmatrix}0\\1\\0\\1\end{bmatrix}.$$

Certainly, the codebook subset 2 may further include another codeword.

In an optional implementation, the codebook subset 2 may further include the at least one sixth codeword, $$\frac{1}{2}\begin{bmatrix}1&0&0\\0&1&0\\0&0&1\\0&0&0\end{bmatrix},$$

or the at least one sixth codeword and $$\frac{1}{2}\begin{bmatrix}1&0&0\\0&1&0\\0&0&1\\0&0&0\end{bmatrix}.$$

For example, the codebook subset 2 may include one of the following codewords or any combination of the following plurality of codewords:

$$\frac{1}{2}\begin{bmatrix}1\\1\\j\\j\end{bmatrix},\ \frac{1}{2}\begin{bmatrix}1\\0\\1\\0\end{bmatrix},\ \frac{1}{2}\begin{bmatrix}0\\1\\0\\1\end{bmatrix},\ \frac{1}{2}\begin{bmatrix}1&0\\0&1\\1&0\\0&-j\end{bmatrix},\text{ or }\frac{1}{2}\begin{bmatrix}1&0&0\\0&1&0\\1&0&0\\0&0&1\end{bmatrix}.$$

For example, the codebook subset 2 includes $$\frac{1}{2}\begin{bmatrix}1\\1\\j\\j\end{bmatrix},\ \frac{1}{2}\begin{bmatrix}1\\0\\1\\0\end{bmatrix},\text{ and }\frac{1}{2}\begin{bmatrix}0\\1\\0\\1\end{bmatrix}.$$

Alternatively, the codebook subset 2 includes $$\frac{1}{2}\begin{bmatrix}1\\1\\j\\j\end{bmatrix},\ \frac{1}{2}\begin{bmatrix}1\\0\\1\\0\end{bmatrix},\ \frac{1}{2}\begin{bmatrix}0\\1\\0\\1\end{bmatrix},\text{ and }\frac{1}{2}\begin{bmatrix}1&0\\0&1\\1&0\\0&-j\end{bmatrix}.$$

Alternatively, the codebook subset 2 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \text{ and } \frac{1}{2}\begin{bmatrix}1&0&0\\0&1&0\\1&0&0\\0&0&1\end{bmatrix}.$$

Alternatively, the codebook subset 2 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}1&0\\0&1\\1&0\\0&-j\end{bmatrix}, \text{ and } \frac{1}{2}\begin{bmatrix}1&0&0\\0&1&0\\1&0&0\\0&0&1\end{bmatrix}.$$

In an optional manner, a quantization coefficient corresponding to $$\frac{1}{2}\begin{bmatrix}1\\0\\1\\0\end{bmatrix} \text{ and } \frac{1}{2}\begin{bmatrix}0\\1\\0\\1\end{bmatrix}$$

included in the codebook subset 2 may be $$\frac{1}{\sqrt{2}}.$$

In an optional manner, a quantization coefficient corresponding to the third codeword included in the codebook subset 2 may be $$\frac{1}{\sqrt{3}}.$$

In an optional manner, a quantization coefficient corresponding to $$\frac{1}{2}\begin{bmatrix}1&0&0\\0&1&0\\0&0&1\\0&0&0\end{bmatrix}$$

included in the codebook subset 2 may be $$\frac{1}{\sqrt{3}}.$$

The codebook subset 3 may include one of the following codewords or any combination of the following plurality of codewords: the at least one first codeword, the at least one second codeword, the at least one third codeword, or $$\frac{1}{2}\begin{bmatrix}1\\0\\0\\0\end{bmatrix}.$$

For example, the codebook subset 3 includes only the at least one first codeword and $$\frac{1}{2}\begin{bmatrix}1\\0\\0\\0\end{bmatrix}.$$

Alternatively, the codebook subset 3 includes only the at least one first codeword, the at least one third codeword, and $$\frac{1}{2}\begin{bmatrix}1\\0\\0\\0\end{bmatrix}.$$

Alternatively, the codebook subset 3 includes the at least one first codeword, the at least one second codeword, the at least one third codeword, and $$\frac{1}{2}\begin{bmatrix}1\\0\\0\\0\end{bmatrix}.$$

In an example, the codebook subset 3 may include one first codeword, one second codeword, one third codeword, and $$\frac{1}{2}\begin{bmatrix}1\\0\\0\\0\end{bmatrix}.$$

Certainly, the codebook subset 3 may further include another codeword.

For example, the codebook subset 3 may include one of the following codewords or any combination of the following plurality of codewords:

$$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}1&0\\0&1\\1&0\\0&-j\end{bmatrix}, \text{ or } \frac{1}{2}\begin{bmatrix}1&0&0\\0&1&0\\1&0&0\\0&0&1\end{bmatrix}.$$

For example, the codebook subset 3 includes $$\frac{1}{2}\begin{bmatrix} 1 \\ 1 \\ j \\ j \end{bmatrix} \text{ and } \frac{1}{2}\begin{bmatrix} 1 \\ 0 \\ 0 \\ 0 \end{bmatrix}.$$

Alternatively, the codebook subset 3 includes $$\frac{1}{2}\begin{bmatrix} 1 \\ 1 \\ j \\ j \end{bmatrix}, \frac{1}{2}\begin{bmatrix} 1 \\ 0 \\ 0 \\ 0 \end{bmatrix}, \text{ and } \frac{1}{2}\begin{bmatrix} 1 & 0 \\ 0 & 1 \\ 1 & 0 \\ 0 & -j \end{bmatrix}.$$

Alternatively, the codebook subset 3 includes $$\frac{1}{2}\begin{bmatrix} 1 \\ 1 \\ j \\ j \end{bmatrix}, \frac{1}{2}\begin{bmatrix} 1 \\ 0 \\ 0 \\ 0 \end{bmatrix}, \text{ and } \frac{1}{2}\begin{bmatrix} 1 & 0 & 0 \\ 0 & 1 & 0 \\ 1 & 0 & 0 \\ 0 & 0 & 1 \end{bmatrix}.$$

Alternatively, the codebook subset 3 includes $$\frac{1}{2}\begin{bmatrix} 1 \\ 1 \\ j \\ j \end{bmatrix}, \frac{1}{2}\begin{bmatrix} 1 \\ 0 \\ 0 \\ 0 \end{bmatrix}, \frac{1}{2}\begin{bmatrix} 1 & 0 \\ 0 & 1 \\ 1 & 0 \\ 0 & -j \end{bmatrix}, \text{ and } \frac{1}{2}\begin{bmatrix} 1 & 0 & 0 \\ 0 & 1 & 0 \\ 1 & 0 & 0 \\ 0 & 0 & 1 \end{bmatrix}.$$

In an optional manner, a quantization coefficient corresponding to $$\frac{1}{2}\begin{bmatrix} 1 \\ 0 \\ 0 \\ 0 \end{bmatrix}$$

included in the codebook subset 3 may be 1.

The codebook subset 4 may include one of the following codewords or any combination of the following plurality of codewords: the at least one first codeword, the at least one second codeword, the at least one third codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ or } \frac{1}{2}\begin{bmatrix} 0 \\ 1 \\ 0 \\ 1 \end{bmatrix}.$$

For example, the codebook subset 4 may include only the at least one first codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

Alternatively, the codebook subset 4 may include only the at least one second codeword and the at least one third codeword. Alternatively, the codebook subset 4 may include only the at least one first codeword, the at least one second codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

Alternatively, the codebook subset 4 may include the at least one first codeword, the at least one second codeword, the at least one third codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

In an example, the codebook subset 4 may include one first codeword, one second codeword, one third codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

Certainly, the codebook subset 4 may further include another codeword.

In an optional implementation, the codebook subset 4 may further include the at least one sixth codeword, $$\frac{1}{2}\begin{bmatrix} 1 & 0 & 0 \\ 0 & 1 & 0 \\ 0 & 0 & 1 \\ 0 & 0 & 0 \end{bmatrix},$$

or the at least one sixth codeword and $$\frac{1}{2}\begin{bmatrix} 1 & 0 & 0 \\ 0 & 1 & 0 \\ 0 & 0 & 1 \\ 0 & 0 & 0 \end{bmatrix}.$$

For example, the codebook subset 4 may include one of the following codewords or any combination of the following plurality of codewords:

$$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}1\\0\\0\\0\end{bmatrix}, \frac{1}{2}\begin{bmatrix}1&0\\0&1\\1&0\\0&-j\end{bmatrix}, \text{ or } \frac{1}{2}\begin{bmatrix}1&0&0\\0&1&0\\1&0&0\\0&0&1\end{bmatrix}.$$

For example, the codebook subset 4 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \text{ and } \frac{1}{2}\begin{bmatrix}1\\0\\0\\0\end{bmatrix}.$$

Alternatively, the codebook subset 4 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}1\\0\\0\\0\end{bmatrix}, \text{ and } \frac{1}{2}\begin{bmatrix}1&0\\0&1\\1&0\\0&-j\end{bmatrix}.$$

Alternatively, the codebook subset 4 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}1\\0\\0\\0\end{bmatrix}, \text{ and } \frac{1}{2}\begin{bmatrix}1&0&0\\0&1&0\\1&0&0\\0&0&1\end{bmatrix}.$$

Alternatively, the codebook subset 4 includes $$\frac{1}{2}\begin{bmatrix}1\\1\\j\\j\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}1\\0\\0\\0\end{bmatrix}, \frac{1}{2}\begin{bmatrix}1&0\\0&1\\1&0\\0&-j\end{bmatrix}, \text{ and } \frac{1}{2}\begin{bmatrix}1&0&0\\0&1&0\\1&0&0\\0&0&1\end{bmatrix}.$$

In an optional manner, a quantization coefficient corresponding to $$\frac{1}{2}\begin{bmatrix}1\\0\\1\\0\end{bmatrix} \text{ and } \frac{1}{2}\begin{bmatrix}0\\1\\0\\1\end{bmatrix}$$

included in the codebook subset 4 may be 1 or $$\frac{1}{\sqrt{2}}.$$

In an optional manner, a quantization coefficient corresponding to $$\frac{1}{2}\begin{bmatrix}1\\0\\0\\0\end{bmatrix}$$

included in the codebook subset 4 may be 1.

In an optional manner, a quantization coefficient corresponding to the third codeword included in the codebook subset 4 may be 1 or $$\frac{1}{\sqrt{2}}.$$

In an optional manner, a quantization coefficient corresponding to $$\frac{1}{2}\begin{bmatrix}1&0&0\\0&1&0\\1&0&0\\0&0&1\end{bmatrix}$$

included in the codebook subset 4 may be $$\frac{1}{\sqrt{3}}.$$

In addition to the several codebook subsets, the first codeword set may further include another codebook subset. This is not specifically limited.

In addition, the network device may also determine the first codeword set. The step of determining the first codeword set by the network device may be performed before or after S203, or the step and S203 may be performed simultaneously.

S204: The terminal device sends first capability indication information to the network device, and the network device receives the first capability indication information from the terminal device, where the first capability indication information is used to indicate that the terminal device supports a first codebook subset included in the first codeword set.

It should be understood that S204 may be included in S201, that is, the first capability indication information sent by the terminal device is used to indicate whether transmit power of the terminal device in S201 can reach rated maximum transmit power of a system. For example, if a terminal device having a non-coherent capability reports that the terminal device supports the first codebook subset included in the first codeword set, it indicates that transmit power of the terminal device can reach the rated maximum transmit power of the system.

Alternatively, the first capability indication information sent by the terminal device is used to indicate whether the terminal device in S201 supports a transmission mechanism for full-power sending or a power control mechanism. For example, if a terminal device having a non-coherent capability reports that the terminal device supports the first codebook subset included in the first codeword set, it indicates that a transmission mechanism supported by the terminal device is virtualizing a plurality of antenna ports into one antenna port for a DMRS or a PUSCH, so that transmit power of PAs that corresponds to the plurality of antenna ports and that cannot reach the rated maximum transmit power of the system is combined to form one antenna port whose transmit power can reach the rated maximum transmit power of the system.

In addition, the first capability indication information sent by the terminal device to the network device may further indicate a maximum quantity of columns of the codeword supported by the terminal device in the first codeword set. For example, the terminal device supports a maximum of two columns. In this case, when selecting a codeword for the terminal device, the network device may select a codeword including one column or a codeword including two columns, so that the selected codeword can be supported by the terminal device, to ensure normal sending of uplink data.

Alternatively, the terminal device may indicate, by using other indication information, a maximum quantity of columns of the codeword supported by the terminal device in the first codeword set. For example, the terminal device sends second capability indication information to the network device, where the second capability indication information is used to indicate a maximum quantity of columns of the codeword supported by the terminal device in the first codeword set. After receiving the second capability indication information from the terminal device, the network device may determine the maximum quantity of columns of the codeword supported by the terminal device in the first codeword set. The first capability indication information and the second capability indication information may be carried in a same message for sending, or may be carried in different messages for sending. If the first capability indication information and the second capability indication information are carried in the different messages for sending, the terminal device may first send the first capability indication information and then send the second capability indication information, may first send the second capability indication information and then send the first capability indication information, or may simultaneously send the first capability indication information and the second capability indication information.

Alternatively, the terminal device reports a codeword that can be supported in the first codeword set, where a maximum quantity of columns of the codeword that can be supported represents a maximum quantity that is of PUSCH transport layers and that can be supported when the terminal device supports use of the first codeword set.

After determining the first codeword set, the terminal device may determine the codebook subset supported by the terminal device, and notify the network device of a determining result. Therefore, the network device may select a corresponding codeword for the terminal device from the codebook subset supported by the terminal device. For example, the first codebook subset may be one of codebook subsets included in the first codeword set. For example, if the first codeword set includes the codebook subset 1 and the codebook subset 2, the first codebook subset may be the codebook subset 1 or the codebook subset 2. Alternatively, if the first codeword set includes only the codebook subset 1, the first codebook subset may be the codebook subset 1. Alternatively, if the first codeword set includes the codebook subset 1, the codebook subset 2, the codebook subset 3, and the codebook subset 4, the first codebook subset may be one of the codebook subset 1, the codebook subset 2, the codebook subset 3, or the codebook subset 4.

It should be understood that step S201 may be before step S202. To be specific, the codeword included in the first codebook subset is predefined in a protocol. Then, the terminal device reports the capability information in S201 based on the codeword in the first codebook subset. If the terminal device having the non-coherent capability supports the first codebook subset, the network device may configure the first codebook subset for PUSCH transmission.

It should be understood that step S201 may be after step S202. To be specific, the terminal device first determines the first codebook subset included in the first codeword set, and then reports, to the network device, whether the terminal device supports the first codebook subset and the codeword included in the first codebook subset, so that the network device configures a codeword set for PUSCH transmission based on a capability of the terminal device.

S205: The network device sends first DCI to the terminal device, and the terminal device receives the first DCI from the network device, where the first DCI is used to indicate to select a seventh codeword from the first codebook subset. For example, a quantity of bits included in the first DCI is determined based on a quantity of codewords included in the first codebook subset.

Optionally, the first DCI may indicate to select a codeword from the first codebook subset and the non-coherent codeword set. To be specific, the seventh codeword may be a codeword in the first codebook subset, or a codeword in the non-coherent codeword set. For example, a quantity of bits included in the first DCI may be determined based on a quantity of codewords included in each of the first codebook subset and the non-coherent codeword set.

For example, after receiving the first capability indication information, the network device determines that the terminal device supports the first codebook subset. For example, if the network device schedules, by using the first DCI, the terminal device to send uplink data, the network device may select a codeword from the first codebook subset as a codeword for sending the uplink data by the terminal device. For example, the network device selects the seventh codeword. The network device may indicate, by using the first DCI, the terminal device to select the seventh codeword.

After receiving the first DCI, the terminal device may select the seventh codeword from the first codebook subset.

Alternatively, the terminal device may not need to send the first capability indication information to the network device, that is, S204 may not be performed. In this case, the network device may send the first DCI to the terminal device, to indicate to select the seventh codeword from the first codebook subset. In this case, the network device may not know a capability of the terminal device, that is, does not know the codebook subset supported by the terminal device. Therefore, the network device may independently select a corresponding codebook subset as the first codebook subset, and select the seventh codeword from the codebook subset. For example, the network device may determine the first codebook subset based on empirical information (for example, the network device knows capabilities of a plurality of terminal devices covered by the network device. This may be used as empirical information). Alternatively, even in this case, the network device may select the first codebook subset based on a capability of the terminal device. For example, the codebook subset supported by the terminal device is known to the network device in advance. For example, the terminal device reports the codebook subset to the network device in another manner, or the network device learns of the codebook subset by using a core network device. In this case, the network device may select the first codebook subset based on the capability of the terminal device, to select the seventh codeword.

Alternatively, even if S204 is performed, that is, the terminal device sends the first capability indication information to the network device, the network device does not select the codebook subset based on a capability of the terminal device. In this case, the first codebook subset is not selected based on the capability of the terminal device.

S206: The terminal device sends, based on the seventh codeword, uplink data scheduled by using the first DCI.

The terminal device precodes, based on the seventh codeword, the uplink data scheduled by using the first DCI, and then sends the precoded uplink data.

Optionally, the terminal device determines actual transmit power of the uplink data and transmit power on each antenna port based on the seventh codeword in the first codeword set. The actual transmit power is channel transmit power, that is, a maximum value of the actual transmit power can reach the rated maximum transmit power of the system. In this embodiment of this application, even the first codeword set determined by the terminal device having the non-coherent capability may include a first codeword, and the first codeword may be a 4×1 fully-coherent codeword. The terminal device sends the uplink data to the network device by using the fully-coherent codeword, so that power for sending the uplink data can reach the rated maximum transmit power, to improve sending quality of the uplink data, and also improve transmit power utilization of the terminal device. Alternatively, the network device may determine that the terminal device precodes the uplink data by using the seventh codeword, so that the network device can receive the uplink data based on the seventh codeword.

Figure 3:
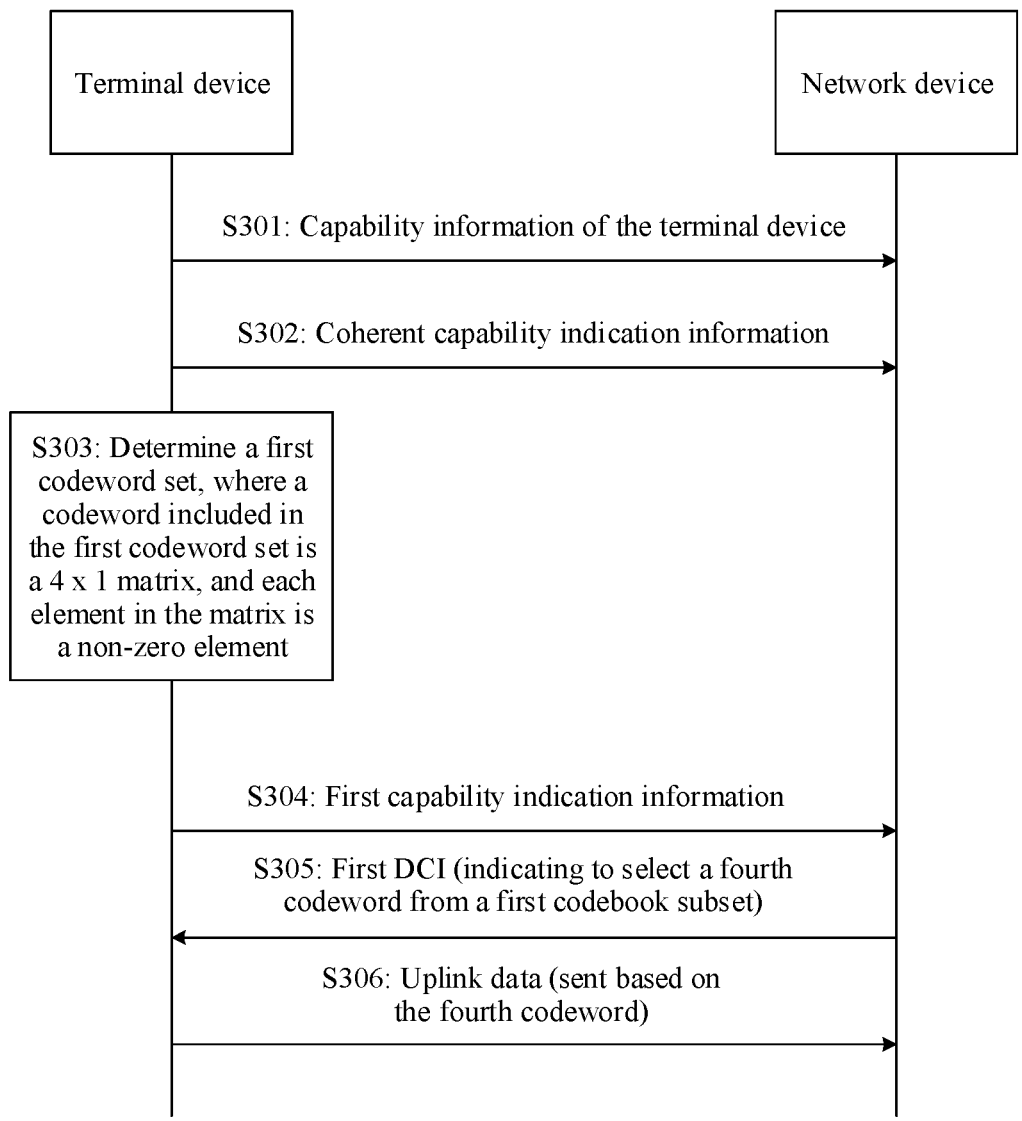
FIG. 3 is a schematic flowchart of a second communications method according to an embodiment of this application.

The embodiment shown in FIG. 2 is mainly specific to the terminal device having the non-coherent capability. A terminal device having a partially-coherent capability can also implement full-power sending by using the technical solutions provided in the embodiments of this application. The following embodiment of this application provides another communications method. The communications method may be mainly applied to a terminal device having a partially-coherent capability. As shown in FIG. 3, a specific process of the communications method is described as follows: Any two or more steps in FIG. 3 may form a solution that needs to be protected in this embodiment of this application, and other steps are optional. For example, a solution including S301 and S302 falls within the protection scope of this embodiment of this application.

S301: A terminal device sends capability information of the terminal device to a network device, and the network device receives the capability information from the terminal device.

For S301, refer to the descriptions of S201 in the embodiment shown in FIG. 2.

S302: The terminal device sends coherent capability indication information to the network device, and the network device receives the coherent capability indication information from the terminal device, where the coherent capability indication information is used to indicate that the terminal device has a partially-coherent capability.

In this embodiment of this application, the terminal device is, for example, the terminal device having the partially-coherent capability. The terminal device having the partially-coherent capability may support a partially-coherent codeword set and a non-coherent codeword set. The non-coherent codeword set includes only at least one second codeword, and each column of the second codeword includes only one non-zero element; and the partially-coherent codeword set includes only at least one third codeword, and each column of the third codeword includes only two non-zero elements.

For example, the at least one second codeword included in the non-coherent codeword set may include one of the following codewords or any combination of the following plurality of codewords: a 4×1 non-coherent codeword, a 4×2 non-coherent codeword, or 4×3 non-coherent codeword. For example, the at least one second codeword may include only the 4×1 non-coherent codeword, include only the 4×1 non-coherent codeword and the 4×2 non-coherent codeword, or include the 4×1 non-coherent codeword, the 4×2 non-coherent codeword, and the 4×3 non-coherent codeword. The at least one second codeword included in the non-coherent codeword set may be the at least one fourth codeword included in the non-coherent codeword set in the embodiment shown in FIG. 2. For related descriptions, refer to the descriptions of the at least one fourth codeword included in the non-coherent codeword set in the embodiment in FIG. 2.

For example, the at least one third codeword included in the partially-coherent codeword set may include one of the following codewords or any combination of the following plurality of codewords: a 4×1 partially-coherent codeword, a 4×2 partially-coherent codeword, or a 4×3 partially-coherent codeword. For example, the at least one third codeword may include only the 4×1 partially-coherent codeword, include only the 4×1 partially-coherent codeword and the 4×2 partially-coherent codeword, or include the 4×1 partially-coherent codeword, the 4×2 partially-coherent codeword, and the 4×3 partially-coherent codeword.

The 4×1 partially-coherent codeword includes, for example, one or more of the following:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \text{or } \frac{1}{2}\begin{bmatrix}0\\1\\0\\-j\end{bmatrix}.$$

For example, the 4×1 partially-coherent codeword includes $$\frac{1}{2}\begin{bmatrix}1\\0\\1\\0\end{bmatrix}.$$

Alternatively, the 4×1 partially-coherent codeword includes $$\frac{1}{2}\begin{bmatrix}1\\0\\1\\0\end{bmatrix} \text{ and } \frac{1}{2}\begin{bmatrix}1\\0\\-1\\0\end{bmatrix}.$$

Alternatively, the 4×1 partially-coherent codeword includes $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \text{and } \frac{1}{2}\begin{bmatrix}1\\0\\-j\\0\end{bmatrix}.$$

Alternatively, the 4×1 partially-coherent codeword includes $$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \text{ and }\frac{1}{2}\begin{bmatrix}0\\1\\0\\-j\end{bmatrix}.$$

The 4×2 partially-coherent codeword includes, for example, one or more of the following:

$$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix},$$

$$\frac{1}{2}\begin{bmatrix}1&0\\0&1\\-1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix}, \text{ or } \frac{1}{2}\begin{bmatrix}1&0\\0&1\\j&0\\0&-1\end{bmatrix}.$$

For example, the 4×2 partially-coherent codeword includes $$\frac{1}{2}\begin{bmatrix}1&0\\0&1\\1&0\\0&-j\end{bmatrix}.$$

Alternatively, the 4×2 partially-coherent codeword includes $$\frac{1}{2}\begin{bmatrix}1&0\\0&1\\1&0\\0&-j\end{bmatrix} \text{ and } \frac{1}{2}\begin{bmatrix}1&0\\0&1\\1&0\\0&j\end{bmatrix}.$$

Alternatively, the 4×2 partially-coherent codeword includes $$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \text{ and } \frac{1}{2}\begin{bmatrix}1&0\\0&1\\-j&0\\0&-1\end{bmatrix}.$$

Alternatively, the 4×2 partially-coherent codeword includes $$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix},$$

$$\frac{1}{2}\begin{bmatrix}1&0\\0&1\\-1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix}, \text{ and } \frac{1}{2}\begin{bmatrix}1&0\\0&1\\j&0\\0&-1\end{bmatrix}.$$

The 4×3 partially-coherent codeword includes, for example, $$\frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix}, \text{ or } \frac{1}{2}\begin{bmatrix}1&0&0\\0&1&0\\1&0&0\\0&0&1\end{bmatrix} \text{ and } \frac{1}{2}\begin{bmatrix}1&0&0\\0&1&0\\-1&0&0\\0&0&1\end{bmatrix}.$$

S303. The terminal device determines a first codeword set. The first codeword set includes a codeword corresponding to a 4×1 matrix, and each element in the matrix is a non-zero element.

In this embodiment of this application, the terminal device is, for example, the terminal device having the partially-coherent capability. The terminal device having the partially-coherent capability may support the partially-coherent codeword set and the non-coherent codeword set, and may further support the first codeword set. For example, the terminal device having the partially-coherent capability supports only the partially-coherent codeword set, the non-coherent codeword set, and the first codeword set. Alternatively, the terminal device having the partially-coherent capability may further support another codeword set in addition to the partially-coherent codeword set, the non-coherent codeword set, and the first codeword set.

The non-coherent codeword set and the partially-coherent codeword set are mentioned above. For example, a value of a power scaling factor corresponding to a codeword included in the non-coherent codeword set may be less than a value of a power scaling factor corresponding to a codeword included in the first codeword set. For another example, a value of a power scaling factor corresponding to a codeword included in the partially-coherent codeword set may be less than a value of a power scaling factor corresponding to a codeword included in the first codeword set. The value of the power scaling factor corresponding to the codeword included in the first codeword set is larger, so that the first codeword set can support more types of codewords, and when the terminal device performs uplink transmission by using the codeword included in the first codeword set, rated maximum transmit power can be reached as much as possible regardless of whether the codeword is a non-coherent codeword, a partially-coherent codeword, or a fully-coherent codeword.

For example, the first codeword set may include $$\left\{\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}\right\},$$

or may include $$\left\{\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\-j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}\right\}.$$

Alternatively, the first codeword set includes at least one first codeword, each of the at least one first codeword is a 4×1 matrix, and each element in the first codeword is a non-zero element. The at least one first codeword may include $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\},$$

or may include $$\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix} \right\}.$$

Herein, that the at least one codeword includes $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\}$$

may mean that the at least one first codeword includes all codewords in the set. All the codewords in the set indicate a phase of a coherent antenna port group but do not support a phase between coherent antenna port groups, to avoid redundant codeword indication information and reduce complexity of a scheduling algorithm of the network device. Similarly, that the at least one codeword includes $$\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix} \right\}$$

may also mean that the at least one first codeword includes all codewords in the set. All the codewords in the set indicate a phase of a coherent antenna port group but do not support a phase between coherent antenna port groups, to avoid redundant codeword indication information and reduce complexity of a scheduling algorithm of the network device.

In an implementation of the first codeword set, for example, the first codeword set may further include $$\left\{ \frac{1}{2}\begin{bmatrix}1\\j\\1\\j\end{bmatrix}, \frac{1}{2}\begin{bmatrix}1\\j\\j\\-1\end{bmatrix}, \frac{1}{2}\begin{bmatrix}1\\j\\-1\\-j\end{bmatrix}, \frac{1}{2}\begin{bmatrix}1\\j\\-j\\1\end{bmatrix} \right\},$$

$$\left\{ \frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\j\end{bmatrix} \right\},$$

or $\left\{ \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\-j\\-j\\-1\end{bmatrix} \right\}.$ All the first codewords are fully-coherent codewords. The terminal device having the partially-coherent capability is enabled to use the fully-coherent codewords, so that transmit power of uplink data can be supported to reach rated maximum transmit power, to ensure uplink transmission performance. In addition, the codeword selected in this embodiment of this application can reduce a quantity of redundant bits in DCI, and reduce complexity of baseband processing of the terminal device.

For example, $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\},$$

$$\left\{ \frac{1}{2}\begin{bmatrix}1\\j\\1\\j\end{bmatrix}, \frac{1}{2}\begin{bmatrix}1\\j\\j\\-1\end{bmatrix}, \frac{1}{2}\begin{bmatrix}1\\j\\-1\\-j\end{bmatrix}, \frac{1}{2}\begin{bmatrix}1\\j\\-j\\1\end{bmatrix} \right\},$$

$$\left\{ \frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\j\end{bmatrix} \right\},$$

or $\left\{ \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\-j\\-j\\-1\end{bmatrix} \right\}$ included in the first codeword set may be used for a CP-OFDM waveform.

For another example $$\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix} \right\}$$

or $\left\{ \frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix} \right\},$ $$\left\{ \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix}, \frac{1}{2}\begin{bmatrix}1\\-j\\-1\\j\end{bmatrix}, \frac{1}{2}\begin{bmatrix}1\\-j\\-j\\1\end{bmatrix} \right\}$$

included in the first codeword set may be used for a DFT-s-OFDM waveform.

In an optional implementation, in addition to the at least one first codeword, the first codeword set may further include the at least one second codeword in the non-coherent codeword set, or the first codeword set may further include the non-coherent codeword set. For example, a quantity of at least one second codeword may be 1 or may be greater than 1. For the second codeword or the non-coherent codeword set, refer to the descriptions of S302. For example, a value of a power scaling factor corresponding to the second codeword included in the first codeword set may be 1. The value of the power scaling factor is 1, so that the terminal device can send uplink data at full power even when sending the uplink data by using a non-coherent codeword (for example, the second codeword). In addition, a quantization coefficient of the second codeword in the first codeword set may be the same as or different from a quantization coefficient of the second codeword in the non-coherent codeword set. In an example, the quantization coefficient of the second codeword included in the first codeword set is 1. Certainly, this is not limited thereto.

It should be noted that, if the second codeword is included in the first codeword set, a value of a corresponding power scaling factor may be 1. If the second codeword is included in the non-coherent codeword set but is not included in the first codeword set, a value of a corresponding power scaling factor may be 1/4. For example, if the network device indicates to transmit uplink data (for example, a PUSCH) by using the second codeword in the first codeword set, a value of a power scaling factor used to transmit the uplink data may be 1. Alternatively, if the network device indicates to transmit uplink data (for example, a PUSCH) by using the second codeword in the non-coherent codeword set, a value of a power scaling factor used to transmit the uplink data may be 1/4.

In an optional implementation, in addition to the at least one first codeword, the first codeword set may further include the at least one third codeword in the partially-coherent codeword set, or the first codeword set may further include the partially-coherent codeword set. For example, a quantity of at least one third codeword may be 1 or may be greater than 1. For the third codeword or the partially-coherent codeword set, refer to the descriptions of S302. For example, a value of a power scaling factor corresponding to the third codeword included in the first codeword set may be 1/2 or 1. The value of the power scaling factor is 1/2 or 1, so that the terminal device can send uplink data at full power even when sending the uplink data by using a partially-coherent codeword (for example, the third codeword). In addition, a quantization coefficient of the third codeword in the first codeword set may be the same as or different from a quantization coefficient of the third codeword in the partially-coherent codeword set. In an example, the quantization coefficient of the third codeword included in the first codeword set is 1. Certainly, this is not limited thereto.

It should be noted that, if the third codeword is included in the first codeword set, a value of a corresponding power scaling factor may be 1. If the third codeword is included in the partially-coherent codeword set but is not included in the first codeword set, a value of a corresponding power scaling factor may be 1/2. For example, if the network device indicates to transmit uplink data (for example, a PUSCH) by using the third codeword in the first codeword set, a value of a power scaling factor used to transmit the uplink data may be 1. Alternatively, if the network device indicates to transmit uplink data (for example, a PUSCH) by using the third codeword in the partially-coherent codeword set, a value of a power scaling factor used to transmit the uplink data may be 1/2.

For example, the first codeword set may include one or more codebook subsets, and each of the one or more codebook subsets may include one or more codewords. For example, the first codeword set may include one or more of a codebook subset 1, a codebook subset 2, a codebook subset 3, or a codebook subset 4. For example, the first codeword set includes only the codebook subset 1. Alternatively, the first codeword set includes only the codebook subset 1 and the codebook subset 2. Alternatively, the first codeword set includes only the codebook subset 2, the codebook subset 3, and the codebook subset 4. Alternatively, the first codeword set includes the codebook subset 1, the codebook subset 2, the codebook subset 3, and the codebook subset 4.

For example, the codebook subset 1 may include the at least one first codeword.

The codebook subset 2 may include the at least one first codeword, the at least one third codeword, or the at least one first codeword and the at least one third codeword.

The codebook subset 3 may include the at least one first codeword, the at least one second codeword, or the at least one first codeword and the at least one second codeword.

The codebook subset 4 may include one or any combination of the following: the at least one first codeword, the at least one second codeword, or the at least one third codeword. For example, the codebook subset 4 includes the at least one first codeword. Alternatively, the codebook subset 4 includes the at least one first codeword and the at least one second codeword. Alternatively, the codebook subset 4 includes the at least one second codeword and the at least one third codeword. Alternatively, the codebook subset 4 includes the at least one first codeword, the at least one second codeword, and the at least one third codeword.

In addition to the several codebook subsets, the first codeword set may further include another codebook subset. This is not specifically limited.

In addition, the network device may also determine the first codeword set. The step of determining the first codeword set by the network device may be performed before or after S303, or the step and S303 may be performed simultaneously.

S304: The terminal device sends first capability indication information to the network device, and the network device receives the first capability indication information from the terminal device, where the first capability indication information is used to indicate that the terminal device supports a first codebook subset included in the first codeword set.

It should be understood that S304 may be included in S301, that is, the first capability indication information sent by the terminal device is used to indicate whether transmit power of the terminal device in S301 can reach rated maximum transmit power of a system. For example, if a terminal device having a non-coherent capability reports that the terminal device supports the first codebook subset included in the first codeword set, it indicates that transmit power of the terminal device can reach the rated maximum transmit power of the system.

Alternatively, the first capability indication information sent by the terminal device is used to indicate whether the terminal device in S301 supports a transmission mechanism for full-power sending or a power control mechanism. For example, if a terminal device having a non-coherent capability reports that the terminal device supports the first codebook subset included in the first codeword set, it indicates that a transmission mechanism supported by the terminal device is virtualizing a plurality of antenna ports into one antenna port for a DMRS or a PUSCH, so that transmit power of PAs that corresponds to the plurality of antenna ports and that cannot reach the rated maximum transmit power of the system is combined to form one antenna port whose transmit power can reach the rated maximum transmit power of the system.

In addition, the first capability indication information sent by the terminal device to the network device may further indicate a maximum quantity of columns of the codeword supported by the terminal device in the first codeword set. For example, the terminal device supports a maximum of two columns. In this case, when selecting a codeword for the terminal device, the network device may select a codeword including one column or a codeword including two columns, and does not select a codeword including three columns as much as possible, so that the selected codeword can be supported by the terminal device, to ensure normal sending of uplink data.

Alternatively, the terminal device may indicate, by using other indication information, a maximum quantity of columns of the codeword supported by the terminal device in the first codeword set. For example, the terminal device sends second capability indication information to the network device, where the second capability indication information is used to indicate a maximum quantity of columns of the codeword supported by the terminal device in the first codeword set. After receiving the second capability indication information from the terminal device, the network device may determine the maximum quantity of columns of the codeword supported by the terminal device in the first codeword set. The first capability indication information and the second capability indication information may be carried in a same message for sending, or may be carried in different messages for sending. If the first capability indication information and the second capability indication information are carried in the different messages for sending, the terminal device may first send the first capability indication information and then send the second capability indication information, may first send the second capability indication information and then send the first capability indication information, or may simultaneously send the first capability indication information and the second capability indication information.

After determining the first codeword set, the terminal device may determine the codebook subset supported by the terminal device, and notify the network device of a determining result. Therefore, the network device may select a corresponding codeword for the terminal device from the codebook subset supported by the terminal device. For example, the first codebook subset may be one of codebook subsets included in the first codeword set. For example, if the first codeword set includes the codebook subset 1 and the codebook subset 2, the first codebook subset may be the codebook subset 1 or the codebook subset 2. Alternatively, if the first codeword set includes only the codebook subset 1, the first codebook subset may be the codebook subset 1. Alternatively, if the first codeword set includes the codebook subset 1, the codebook subset 2, the codebook subset 3, and the codebook subset 4, the first codebook subset may be one of the codebook subset 1, the codebook subset 2, the codebook subset 3, or the codebook subset 4.

It should be understood that S301 may be before S302. To be specific, the codeword included in the first codebook subset is predefined in a protocol. Then, the terminal device reports the capability information in S301 based on the codeword in the first codebook subset. If the terminal device having the non-coherent capability supports the first codebook subset, the network device may configure the first codebook subset for PUSCH transmission.

It should be understood that S301 may alternatively be after S302. To be specific, the terminal device first determines the first codebook subset included in the first codeword set, and then reports, to the network device, whether the terminal device supports the first codebook subset and the codeword included in the first codebook subset, so that the network device configures a codebook set for PUSCH transmission based on a capability of the terminal device.

S305: The network device sends first DCI to the terminal device, and the terminal device receives the first DCI from the network device, where the first DCI is used to indicate to select a fourth codeword from the first codebook subset.

Optionally, the first DCI may indicate to select a codeword from the first codebook subset, the partially-coherent codeword set, and the non-coherent codeword set. To be specific, the fourth codeword may be a codeword in the first codebook subset, a codeword in the partially-coherent codeword set, or a codeword in the non-coherent capability codeword set. For example, a quantity of bits included in the first DCI may be determined based on a quantity of codewords included in each of the first codebook subset, the partially-coherent codeword set, and the non-coherent codeword set.

For example, after receiving the first capability indication information, the network device determines that the terminal device supports the first codebook subset. For example, if the network device schedules, by using the first DCI, the terminal device to send uplink data, the network device may select a codeword from the first codebook subset as a codeword for sending the uplink data by the terminal device. For example, the network device selects the fourth codeword. The network device may indicate, by using the first DCI, the terminal device to select the fourth codeword.

After receiving the first DCI, the terminal device may select the fourth codeword from the first codebook subset.

Alternatively, the terminal device may not need to send the first capability indication information to the network device, that is, S304 may not be performed. In this case, the network device may send the first DCI to the terminal device, to indicate to select the fourth codeword from the first codebook subset. In this case, the network device may not know a capability of the terminal device, that is, does not know the codebook subset supported by the terminal device. Therefore, the network device may independently select a corresponding codebook subset as the first codebook subset, and select the fourth codeword from the codebook subset. For example, the network device may determine the first codebook subset based on empirical information (for example, the network device knows capabilities of a plurality of terminal devices covered by the network device. This may be used as empirical information). Alternatively, even in this case, the network device may select the first codebook subset based on a capability of the terminal device. For example, the codebook subset supported by the terminal device is known to the network device in advance. For example, the terminal device reports the codebook subset to the network device in another manner, or the network device learns of the codebook subset by using a core network device. In this case, the network device may select the first codebook subset based on the capability of the terminal device, to select the fourth codeword.

Alternatively, even if S304 is performed, that is, the terminal device sends the first capability indication information to the network device, the network device does not select the codebook subset based on a capability of the terminal device. In this case, the first codebook subset is not selected based on the capability of the terminal device.

S306: The terminal device sends, based on the fourth codeword, uplink data scheduled by using the first DCI.

The terminal device precodes, based on the fourth codeword, the uplink data scheduled by using the first DCI, and then sends the precoded uplink data.

Optionally, the terminal device determines actual transmit power of the uplink data and transmit power on each antenna port based on the fourth codeword in the first codeword set.

The actual transmit power is channel transmit power, that is, a maximum value of the actual transmit power can reach the rated maximum transmit power of the system. In this embodiment of this application, even the first codeword set determined by the terminal device having the partially-coherent capability may include a first codeword, and the first codeword may be a 4×1 fully-coherent codeword. The terminal device sends the uplink data to the network device by using the fully-coherent codeword, so that power for sending the uplink data can reach the rated maximum transmit power, to improve sending quality of the uplink data, and also improve transmit power utilization of the terminal device. Alternatively, the network device may determine that the terminal device precodes the uplink data by using the fourth codeword, so that the network device can receive the uplink data based on the fourth codeword.

The following describes, with reference to the accompanying drawings, apparatuses configured to implement the foregoing methods in the embodiments of this application. Therefore, the foregoing content may be used in the following embodiments. Repeated content is not described again.

Figure 4:
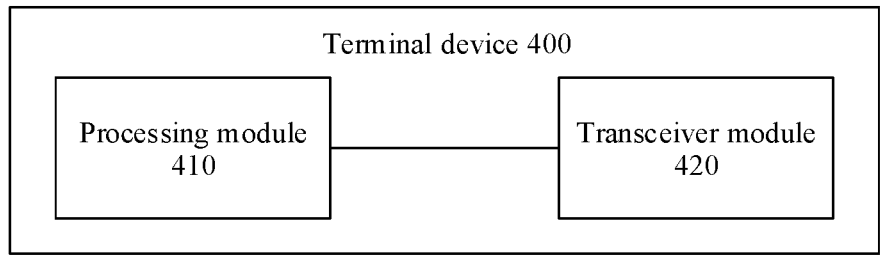
FIG. 4 is a schematic block diagram of a first terminal device according to an embodiment of this application.

FIG. 4 is a schematic block diagram of a communications apparatus 400 according to an embodiment of this application. For example, the communications apparatus 400 is a communications device 400. Alternatively, the communications apparatus 400 is, for example, a chip in a communications device, or a combined device or a component that has the functions of the terminal device in the communications device. For example, the communications device 400 is a terminal device 400.

The terminal device 400 includes a processing module 410. Optionally, the terminal device 400 may further include a transceiver module 420. When the terminal device 400 is a terminal device, the transceiver module 420 may be a transceiver, and may include an antenna, a radio frequency circuit, and the like; and the processing module 410 may be a processor, for example, a baseband processor. The baseband processor may include one or more central processing units (central processing units, CPUs). When the terminal device 400 is the component having the functions of the terminal, the transceiver module 420 may be a radio frequency unit, and the processing module 410 may be a processor, for example, a baseband processor. When the terminal device 400 is a chip system, the transceiver module 420 may be an input/output interface in the chip system (for example, a baseband chip), and the processing module may be a processor in the chip system, and may include one or more central processing units.

The processing module 410 may be configured to perform all operations performed by the terminal device in the embodiment shown in FIG. 2 except the receiving and sending operations, for example, S203, and/or configured to support another process of the technology described in this specification. The transceiver module 420 may be configured to perform all the receiving and sending operations performed by the terminal device in the embodiment shown in FIG. 2, for example, S201, S202, and S204 to S206, and/or configured to support another process of the technology described in this specification.

In addition, the transceiver module 420 may be a functional module. The functional module can implement both a sending operation and a receiving operation. For example, the transceiver module 420 may be configured to perform all sending operations and receiving operations performed by the terminal device in the embodiment shown in FIG. 2. For example, when a sending operation is performed, it may be considered that the transceiver module 420 is a sending module, and when a receiving operation is performed, it may be considered that the transceiver module 420 is a receiving module. Alternatively, the transceiver module 420 may be a general term of two functional modules. The two functional modules are respectively a sending module and a receiving module. The sending module is configured to implement a sending operation. For example, the sending module may be configured to perform all sending operations performed by the terminal device in the embodiment shown in FIG. 2. The receiving module is configured to implement a receiving operation. For example, the receiving module may be configured to perform all receiving operations performed by the terminal device in the embodiment shown in FIG. 2.

For example, the processing module 410 is configured to determine a first codeword set, where the first codeword set includes a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{or } \frac{1}{2}\begin{bmatrix}1\\-j\\-1\\j\end{bmatrix}.$$

In an optional implementation, the transceiver module 420 is configured to send coherent capability indication information, where the coherent capability indication information is used to indicate that the terminal device 400 has a non-coherent capability. The terminal device having the non-coherent capability supports a non-coherent codeword set, the non-coherent codeword set includes only at least one fourth codeword, and each column of the fourth codeword includes only one non-zero element.

In an optional implementation,
the first codeword set further includes a second codeword, the second codeword is a 4×2 matrix, and each element in the second codeword is a non-zero element; and
the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{or } \frac{1}{2\sqrt{2}}\begin{bmatrix}1&1\\-j&-j\\j&-j\\1&-1\end{bmatrix}.$$

In an optional implementation,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1&1&1\\1&-1&1\\1&1&-1\\1&-1&-1\end{bmatrix}, \frac{1}{2\sqrt{3}}\begin{bmatrix}1&1&1\\1&-1&1\\j&j&-j\\j&-j&-j\end{bmatrix},$$

-continued $$\frac{1}{2\sqrt{3}}\begin{bmatrix} 1 & 1 & 1 \\ -1 & 1 & -1 \\ 1 & 1 & -1 \\ -1 & 1 & 1 \end{bmatrix}, \text{ or } \begin{bmatrix} 1 & 1 & 1 \\ -1 & 1 & -1 \\ j & j & -j \\ -j & j & j \end{bmatrix}.$$

In an optional implementation,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

In an optional implementation, the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix} 1 \\ 0 \\ 1 \\ 0 \end{bmatrix} \text{ or } \frac{1}{2}\begin{bmatrix} 0 \\ 1 \\ 0 \\ 1 \end{bmatrix},$$

and a value of a power scaling factor corresponding to the fifth codeword included in the first codeword set is 1.

In an optional implementation,
the transceiver module 420 is further configured to send first capability indication information, where the first capability indication information is used to indicate that the terminal device 400 supports a first codebook subset included in the first codeword set, and the first codebook subset includes a codebook subset 1 or a codebook subset 2, where
the codebook subset 1 includes the first codeword, the second codeword, and the third codeword; and
the codebook subset 2 includes the first codeword, the second codeword, the third codeword, $$\frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

In an optional implementation,
the transceiver module 420 is further configured to send first capability indication information, where the first capability indication information is used to indicate that the terminal device 400 supports a first codebook subset included in the first codeword set, and the first codebook subset is a codebook subset 1, a codebook subset 2, a codebook subset 3, or a codebook subset 4, where
the codebook subset 1 includes the first codeword, the second codeword, and the third codeword;
the codebook subset 2 includes the first codeword, the second codeword, the third codeword, $$\frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix};$$

the codebook subset 3 includes the first codeword, the second codeword, the third codeword, and $$\frac{1}{2}\begin{bmatrix} 1 \\ 0 \\ 0 \\ 0 \end{bmatrix};$$

and
the codebook subset 4 includes the first codeword, the second codeword, the third codeword, $$\frac{1}{2}\begin{bmatrix} 1 \\ 0 \\ 0 \\ 0 \end{bmatrix}, \frac{1}{2}\begin{bmatrix} 1 \\ 0 \\ 1 \\ 0 \end{bmatrix}, \text{ and } \frac{1}{2}\begin{bmatrix} 0 \\ 1 \\ 0 \\ 1 \end{bmatrix}.$$

In an optional implementation,
the codebook subset 2 further includes the at least one fourth codeword and/or a codeword $$\frac{1}{2}\begin{bmatrix} 1 & 0 & 0 \\ 0 & 1 & 0 \\ 0 & 0 & 1 \\ 0 & 0 & 0 \end{bmatrix};$$

and/or
the codebook subset 4 further includes the at least one fourth codeword and/or a codeword $$\frac{1}{2}\begin{bmatrix} 1 & 0 & 0 \\ 0 & 1 & 0 \\ 0 & 0 & 1 \\ 0 & 0 & 0 \end{bmatrix},$$

and the fourth codeword is a codeword whose dimension is 4×2 in the first codeword set.

In an optional implementation, the transceiver module 420 is further configured to: receive first DCI, where the first DCI is used to indicate to select a seventh codeword from the first codebook subset; and send, based on the seventh codeword, uplink data scheduled by using the first DCI.

It should be understood that the processing module 410 in this embodiment of this application may be implemented by a processor or a processor-related circuit component, and the transceiver module 420 may be implemented by a transceiver or a transceiver-related circuit component.

Figure 5:
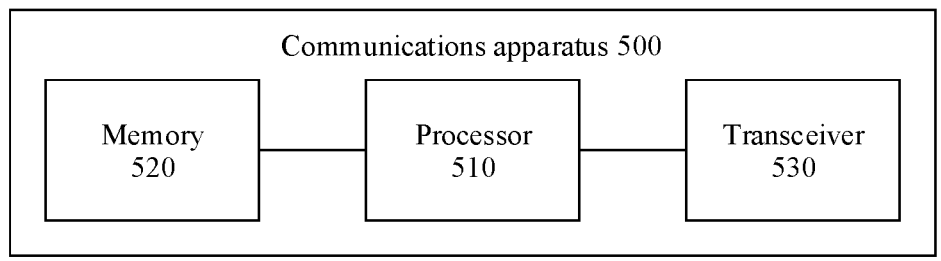
FIG. 5 is another schematic block diagram of a first terminal device according to an embodiment of this application.

As shown in FIG. 5, an embodiment of this application further provides a communications apparatus 500. For example, the communications apparatus 500 is a communications device 500. Alternatively, the communications apparatus 500 is, for example, a chip in a communications device, or a combined device or a component that has the functions of the terminal device in the communications device. For example, the communications device is a terminal device or a chip system. The communications apparatus 500 includes a processor 510, a memory 520, and a transceiver 530. The memory 520 stores instructions or a program. The processor 510 is configured to execute the instructions or the program stored in the memory 520. When the instructions or the program stored in the memory 520 is executed, the processor 510 is configured to perform an operation performed by the processing module 410 in the foregoing embodiment, and the transceiver 530 is configured to perform an operation performed by the transceiver module 420 in the foregoing embodiment.

The transceiver 530 may be a functional unit. The functional unit can implement both a sending operation and a receiving operation. For example, the transceiver 530 may be configured to perform all sending operations and receiving operations performed by the terminal device in the embodiment shown in FIG. 2. For example, when a sending operation is performed, it may be considered that the transceiver 530 is a transmitter, and when a receiving operation is performed, it may be considered that the transceiver 530 is a receiver. Alternatively, the transceiver 530 may be a general term of two functional units. The two functional units are respectively a transmitter and a receiver. The transmitter is configured to implement a sending operation. For example, the transmitter may be configured to perform all sending operations performed by the terminal device in the embodiment shown in FIG. 2. The receiver is configured to implement a receiving operation. For example, the receiver may be configured to perform all receiving operations performed by the terminal device in the embodiment shown in FIG. 2.

It should be understood that the communications apparatus 400 or the communications apparatus 500 in the embodiments of this application may implement the functions of the terminal device in the embodiment shown in FIG. 2, and operations and/or functions of the modules in the communications apparatus 400 or the communications apparatus 500 are intended to implement corresponding procedures in the embodiment shown in FIG. 2. For brevity, details are not described herein again.

Figure 6:
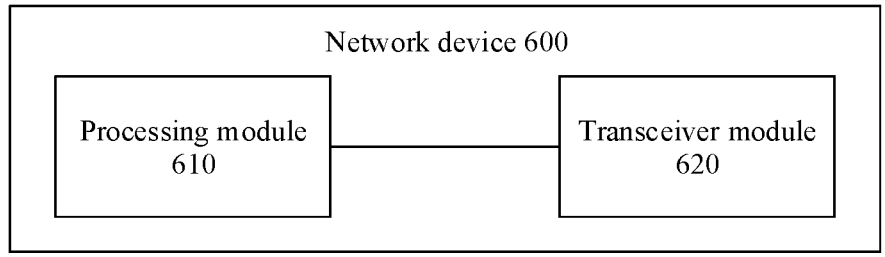
FIG. 6 is a schematic block diagram of a first network device according to an embodiment of this application.

FIG. 6 is a schematic block diagram of a communications apparatus 600 according to an embodiment of this application. For example, the communications apparatus 600 is a communications device 600. Alternatively, the communications apparatus 600 is, for example, a chip in a communications device, or a combined device or a component that has the functions of the network device in the communications device. For example, the communications device 600 is a network device 600.

The network device 600 includes a processing module 610. Optionally, the network device 600 may further include a transceiver module 620. When the network device 600 is a terminal device, the transceiver module 620 may be a transceiver, and may include an antenna, a radio frequency circuit, and the like; and the processing module 610 may be a processor, and the processor may include one or more CPUs. When the network device 600 is the component having the functions of the network device, the transceiver module 620 may be a radio frequency unit, and the processing module 610 may be a processor, for example, a baseband processor. When the network device 600 is a chip system, the transceiver module 620 may be an input/output interface in the chip system (for example, a baseband chip), and the processing module may be a processor in the chip system, and may include one or more central processing units.

The processing module 610 may be configured to perform all operations performed by the network device in the embodiment shown in FIG. 2 except the receiving and sending operations, for example, an operation of determining the first codeword set, and/or configured to support another process of the technology described in this specification. The transceiver module 620 may be configured to perform all the receiving and sending operations performed by the network device in the embodiment shown in FIG. 2, for example, S201, S202, and S204 to S206, and/or configured to support another process of the technology described in this specification.

In addition, the transceiver module 620 may be a functional module. The functional module can implement both a sending operation and a receiving operation. For example, the transceiver module 620 may be configured to perform all sending operations and receiving operations performed by the network device in the embodiment shown in FIG. 2. For example, when a sending operation is performed, it may be considered that the transceiver module 620 is a sending module, and when a receiving operation is performed, it may be considered that the transceiver module 620 is a receiving module. Alternatively, the transceiver module 620 may be a general term of two functional modules. The two functional modules are respectively a sending module and a receiving module. The sending module is configured to implement a sending operation. For example, the sending module may be configured to perform all sending operations performed by the network device in the embodiment shown in FIG. 2. The receiving module is configured to implement a receiving operation. For example, the receiving module may be configured to perform all receiving operations performed by the network device in the embodiment shown in FIG. 2.

For example, the processing module 610 is configured to determine a first codeword set, where the first codeword set includes a first codeword, the first codeword is a 4×1 matrix, and each element in the matrix is a non-zero element; and the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{or } \frac{1}{2}\begin{bmatrix}1\\-j\\-1\\j\end{bmatrix}.$$

In an optional implementation, the transceiver module 620 is configured to receive coherent capability indication information, where the coherent capability indication information is used to indicate that a terminal device has a non-coherent capability. The terminal device having the non-coherent capability supports a non-coherent codeword set, the non-coherent codeword set includes only at least one fourth codeword, and each column of the fourth codeword includes only one non-zero element.

In an optional implementation, the first codeword set further includes a second codeword, the second codeword is a 4×2 matrix, and each element in the second codeword is a non-zero element; and the second codeword is one of the following codewords:

$$\frac{1}{2\sqrt{2}}\begin{bmatrix}1 & 1\\1 & 1\\1 & -1\\1 & -1\end{bmatrix}, \frac{1}{2\sqrt{2}}\begin{bmatrix}1 & 1\\1 & 1\\j & -j\\j & -j\end{bmatrix}, \frac{1}{2\sqrt{2}}\begin{bmatrix}1 & 1\\j & j\\1 & -1\\j & -j\end{bmatrix}, \frac{1}{2\sqrt{2}}\begin{bmatrix}1 & 1\\j & j\\j & -j\\-1 & 1\end{bmatrix},$$

$$\frac{1}{2\sqrt{2}}\begin{bmatrix}1 & 1\\-1 & -1\\1 & -1\\-1 & 1\end{bmatrix}, \frac{1}{2\sqrt{2}}\begin{bmatrix}1 & 1\\-1 & -1\\j & -j\\-j & j\end{bmatrix}, \frac{1}{2\sqrt{2}}\begin{bmatrix}1 & 1\\-j & -j\\1 & -1\\-j & j\end{bmatrix}, \text{ or } \frac{1}{2\sqrt{2}}\begin{bmatrix}1 & 1\\-j & -j\\j & -j\\1 & -1\end{bmatrix}.$$

In an optional implementation,
the first codeword set further includes a third codeword, the third codeword is a 4×3 matrix, and each element in the third codeword is a non-zero element; and
the third codeword is one of the following codewords:

$$\frac{1}{2\sqrt{3}}\begin{bmatrix}1 & 1 & 1\\1 & -1 & 1\\1 & 1 & -1\\1 & -1 & -1\end{bmatrix}, \frac{1}{2\sqrt{3}}\begin{bmatrix}1 & 1 & 1\\1 & -1 & 1\\j & j & -j\\j & -j & -j\end{bmatrix},$$

$$\frac{1}{2\sqrt{3}}\begin{bmatrix}1 & 1 & 1\\-1 & 1 & -1\\1 & 1 & -1\\-1 & 1 & 1\end{bmatrix}, \text{ or } \frac{1}{2\sqrt{3}}\begin{bmatrix}1 & 1 & 1\\-1 & 1 & -1\\j & j & -j\\-j & j & j\end{bmatrix}.$$

In an optional implementation,
the first codeword set further includes at least one fourth codeword, and a quantity of columns of the fourth codeword included in the first codeword set is not greater than 3; and
a value of a power scaling factor corresponding to the fourth codeword included in the first codeword set is 1.

In an optional implementation,
the first codeword set further includes at least one fifth codeword, the fifth codeword is a 4×1 matrix, and each column of the matrix includes only two non-zero elements; and the at least one fifth codeword includes one or more of the following codewords:

$$\frac{1}{2}\begin{bmatrix}1\\0\\1\\0\end{bmatrix} \text{ or } \frac{1}{2}\begin{bmatrix}0\\1\\0\\1\end{bmatrix},$$

and a value of a power scaling factor corresponding to the fifth codeword included in the first codeword set is 1.

In an optional implementation,
the transceiver module 620 is further configured to receive first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword, the second codeword, and the third codeword; and
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix}.$$

In an optional implementation,
the transceiver module 620 is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword, the second codeword, and the third codeword;
the codebook subset 2 includes the first codeword, the second codeword, the third codeword, $$\frac{1}{2}\begin{bmatrix}1\\0\\1\\0\end{bmatrix}, \text{ and } \frac{1}{2}\begin{bmatrix}0\\1\\0\\1\end{bmatrix};$$

the codebook subset 3 includes the first codeword, the second codeword, the third codeword, and $$\frac{1}{2}\begin{bmatrix}1\\0\\0\\0\end{bmatrix};$$

and
the codebook subset 4 includes the first codeword, the second codeword, the third codeword, $$\frac{1}{2}\begin{bmatrix}1\\0\\0\\0\end{bmatrix}, \frac{1}{2}\begin{bmatrix}1\\0\\1\\0\end{bmatrix}, \text{ and } \frac{1}{2}\begin{bmatrix}0\\1\\0\\1\end{bmatrix}.$$

In an optional implementation,
the codebook subset 2 further includes the at least one fourth codeword and/or a codeword $$\frac{1}{2}\begin{bmatrix}1 & 0 & 0\\0 & 1 & 0\\0 & 0 & 1\\0 & 0 & 0\end{bmatrix};$$

and/or the codebook subset 4 further includes the at least one fourth codeword and/or a codword $$\frac{1}{2}\begin{bmatrix} 1 & 0 & 0 \\ 0 & 1 & 0 \\ 0 & 0 & 1 \\ 0 & 0 & 0 \end{bmatrix},$$

and the fourth codeword is a codeword whose dimension is 4×2 in the first codeword set.

In an optional implementation, the transceiver module 620 is further configured to:

send first DCI, where the first DCI is used to indicate the terminal device to select a seventh codeword from the first codebook subset, and the seventh codeword is used to send uplink data scheduled by using the first DCI; and receive, based on the seventh codeword, the uplink data scheduled by using the first DCI.

It should be understood that the processing module 610 in this embodiment of this application may be implemented by a processor or a processor-related circuit component, and the transceiver module 620 may be implemented by a transceiver or a transceiver-related circuit component.

Figure 7:
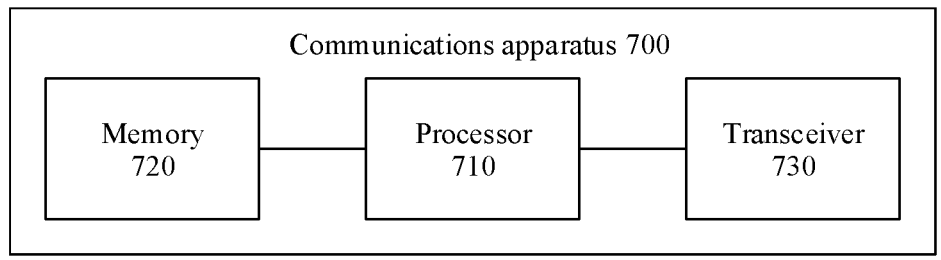
FIG. 7 is another schematic block diagram of a first network device according to an embodiment of this application.

As shown in FIG. 7, an embodiment of this application further provides a communications apparatus 700. For example, the communications apparatus 700 is a communications device 700. Alternatively, the communications apparatus 700 is, for example, a chip in a communications device, or a combined device or a component that has the functions of the terminal device in the communications device. For example, the communications device is network device or a chip system. The communications apparatus 700 includes a processor 710, a memory 720, and a transceiver 730. The memory 720 stores instructions or a program. The processor 710 is configured to execute the instructions or the program stored in the memory 720. When the instructions or the program stored in the memory 720 is executed, the processor 710 is configured to perform an operation performed by the processing module 610 in the foregoing embodiment, and the transceiver 730 is configured to perform an operation performed by the transceiver module 620 in the foregoing embodiment.

The transceiver 730 may be a functional unit. The functional unit can implement both a sending operation and a receiving operation. For example, the transceiver 630 may be configured to perform all sending operations and receiving operations performed by the terminal device in the embodiment shown in FIG. 2. For example, when a sending operation is performed, it may be considered that the transceiver 630 is a transmitter, and when a receiving operation is performed, it may be considered that the transceiver 630 is a receiver. Alternatively, the transceiver 630 may be a general term of two functional units. The two functional units are respectively a transmitter and a receiver. The transmitter is configured to implement a sending operation. For example, the transmitter may be configured to perform all sending operations performed by the network device in the embodiment shown in FIG. 2. The receiver is configured to implement a receiving operation. For example, the receiver may be configured to perform all receiving operations performed by the network device in the embodiment shown in FIG. 2.

It should be understood that the communications apparatus 600 or the communications apparatus 700 in the embodiments of this application may implement the functions of the network device in the embodiment shown in FIG. 2, and operations and/or functions of the modules in the communications apparatus 600 or the communications apparatus 700 are intended to implement corresponding procedures in the embodiment shown in FIG. 2. For brevity, details are not described herein again.

Figure 8:
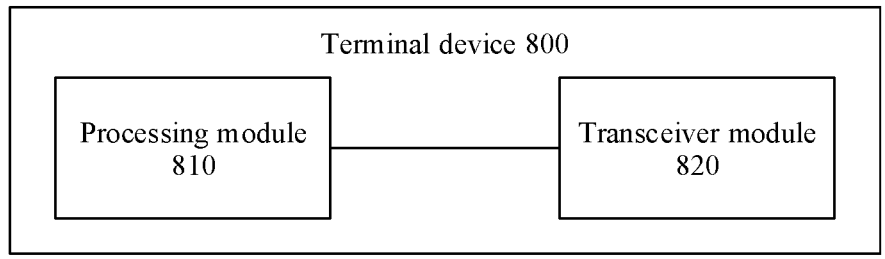
FIG. 8 is a schematic block diagram of a second terminal device according to an embodiment of this application.

FIG. 8 is a schematic block diagram of a communications apparatus 800 according to an embodiment of this application. For example, the communications apparatus 800 is a communications device 800. Alternatively, the communications apparatus 800 is, for example, a chip in a communications device, or a combined device or a component that has the functions of the terminal device in the communications device. For example, the communications device 800 is a network device 800.

The network device 800 includes a processing module 810. Optionally, the network device 800 may further include a transceiver module 820. When the network device 800 is a terminal device, the transceiver module 820 may be a transceiver, and may include an antenna, a radio frequency circuit, and the like; and the processing module 810 may be a processor, and the processor may include one or more CPUs. When the terminal device 800 is the component having the functions of the terminal, the transceiver module 820 may be a radio frequency unit, and the processing module 810 may be a processor, for example, a baseband processor. When the network device 800 is a chip system, the transceiver module 820 may be an input/output interface in the chip system (for example, a baseband chip), and the processing module may be a processor in the chip system, and may include one or more central processing units.

The processing module 810 may be configured to perform all operations performed by the terminal device in the embodiment shown in FIG. 3 except the receiving and sending operations, for example, S303, and/or configured to support another process of the technology described in this specification. The transceiver module 820 may be configured to perform all the receiving and sending operations performed by the terminal device in the embodiment shown in FIG. 3, for example, S301, S302, and S304 to S306, and/or configured to support another process of the technology described in this specification.

In addition, the transceiver module 820 may be a functional module. The functional module can implement both a sending operation and a receiving operation. For example, the transceiver module 820 may be configured to perform all sending operations and receiving operations performed by the terminal device in the embodiment shown in FIG. 3. For example, when a sending operation is performed, it may be considered that the transceiver module 820 is a sending module, and when a receiving operation is performed, it may be considered that the transceiver module 820 is a receiving module. Alternatively, the transceiver module 820 may be a general term of two functional modules. The two functional modules are respectively a sending module and a receiving module. The sending module is configured to implement a sending operation. For example, the sending module may be configured to perform all sending operations performed by the terminal device in the embodiment shown in FIG. 3. The receiving module is configured to implement a receiving operation. For example, the receiving module may be configured to perform all receiving operations performed by the terminal device in the embodiment shown in FIG. 3.

For example, the processing module 810 is configured to determine a first codeword set, where the first codeword set includes at least one first codeword, and the at least one first codeword includes $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}\right\} \text{ or }$$

$$\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}\right\},$$

$$\left\{ \frac{1}{2}\begin{bmatrix}1\\1\\-j\\-j\end{bmatrix}, \frac{1}{2}\begin{bmatrix}1\\1\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}\right\}.$$

In an optional implementation, the transceiver module 820 is configured to send coherent capability indication information, where the coherent capability indication information is used to indicate that the terminal device has a partially-coherent capability. The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

In an optional implementation,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

In an optional implementation,
the transceiver module 820 is further configured to send first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword; and
the codebook subset 2 includes the first codeword and the at least one third codeword.

In an optional implementation,
the transceiver module 820 is further configured to send first capability indication information, where the first capability indication information is used to indicate that the terminal device 800 supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

In an optional implementation,
the transceiver module 820 is further configured to receive first DCI, where the first DCI is used to indicate to select a fourth codeword from the first codebook subset; and
the processing module 810 is further configured to send, based on the fourth codeword, uplink data scheduled by using the first DCI.

It should be understood that the processing module 810 in this embodiment of this application may be implemented by a processor or a processor-related circuit component, and the transceiver module 820 may be implemented by a transceiver or a transceiver-related circuit component.

Figure 9:
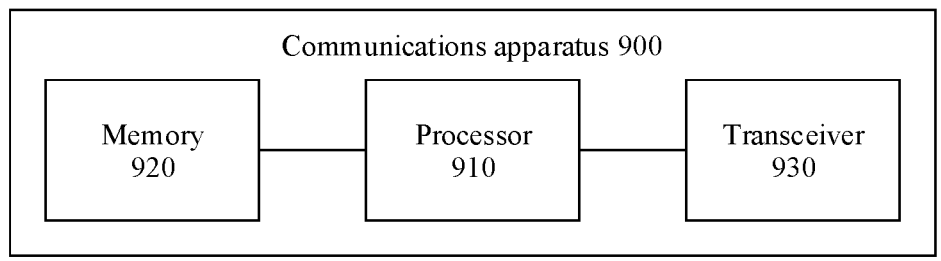
FIG. 9 is another schematic block diagram of a second terminal device according to an embodiment of this application.

As shown in FIG. 9, an embodiment of this application further provides a communications apparatus 900. For example, the communications apparatus 900 is a communications device 900. Alternatively, the communications apparatus 900 is, for example, a chip in a communications device, or a combined device or a component that has the functions of the terminal device in the communications device. For example, the communications device is a terminal device or a chip system. The communications apparatus 900 includes a processor 910, a memory 920, and a transceiver 930. The memory 920 stores instructions or a program. The processor 910 is configured to execute the instructions or the program stored in the memory 920. When the instructions or the program stored in the memory 920 is executed, the processor 910 is configured to perform an operation performed by the processing module 810 in the foregoing embodiment, and the transceiver 930 is configured to perform an operation performed by the transceiver module 820 in the foregoing embodiment.

The transceiver 930 may be a functional unit. The functional unit can implement both a sending operation and a receiving operation. For example, the transceiver 930 may be configured to perform all sending operations and receiving operations performed by the terminal device in the embodiment shown in FIG. 3. For example, when a sending operation is performed, it may be considered that the transceiver 930 is a transmitter, and when a receiving operation is performed, it may be considered that the transceiver 930 is a receiver. Alternatively, the transceiver 930 may be a general term of two functional units. The two functional units are respectively a transmitter and a receiver. The transmitter is configured to implement a sending operation. For example, the transmitter may be configured to perform all sending operations performed by the terminal device in the embodiment shown in FIG. 3. The receiver is configured to implement a receiving operation. For example, the receiver may be configured to perform all receiving operations performed by the terminal device in the embodiment shown in FIG. 3.

It should be understood that the communications apparatus 800 or the communications apparatus 900 in the embodiments of this application may implement the functions of the terminal device in the embodiment shown in FIG. 3, and operations and/or functions of the modules in the communications apparatus 800 or the communications apparatus 900 are intended to implement corresponding procedures in the embodiment shown in FIG. 3. For brevity, details are not described herein again.

Figure 10:
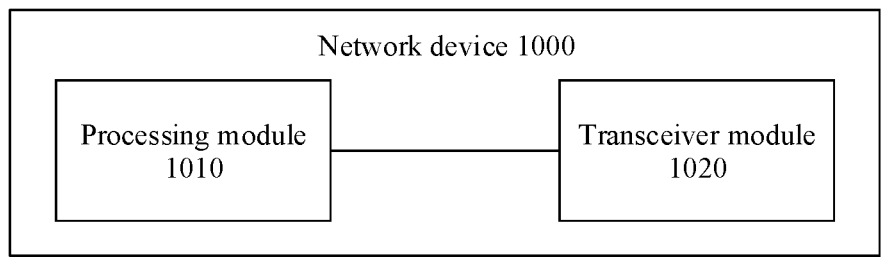
FIG. 10 is a schematic block diagram of a second network device according to an embodiment of this application.

FIG. 10 is a schematic block diagram of a communications apparatus 1000 according to an embodiment of this application. For example, the communications apparatus 1000 is a communications device 1000. Alternatively, the communications apparatus 1000 is, for example, a chip in a communications device, or a combined device or a component that has the functions of the network device in the communications device. For example, the communications device 1000 is a network device 1000.

The network device 1000 includes a processing module 1010. Optionally, the network device 1000 may further include a transceiver module 1020. When the network device 1000 is a network device, the transceiver module 1020 may be a transceiver, and may include an antenna, a radio frequency circuit, and the like; and the processing module 1010 may be a processor, and the processor may include one or more CPUs. When the network device 1000 is the component having the functions of the network device, the transceiver module 1020 may be a radio frequency unit, and the processing module 1010 may be a processor, for example, a baseband processor. When the network device 1000 is a chip system, the transceiver module 1020 may be an input/output interface in the chip system (for example, a baseband chip), and the processing module may be a processor in the chip system, and may include one or more central processing units.

The processing module 1010 may be configured to perform all operations performed by the network device in the embodiment shown in FIG. 3 except the receiving and sending operations, for example, an operation of determining the first codeword set, and/or configured to support another process of the technology described in this specification. The transceiver module 1020 may be configured to perform all the receiving and sending operations performed by the network device in the embodiment shown in FIG. 3, for example, S301, S302, and S304 to S306, and/or configured to support another process of the technology described in this specification.

In addition, the transceiver module 1020 may be a functional module. The functional module can implement both a sending operation and a receiving operation. For example, the transceiver module 1020 may be configured to perform all sending operations and receiving operations performed by the network device in the embodiment shown in FIG. 3. For example, when a sending operation is performed, it may be considered that the transceiver module 1020 is a sending module, and when a receiving operation is performed, it may be considered that the transceiver module 1020 is a receiving module. Alternatively, the transceiver module 1020 may be a general term of two functional modules. The two functional modules are respectively a sending module and a receiving module. The sending module is configured to implement a sending operation. For example, the sending module may be configured to perform all sending operations performed by the network device in the embodiment shown in FIG. 3. The receiving module is configured to implement a receiving operation. For example, the receiving module may be configured to perform all receiving operations performed by the network device in the embodiment shown in FIG. 3.

For example, the processing module 1010 is configured to determine a first codeword set, where the first codeword set includes at least one first codeword, and the at least one first codeword includes $$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix} \right\} \text{ or }$$

$$\left\{ \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix} \right\},$$

$$\left\{ \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix} \right\}.$$

In an optional implementation, the transceiver module 1020 is configured to receive coherent capability indication information, where the coherent capability indication information is used to indicate that the terminal device has a partially-coherent capability. The terminal device having the partially-coherent capability supports a partially-coherent codeword set and a non-coherent codeword set; the non-coherent codeword set includes only at least one second codeword, and each column of the second codeword includes only one non-zero element; and the partially-coherent codeword set includes only at least one third codeword, and each column of the third codeword includes only two non-zero elements.

In an optional implementation,
the first codeword set further includes at least one second codeword, and a value of a power scaling factor corresponding to the second codeword is 1; and/or
the first codeword set further includes at least one third codeword, and a value of a power scaling factor corresponding to the third codeword is 1.

In an optional implementation,
the transceiver module 1020 is further configured to receive first capability indication information, where the first capability indication information is used to indicate that the terminal device supports a first codebook subset included in the first codeword set, and the first codebook subset includes a codebook subset 1 or a codebook subset 2, where
the codebook subset 1 includes the first codeword; and
the codebook subset 2 includes the first codeword and the at least one third codeword.

In an optional implementation,
the transceiver module 1020 is further configured to receive first capability indication information, where the first capability indication information is used to indicate that the terminal device supports a first codebook subset included in the first codeword set, and the first codebook subset is a codebook subset 1, a codebook subset 2, a codebook subset 3, or a codebook subset 4, where
the codebook subset 1 includes the first codeword;
the codebook subset 2 includes the first codeword and the at least one third codeword;
the codebook subset 3 includes the first codeword and the at least one second codeword; and
the codebook subset 4 includes the first codeword, the at least one second codeword, and the at least one third codeword.

In an optional implementation, the transceiver module 1020 is further configured to:

send first DCI, where the first DCI is used to indicate the terminal device to select a fourth codeword from the first codebook subset, and the fourth codeword is used to send uplink data scheduled by using the first DCI; and receive, based on the fourth codeword, the uplink data scheduled by using the first DCI.

It should be understood that the processing module 1010 in this embodiment of this application may be implemented by a processor or a processor-related circuit component, and the transceiver module 1020 may be implemented by a transceiver or a transceiver-related circuit component.

Figure 11:
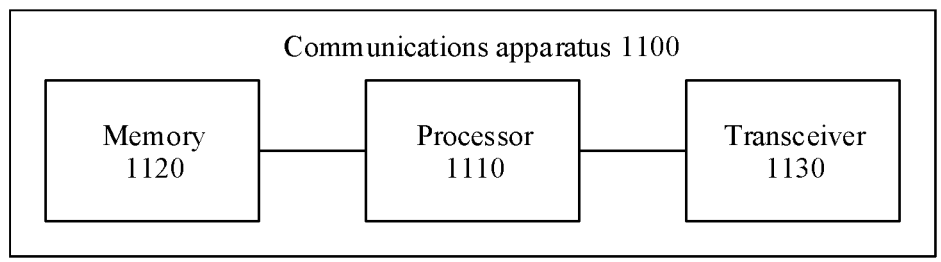
FIG. 11 is another schematic block diagram of a second network device according to an embodiment of this application.

As shown in FIG. 11, an embodiment of this application further provides a communications apparatus 1100. For example, the communications apparatus 1100 is a communications device 1100. Alternatively, the communications apparatus 1100 is, for example, a chip in a communications device, or a combined device or a component that has the functions of the terminal device in the communications device. For example, the communications device is network device or a chip system. The communications apparatus 1100 includes a processor 1110, a memory 1120, and a transceiver 1130. The memory 1120 stores instructions or a program. The processor 1110 is configured to execute the instructions or the program stored in the memory 1120. When the instructions or the program stored in the memory 1120 is executed, the processor 1110 is configured to perform an operation performed by the processing module 1010 in the foregoing embodiment, and the transceiver 1130 is configured to perform an operation performed by the transceiver module 1020 in the foregoing embodiment.

The transceiver 1130 may be a functional unit. The functional unit can implement both a sending operation and a receiving operation. For example, the transceiver 1130 may be configured to perform all sending operations and receiving operations performed by the terminal device in the embodiment shown in FIG. 3. For example, when a sending operation is performed, it may be considered that the transceiver 1130 is a transmitter, and when a receiving operation is performed, it may be considered that the transceiver 1130 is a receiver. Alternatively, the transceiver 1130 may be a general term of two functional units. The two functional units are respectively a transmitter and a receiver. The transmitter is configured to implement a sending operation. For example, the transmitter may be configured to perform all sending operations performed by the network device in the embodiment shown in FIG. 3. The receiver is configured to implement a receiving operation. For example, the receiver may be configured to perform all receiving operations performed by the network device in the embodiment shown in FIG. 3.

It should be understood that the communications apparatus 1000 or the communications apparatus 1100 in the embodiments of this application may implement the functions of the network device in the embodiment shown in FIG. 3, and operations and/or functions of the modules in the communications apparatus 1000 or the communications apparatus 1100 are intended to implement corresponding procedures in the embodiment shown in FIG. 3. For brevity, details are not described herein again.

An embodiment of this application further provides a communications apparatus. The communications apparatus may be a terminal device or a circuit. The communications apparatus may be configured to perform an action performed by the terminal device in the foregoing method embodiments.

Figure 12:
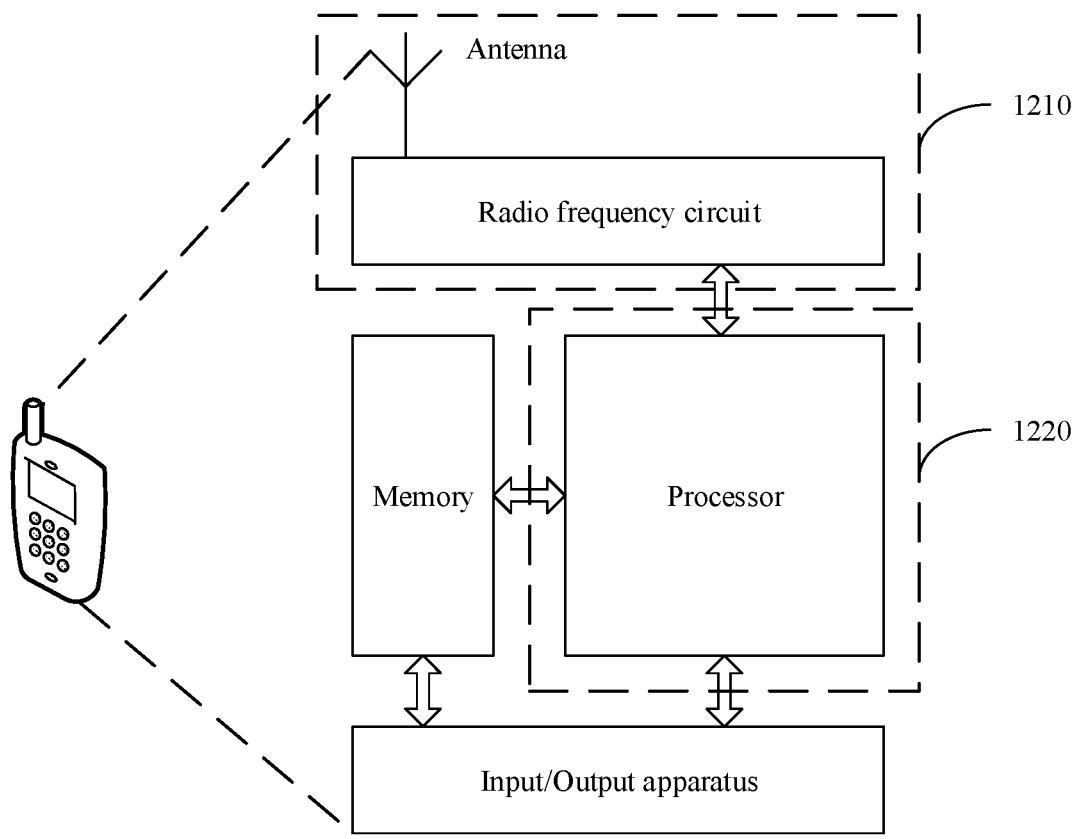
FIG. 12 is a schematic block diagram of a communications apparatus according to an embodiment of this application.

When the communications apparatus is a terminal device, FIG. 12 is a simplified schematic diagram of a structure of a terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, for example, a touchscreen, a display, or a keyboard, is mainly configured to: receive data entered by a user, and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. An actual terminal device product may include one or more processors and one or more memories. The memory may also be referred to as a storage medium, a storage device, or the like. The memory may be disposed independent of the processor, or may be integrated into the processor. This is not limited in this embodiment of this application.

In the embodiments of this application, the radio frequency circuit and the antenna that has receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1210 is configured to perform a sending operation and a receiving operation on a terminal device side in the foregoing method embodiments, and the processing unit 1220 is configured to perform an operation other than the receiving and sending operations of the terminal device in the foregoing method embodiments.

For example, in an implementation, the transceiver unit 1210 is configured to perform all sending operations and receiving operations performed by the terminal device in the embodiment shown in FIG. 2, for example, S203, and/or the transceiver unit 1210 is further configured to support another process of the technology described in this specification. The processing unit 1220 is configured to perform all operations performed by the terminal device in the embodiment shown in FIG. 2 except the receiving and sending operations, for example, S201, S202, and S204 to S206, and/or the processing unit 1220 is further configured to support another process of the technology described in this specification.

For another example, in another implementation, the transceiver unit 1210 is configured to perform all sending operations and receiving operations performed by the terminal device in the embodiment shown in FIG. 3, for example, S303, and/or the transceiver unit 1210 is further configured to support another process of the technology described in this specification. The processing unit 1220 is configured to perform all operations performed by the terminal device in the embodiment shown in FIG. 3 except the receiving and sending operations, for example, S301, S302, and S304 to S306, and/or the processing unit 1220 is further configured to support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 13:
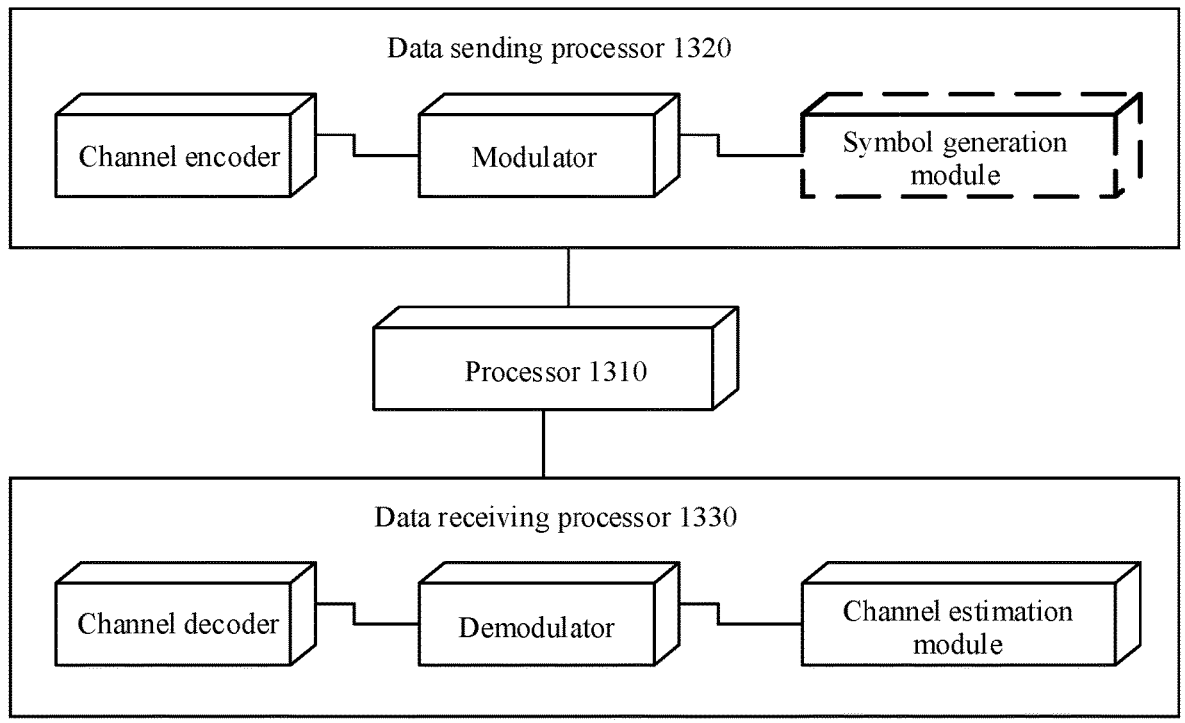
FIG. 13 is another schematic block diagram of a communications apparatus according to an embodiment of this application.

When the communications apparatus in this embodiment is a terminal device, reference may be made to a device shown in FIG. 13. In an example, the device can implement functions similar to the functions of the processor 510 in FIG. 5. Alternatively, in an example, the device can implement functions similar to the functions of the processor 910 in FIG. 9. In FIG. 13, the device includes a processor 1310, a data sending processor 1320, and a data receiving processor 1330. The processing module 410 in the foregoing embodiment may be the processor 1310 in FIG. 13, and completes corresponding functions. The transceiver module 420 in the foregoing embodiment may be the data sending processor 1320 and/or the data receiving processor 1330 in FIG. 13. Alternatively, the processing module 810 in the foregoing embodiment may be the processor 1310 in FIG. 13, and completes corresponding functions. The transceiver module 820 in the foregoing embodiment may be the data sending processor 1320 and/or the data receiving processor 1330 in FIG. 13. Although FIG. 13 shows a channel encoder and a channel decoder, it may be understood that these modules are merely examples, and do not constitute a limitation on this embodiment.

Figure 14:
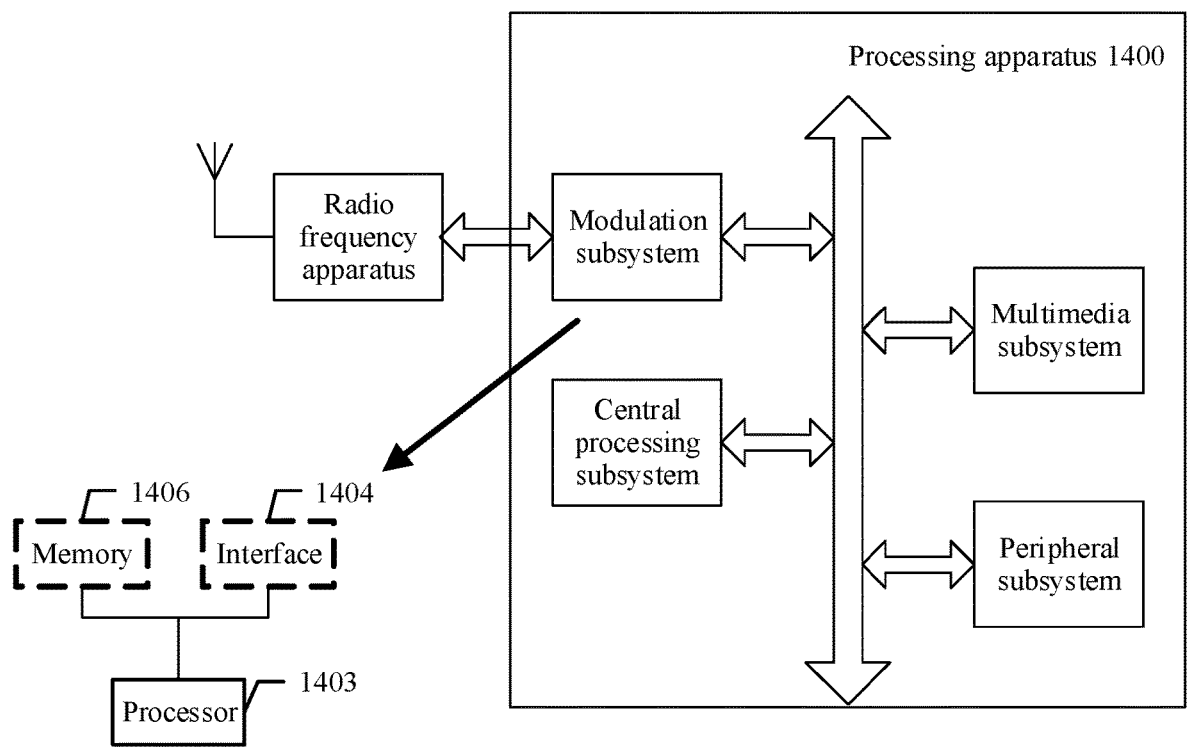
FIG. 14 is still another schematic block diagram of a communications apparatus according to an embodiment of this application.

FIG. 14 shows another form of this embodiment. A processing apparatus 1400 includes modules such as a modulation subsystem, a central processing subsystem, and a peripheral subsystem. The communications apparatus in this embodiment may be used as the modulation subsystem in the processing apparatus. Specifically, the modulation subsystem may include a processor 1403 and an interface 1404. The processor 1403 implements functions of the processing module 410, and the interface 1404 implements functions of the transceiver module 420. Alternatively, the processor 1403 implements functions of the processing module 810, and the interface 1404 implements functions of the transceiver module 820. In another variation, the modulation subsystem includes a memory 1406, a processor 1403, and a program that is stored in the memory 1406 and that can be run on the processor. When executing the program, the processor 1403 implements the method on the terminal device side in the foregoing method embodiments. It should be noted that the memory 1406 may be non-volatile or volatile. The memory 1406 may be located inside the modulation subsystem, or may be located in the processing apparatus 1400, provided that the memory 1406 can be connected to the processor 1403.

Figure 15:
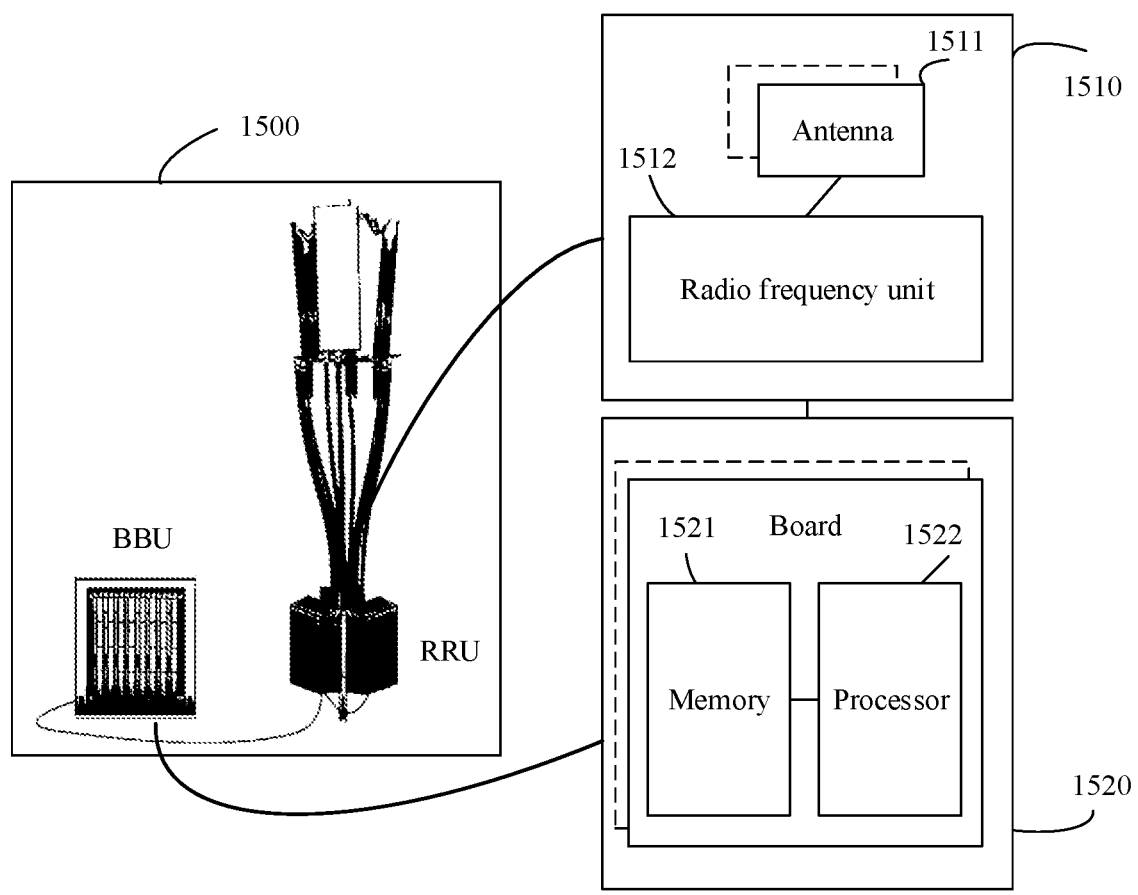
FIG. 15 is yet another schematic block diagram of a communications apparatus according to an embodiment of this application.

When the apparatus in this embodiment of this application is a network device, the apparatus may be shown in FIG. 15. An apparatus 1500 includes one or more radio frequency units, such as a remote radio unit (remote radio unit, RRU) 1510 and one or more baseband units (baseband units, BBUs) (which may also be referred to as digital units (digital units, DUs)) 1520. The RRU 1510 may be referred to as a transceiver module, and corresponds to the transceiver module 1010 in FIG. 10. Optionally, the transceiver module may also be referred to as a transceiver machine, a transceiver circuit, a transceiver, or the like, and may include at least one antenna 1511 and a radio frequency unit 1512. The RRU 1510 is mainly configured to: receive and send a radio frequency signal, and perform conversion between the radio frequency signal and a baseband signal. For example, the RRU 1510 is configured to send indication information to a terminal device. The BBU 1520 is mainly configured to: perform baseband processing, control a base station, and the like. The RRU 1510 and the BBU 1520 may be physically disposed together, or may be physically separated, that is, in a distributed base station.

The BBU 1520 is a control center of the base station, and may also be referred to as a processing module. The BBU 1520 may correspond to the processing module 610 in FIG. 6, or may correspond to the processing module 1010 in FIG. 10. The BBU 1520 is mainly configured to implement a baseband processing function such as channel coding, multiplexing, modulation, or spreading. For example, the BBU (processing module) 1520 may be configured to control the base station to perform an operation procedure related to the network device in the foregoing method embodiments, for example, generate the foregoing indication information.

In an example, the BBU 1520 may include one or more boards, and a plurality of boards may jointly support a radio access network (for example, an LTE network) in a single access standard, or may separately support radio access networks (for example, an LTE network, a 5G network, and another network) in different access standards. The BBU 1520 further includes a memory 1521 and a processor 1522. The memory 1521 is configured to store necessary instructions and data. The processor 1522 is configured to control the base station to perform a necessary action. For example, the processor 1522 is configured to control the base station to perform an operation procedure related to the network device in the foregoing method embodiments. The memory 1521 and the processor 1522 may serve one or more boards. In other words, a memory and a processor may be separately disposed on each board. Alternatively, a plurality of boards may share a same memory and a same processor. In addition, a necessary circuit may be further disposed on each board.

An embodiment of this application provides a first communications system. The communications system may include at least one terminal device in the embodiment shown in FIG. 2, and a network device in the embodiment shown in FIG. 2. The terminal device is, for example, the communications apparatus 400 in FIG. 4 or the communications apparatus 500 in FIG. 5, and the network device is, for example, the communications apparatus 600 in FIG. 6 or the communications apparatus 700 in FIG. 7. For example, the terminal device may be configured to perform all operations performed by the terminal device in the embodiment shown in FIG. 2, for example, S201 to S206 in the embodiment shown in FIG. 2, and/or configured to support another process of the technology described in this specification. The network device may be configured to perform all operations performed by the network device in the embodiment shown in FIG. 2, for example, S201, S202, and S204 to S206 in the embodiment shown in FIG. 2, and an operation of determining the first codeword set, and/or configured to support another process of the technology described in this specification.

An embodiment of this application further provides a second communications system. The communications system may include at least one terminal device in the embodiment shown in FIG. 3, and a network device in the embodiment shown in FIG. 3. The terminal device is, for example, the communications apparatus 800 in FIG. 8 or the communications apparatus 900 in FIG. 9, and the network device is, for example, the communications apparatus 1000 in FIG. 10 or the communications apparatus 1100 in FIG. 11. For example, the terminal device may be configured to perform all operations performed by the terminal device in the embodiment shown in FIG. 3, for example, S301 to S306 in the embodiment shown in FIG. 3, and/or configured to support another process of the technology described in this specification. The network device may be configured to perform all operations performed by the network device in the embodiment shown in FIG. 3, for example, S301, S302, and S304 to S306 in the embodiment shown in FIG. 3, and an operation of determining the first codeword set, and/or configured to support another process of the technology described in this specification.

The first communications system may be the same as or different from the second communications system.

An embodiment of this application further provides a computer-readable storage medium. The computer-readable storage medium stores a computer program. When the computer program is executed by a computer, the computer may implement a procedure related to the terminal device provided in the method embodiment shown in FIG. 2.

An embodiment of this application further provides a computer-readable storage medium. The computer-readable storage medium stores a computer program. When the computer program is executed by a computer, the computer may implement a procedure related to the network device provided in the method embodiment shown in FIG. 2.

An embodiment of this application further provides a computer-readable storage medium. The computer-readable storage medium stores a computer program. When the computer program is executed by a computer, the computer may implement a procedure related to the terminal device provided in the method embodiment shown in FIG. 3.

An embodiment of this application further provides a computer-readable storage medium. The computer-readable storage medium stores a computer program. When the computer program is executed by a computer, the computer may implement a procedure related to the network device provided in the method embodiment shown in FIG. 3.

An embodiment of this application further provides a computer program product that stores a computer program. When the computer program is executed by a computer, the computer may perform the method performed by the terminal device in the method embodiment shown in FIG. 2.

An embodiment of this application further provides a computer program product that stores a computer program. When the computer program is executed by a computer, the computer may perform the method performed by the network device in the method embodiment shown in FIG. 2.

An embodiment of this application further provides a computer program product that stores a computer program. When the computer program is executed by a computer, the computer may perform the method performed by the terminal device in the method embodiment shown in FIG. 3.

An embodiment of this application further provides a computer program product that stores a computer program. When the computer program is executed by a computer, the computer may perform the method performed by the network device in the method embodiment shown in FIG. 3.

It should be understood that the processor mentioned in the embodiments of this application may be a CPU, or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions in the embodiments.

In addition, functional units in the embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps in the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A communications method, comprising:

sending, by a terminal device, coherent capability indication information, wherein the coherent capability indication information indicates that the terminal device has a non-coherent capability;

determining, by the terminal device, a first codeword set, wherein the first codeword set comprises a first codeword, the first codeword is a 4×1 matrix, and each element in the matrix is a non-zero element; and the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ or } \frac{1}{2}\begin{bmatrix}1\\-j\\-1\\j\end{bmatrix}.$$

2. The method according to claim 1, wherein the terminal device having the non-coherent capability supports a non-coherent codeword set, the non-coherent codeword set comprises at least one fourth codeword, and a number of non-zero element in each column of the at least one fourth codeword is one.

3. The method according to claim 1, wherein:

the first codeword is used to transmit a physical uplink shared channel (PUSCH) in a discrete Fourier transform spread orthogonal frequency division multiplexing (DFT-s-OFDM) waveform and a PUSCH in a cyclic prefix (CP)-OFDM waveform.

4. The method according to claim 1, wherein:

the first codeword set further comprises a second codeword, the second codeword is a 4×2 matrix, and each element in the second codeword is a non-zero element; and the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{ or } \frac{1}{2\sqrt{2}}\begin{bmatrix}1&1\\-j&-j\\j&-j\\1&-1\end{bmatrix}.$$

5. The method according to claim 1, wherein:

the first codeword set further comprises a third codeword, the third codeword is a 4×3 matrix, and each element in the third codeword is a non-zero element; and the third codeword is one of the following codewords:

$$\frac{1}{2\sqrt{3}}\begin{bmatrix}1&1&1\\1&-1&1\\1&1&-1\\1&-1&-1\end{bmatrix}, \frac{1}{2\sqrt{3}}\begin{bmatrix}1&1&1\\1&-1&1\\j&j&-j\\j&-j&-j\end{bmatrix},$$

$$\frac{1}{2\sqrt{3}}\begin{bmatrix}1&1&1\\-1&1&-1\\1&1&-1\\-1&1&1\end{bmatrix}, \text{ or } \frac{1}{2\sqrt{3}}\begin{bmatrix}1&1&1\\-1&1&-1\\j&j&-j\\-j&j&j\end{bmatrix}.$$

6. A communications method, comprising:
sending, by a terminal device, coherent capability indication information, wherein the coherent capability indication information indicates that the terminal device has a partially-coherent capability; and
determining, by the terminal device, a first codeword set, wherein the first codeword set comprises:

$$\left\{\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}\right\} \text{ or }$$

$$\left\{\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix},\right.$$

$$\left.\frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}\right\}.$$

7. The method according to claim 6,
wherein the terminal device having the partially-coherent capability supports a partially-coherent codeword set and a non-coherent codeword set; the non-coherent codeword set comprises at least one second codeword, and each column of the at least one second codeword comprises only one non-zero element; and the partially-coherent codeword set comprises at least one third codeword, and a number of non-zero element in each column of the at least one third codeword is two.

8. The method according to claim 6, wherein the first codeword is used to transmit a physical uplink shared channel (PUSCH) in a discrete Fourier transform spread orthogonal frequency division multiplexing (DFT-s-OFDM) waveform and a PUSCH in a cyclic prefix (CP)-OFDM waveform.

9. The method according to claim 6, wherein:
the first codeword set further comprises at least one second codeword, and a value of a power scaling factor corresponding to the at least one second codeword is 1; or
the first codeword set further comprises at least one third codeword, and a value of a power scaling factor corresponding to the at least one third codeword is 1.

10. The method according to claim 6, wherein the method further comprises:
sending, by the terminal device, first capability indication information, wherein the first capability indication information indicates that the terminal device supports a first codebook subset comprised in the first codeword set, and the first codebook subset is a codebook subset 1 or a codebook subset 2, wherein:
the codebook subset 1 comprises the first codeword; and
the codebook subset 2 comprises the first codeword and at least one third codeword.

11. A communications apparatus, comprising:
at least one processor; and
one or more memories coupled to the at least one processor and storing programming instructions for execution by the at least one processor to cause the apparatus to:
send coherent capability indication information, wherein the coherent capability indication information indicates that the communications apparatus has a non-coherent capability;
determine a first codeword set, wherein the first codeword set comprises a first codeword, the first codeword is a 4×1 matrix, and each element in the matrix is a non-zero element; and
the first codeword is one of the following codewords:

$$\frac{1}{2}\begin{bmatrix}1\\1\\j\\j\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\-1\\-j\end{bmatrix}, \frac{1}{2}\begin{bmatrix}1\\-1\\j\\-j\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \text{ or } \frac{1}{2}\begin{bmatrix}1\\-j\\-1\\j\end{bmatrix}.$$

12. The communications apparatus according to claim 11, wherein:
the communications apparatus having the non-coherent capability supports a non-coherent codeword set, the non-coherent codeword set comprises at least one fourth codeword, and a number of non-zero element in each column of the at least one fourth codeword is one.

13. The communications apparatus according to claim 11, wherein the first codeword is used to transmit a physical uplink shared channel (PUSCH) in a discrete Fourier transform spread orthogonal frequency division multiplexing (DFT-s-OFDM) waveform and a PUSCH in a cyclic prefix (CP)-OFDM waveform.

14. The communications apparatus according to claim 11, wherein:
the first codeword set further comprises a second codeword, the second codeword is a 4×2 matrix, and each element in the second codeword is a non-zero element; and
the second codeword is one of the following codewords:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{ or } \frac{1}{2\sqrt{2}}\begin{bmatrix}1&1\\-j&-j\\j&-j\\1&-1\end{bmatrix}.$$

15. The communications apparatus according to claim 11, wherein:
the first codeword set further comprises a third codeword, the third codeword is a 4×3 matrix, and each element in the third codeword is a non-zero element; and
the third codeword is one of the following codewords:

$$\frac{1}{2\sqrt{3}}\begin{bmatrix}1 & 1 & 1\\ 1 & -1 & 1\\ 1 & 1 & -1\\ 1 & -1 & -1\end{bmatrix},\ \frac{1}{2\sqrt{3}}\begin{bmatrix}1 & 1 & 1\\ 1 & -1 & 1\\ j & j & -j\\ j & -j & -j\end{bmatrix},$$

$$\frac{1}{2\sqrt{3}}\begin{bmatrix}1 & 1 & 1\\ -1 & 1 & -1\\ 1 & 1 & -1\\ -1 & 1 & 1\end{bmatrix},\ or\ \frac{1}{2\sqrt{3}}\begin{bmatrix}1 & 1 & 1\\ -1 & 1 & -1\\ j & j & -j\\ -j & j & j\end{bmatrix}.$$

16. A communications apparatus, comprising:
at least one processor; and
one or more memories coupled to the at least one processor and storing programming instructions for execution by the at least one processor to cause the apparatus to:
send coherent capability indication information, wherein the coherent capability indication information indicates that the communications apparatus has a partially-coherent capability; and
determine a first codeword set, wherein the first codeword set comprises:

$$\left\{\frac{1}{2}\begin{bmatrix}1\\1\\1\\1\end{bmatrix},\ \frac{1}{2}\begin{bmatrix}1\\1\\j\\j\end{bmatrix},\ \frac{1}{2}\begin{bmatrix}1\\1\\-1\\-1\end{bmatrix},\ \frac{1}{2}\begin{bmatrix}1\\1\\-j\\-j\end{bmatrix}\right\}\ or$$

$$\left\{\frac{1}{2}\begin{bmatrix}1\\1\\1\\-1\end{bmatrix},\ \frac{1}{2}\begin{bmatrix}1\\1\\j\\j\end{bmatrix},\ \frac{1}{2}\begin{bmatrix}1\\1\\-1\\1\end{bmatrix},\ \frac{1}{2}\begin{bmatrix}1\\1\\-j\\-j\end{bmatrix},\ \frac{1}{2}\begin{bmatrix}1\\1\\j\\1\end{bmatrix},\ \frac{1}{2}\begin{bmatrix}1\\j\\j\\j\end{bmatrix},\ \frac{1}{2}\begin{bmatrix}1\\j\\-1\\-j\end{bmatrix},\ \frac{1}{2}\begin{bmatrix}1\\j\\-j\\-1\end{bmatrix}\right\}.$$

17. The communications apparatus according to claim 16, wherein:
the communications apparatus having the partially-coherent capability supports a partially-coherent codeword set and a non-coherent codeword set; the non-coherent codeword set comprises at least one second codeword, and each column of the at least one second codeword comprises only one non-zero element; and the partially-coherent codeword set comprises at least one third codeword, and a number of non-zero element in each column of the at least one third codeword is two.

18. The communications apparatus according to claim 16 wherein:
the first codeword is used to transmit a physical uplink shared channel (PUSCH) in a discrete Fourier transform spread orthogonal frequency division multiplexing (DFT-s-OFDM) waveform and a PUSCH in a cyclic prefix (CP)-OFDM waveform.

19. The communications apparatus according to claim 16, wherein:
the first codeword set further comprises at least one second codeword, and a value of a power scaling factor corresponding to the second codeword is 1; or
the first codeword set further comprises at least one third codeword, and a value of a power scaling factor corresponding to the third codeword is 1.

20. The communications apparatus according to claim 16, wherein:
the communications apparatus further comprises a transceiver, configured to send first capability indication information, wherein the first capability indication information indicates that the communications apparatus supports a first codebook subset comprised in the first codeword set, and the first codebook subset is a codebook subset 1 or a codebook subset 2, wherein:
the codebook subset 1 comprises the first codeword; and
the codebook subset 2 comprises the first codeword and at least one third codeword.

* * * * *